United States Patent
Liu

(10) Patent No.: US 10,953,372 B2
(45) Date of Patent: Mar. 23, 2021

(54) THIN-SHEET ZEOLITE MEMBRANE AND METHODS FOR MAKING THE SAME

(71) Applicant: Battelle Memorial Institute, Richland, WA (US)

(72) Inventor: Wei Liu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 221 days.

(21) Appl. No.: 16/272,885

(22) Filed: Feb. 11, 2019

(65) Prior Publication Data

US 2019/0176097 A1  Jun. 13, 2019

Related U.S. Application Data

(60) Division of application No. 14/733,735, filed on Jun. 8, 2015, now Pat. No. 10,265,660, which is a (Continued)

(51) Int. Cl.
*B01D 71/02* (2006.01)
*B01D 69/10* (2006.01)
(Continued)

(52) U.S. Cl.
CPC ....... *B01D 71/028* (2013.01); *B01D 39/2051* (2013.01); *B01D 67/0041* (2013.01);
(Continued)

(58) Field of Classification Search
CPC .............................. B01D 71/028; B22F 5/006
(Continued)

(56) References Cited

U.S. PATENT DOCUMENTS

| 3,577,226 A | 5/1971 | Elbert et al. |
|---|---|---|
| 4,525,704 A | 6/1985 | Campbell et al. |

(Continued)

FOREIGN PATENT DOCUMENTS

| DE | 69533510 T2 | 9/2005 |
|---|---|---|
| EP | 1894613 A | 3/2008 |

(Continued)

OTHER PUBLICATIONS

Aoki et al., "Gas permeation properties of A-type zeolite membrane formed on porous substrate by hydrothermal synthesis," *Journal of Membrane Science*, vol. 141, pp. 197-205, Elsevier, Apr. 15, 1998.
(Continued)

*Primary Examiner* — Weiping Zhu
(74) *Attorney, Agent, or Firm* — Klarquist Sparkman, LLP

(57) ABSTRACT

Zeolite membrane sheets for separation of mixtures containing water are provided, as well as methods for making the same. Thin, but robust, zeolite membrane sheets having an inter-grown zeolite crystal film directly on a thin, less than 200 micron thick, porous support sheet free of any surface pores with a size above 10 microns. The zeolite membrane film thickness is less than about 10 microns above the support surface and less than about 5 microns below the support surface. Methods of preparing the membrane are disclosed which include coating of the support sheet surface with a seed coating solution containing the parent zeolite crystals with mean particle sizes from about 0.5 to 2.0 microns at loading of 0.05-0.5 mg/cm2 and subsequent growth of the seeded sheet in a growth reactor loaded with a growth solution over a temperature range of about 45° C. to about 120° C.

6 Claims, 48 Drawing Sheets

Related U.S. Application Data continuation-in-part of application No. 13/032,752, filed on Feb. 23, 2011, now Pat. No. 9,079,136, which is a continuation-in-part of application No. 12/817,694, filed on Jun. 17, 2010, now abandoned, which is a continuation-in-part of application No. 12/470,294, filed on May 21, 2009, now Pat. No. 8,673,067.

(60) Provisional application No. 61/218,521, filed on Jun. 19, 2009.

(51) Int. Cl.
| | |
|---|---|
| B01D 67/00 | (2006.01) |
| B01D 39/20 | (2006.01) |
| B01D 69/06 | (2006.01) |
| B22F 5/00 | (2006.01) |
| C22C 19/00 | (2006.01) |
| C22C 19/03 | (2006.01) |
| C22C 38/08 | (2006.01) |
| C22C 28/00 | (2006.01) |

(52) U.S. Cl.
CPC ..... *B01D 67/0046* (2013.01); *B01D 67/0058* (2013.01); *B01D 67/0069* (2013.01); *B01D 69/06* (2013.01); *B01D 69/10* (2013.01); *B01D 71/022* (2013.01); *B22F 5/006* (2013.01); *C22C 19/002* (2013.01); *C22C 19/03* (2013.01); *C22C 28/00* (2013.01); *C22C 38/08* (2013.01); B01D 2239/10 (2013.01); B01D 2239/1216 (2013.01); B01D 2323/02 (2013.01); B01D 2323/08 (2013.01); B01D 2323/18 (2013.01); B01D 2325/10 (2013.01); B01D 2325/12 (2013.01); B01D 2325/20 (2013.01); B01D 2325/24 (2013.01); B01D 2325/36 (2013.01); B22F 2998/10 (2013.01); *Y10T 428/12014* (2015.01); *Y10T 428/31678* (2015.04)

(58) Field of Classification Search
USPC .......................................................... 148/426
See application file for complete search history.

(56) References Cited

U.S. PATENT DOCUMENTS

| | | | |
|---|---|---|---|
| 5,019,263 | A | 5/1991 | Haag et al. |
| 5,242,559 | A | 9/1993 | Giorgi |
| 5,258,339 | A | 11/1993 | Ma et al. |
| 5,312,582 | A | 5/1994 | Donado |
| 5,456,740 | A | 10/1995 | Snow et al. |
| 5,846,664 | A | 12/1998 | Third et al. |
| 5,871,650 | A | 2/1999 | Lai et al. |
| 5,985,475 | A | 11/1999 | Reynolds et al. |
| 6,326,326 | B1 | 12/2001 | Feng et al. |
| 6,503,294 | B2 | 1/2003 | Yoshikawa et al. |
| 6,689,195 | B1 | 2/2004 | Anthonis et al. |
| 6,692,626 | B2 | 2/2004 | Keefer et al. |
| 6,929,705 | B2 | 8/2005 | Myers et al. |
| 6,946,015 | B2 | 9/2005 | Jorgensen et al. |
| 9,079,136 | B2 | 7/2015 | Liu et al. |
| 2001/0006158 | A1 | 7/2001 | Ho et al. |
| 2004/0201119 | A1 | 10/2004 | Kuhstoss et al. |
| 2008/0102358 | A1 | 5/2008 | Kowalczyk et al. |
| 2008/0268327 | A1 | 10/2008 | Gordon et al. |
| 2009/0114594 | A1 | 5/2009 | Sirkar |
| 2009/0232692 | A1 | 9/2009 | Wada et al. |

FOREIGN PATENT DOCUMENTS

| | | |
|---|---|---|
| WO | WO 94/25151 | 11/1994 |
| WO | WO 96/01686 | 1/1996 |
| WO | WO 97/33684 | 9/1997 |
| WO | WO 00/53297 | 9/2000 |
| WO | WO 2006/049940 | 11/2006 |
| WO | WO 2006/050531 | 11/2006 |
| WO | WO 2009/005745 | 8/2009 |
| WO | WO 2010/135509 | 11/2010 |

OTHER PUBLICATIONS

Bao et al., "Facilitated transport of CO2 across a liquid membrane: Comparing enzyme, amine, and alkaline," *Journal of Membrane Science*, vol. 280, pp. 330-334, Mar. 2, 2006.
Bara et al., "Guide to CO2 separations in imidazolium-based room-temperature ionic liquids," *Ind. Eng. Chem. Res.*, vol. 48, No. 6, pp. 2739-2751, Feb. 11, 2009.
Camper et al., "Bulk-fluid solubility and membrane feasibility of Rmim-based room-temperature ionic liquids," *Ind. Eng. Che. Res.*, vol. 45, pp. 6279-6283, Aug. 8, 2006.
Chen et al., "Immobilized glycerol-based liquid membranes in hollow fibers for selective CO2 separation from CO2—N2 mixtures," *Journal of Membrane Science*, vol. 183, No. 1, pp. 75-88, Feb. 28, 2001.
Chen. "Phase-field models for microstructure evolution," *Annual Review of Materials Research*, vol. 32, pp. 113-140, Aug. 2002. (Copy Attached).
Deng et al., "Facilitated transport of CO2 in novel PVAm/PVA blend membrane," *J. Mem. Sci.*, vol. 340, pp. 154-163, May 23, 2003.
Dong et al., "Multicomponent hydrogen/hydrocarbon separation by Mfi-type zeolite membranes," *AIChE Journal*, vol. 46, No. 10, pp. 1957-1966, Oct. 2000.
El-Azzami et al., "Parametric study of CO2 fixed carrier facilitated transport through swollen chitosan membranes," *Ind.& Eng. Chem. Res.*, vol. 48, No. 2, pp. 894-902, Jan. 21, 2009.
Favre et al., "Carbon dioxide recovery from post-combustion processes: Can gas permeation membranes compete with absorption," *Journal of Membrane Science*, vol. 294, Nos. 1-2, pp. 50-59, Feb. 9, 2007.
Geus et al., "High-temperature stainless steal supported zeolite (MFI) membranes: preparation, module construction, and permeation experiments," *Microporous Materials*, vol. 1, pp. 131-147, Elsevier Science Publishers B.V., Amsterdam, Apr. 1993.
Gu, X. et al., "Synthesis of defects-free FAU-type zeolite membranes and separation for dry and moist CO2/N2 mixtures," *Ind. Eng. Chem. Res.*, vol. 44, No. 4, pp. 937-944, Feb. 16, 2005.
Gu, Y. et al., "Ionic liquids-based catalysis with solids: state of the art," *Adv. Synth. Catal*, vol. 351, pp. 817-847, Apr. 6, 2009.
Hanioka et al, "CO2 separation facilitated by task-specific ionic liquids using a supported liquid membrane," *Journal of Membrane Science*, vol. 314, pp. 1-4, Jan. 24, 2008.
Harlick, P.J.E. et al., "Applications of pore-expanded mesoporous silicas. 3. triamine silane grafting for enhanced CO2 adsorption," *Ind. Eng. Chem. Res.*, vol. 45, pp. 3248-3255, Mar. 22, 2006.
Harlick, P.J.E. et al., "Applications of pore-expanded mesoporous silica. 5. triamine grafted material with exceptional CO2 dynamic and equilibrium adsorption performance," *Ind. Eng. Chem. Res.*, vol. 46, pp. 446-458, Jan. 17, 2007.
Harris et al., "Solubilities of carbon dioxide and densities off aqueous sodium glycinate solutions before and after CO2 absorption," *J. Chem. Eng. Data*, vol. 54, pp. 144-147, Jan. 8, 2009.
Holmes et al., "Zeolite a membranes for use in alcohol/water separations," *Trans IChem E*, vol. 78, Part A., pp. 1084-1088, Institute of Chemical Engineers, Nov. 2000.
Hu et al. "A phase-field model for evolving microstructures with strong elastic inhomogeneity," *Acta Mater*, vol. 49, p. 1879, Jun. 22, 2001. (Copy Attached).
Huang et al., "Carbon dioxide capture using a CO2-selective facilitated transport membrane," *Ind. Eng. Chem. Res.*, vol. 47, No. 4, pp. 1261-1267, Jan. 16, 2008.
Hwang et al., "Reaction kinetics between carbon dioxide and glycidyl methacrylate using trihexylamine immobilized ionic liquid on MCM41 catalyst," *J. Ind. and Eng. Chem.*, vol. 15, pp. 854-859, Nov. 25, 2009.

(56) References Cited

OTHER PUBLICATIONS

Ilconich et al., "Experimental investigation of the permeability and selectivity of supported ionic liquid membranes for CO2/He separation at temperatures up to 125oC," *Journal of Membrane Science*, vol. 298, pp. 41-47, Apr. 6, 2007.
International Search Report and Written Opinion for International Application No. PCT/US2011/031342, dated Jul. 27, 2011.
International Search Report and Written Opinion of the International Searching Authority, dated Dec. 6, 2010, for Application No. PCT/US2010/035543.
International Search Report for International Application No. PCT/US2008/008071, dated Sep. 10, 2008.
International Search Report for International Application No. PCT/EP00/02127, dated Jul. 6, 2000.
International Search Report/Written Opinion for International Application No. PCT/US2011/063405, dated Jul. 9, 2012.
Jafar et al., "Separation of alcohol/water mixtures by pervaporation through zeolite a membranes," *Microporous Materials*, vol. 12, pp. 305-311, Elsevier, Dec. 1997.
Kai et al., "Development of cesium-incorporated carbon membranes for CO2 separation under humid conditions," *Journal of Membrane Science*, vol. 342, pp. 14-21, Jun. 17, 2009.
Koros, W. et al., "Pushing the limits on possibilities for large scale gas separation: which strategies?" *Journal of Membrane Science*, vol. 175, No. 2, pp. 181-196, Aug. 10, 2000.
Koros, W. et al., "Pushing the limits on possibilities for large scale gas separation: which strategies?" *Journal of Membrane Science*, vol. 181, p. 141, Jan. 15, 2001.
Li, L. et al., "Stabilization of metal nanoparticles in cubic mesostructured silica and its application in regenerable deep desulfurization of warm syngas," *Chem. Mater*, vol. 21, pp. 5358-5364, Oct. 22, 2009.
Li, Y. et al., "Pervaporation and vapor permeation dehydration of Fischer-Tropsch mixed-alcohols by LTA zeolite membranes," *Separation and Purification Technology*, vol. 57, p. 140-146, Oct. 1, 2007.
Lin et al., "Materials selection guidelines for membranes that remove CO2 from gas mixtures," *Journal of Molecular Structure*, vol. 739, pp. 57-74, Apr. 2005.
Liu et al. "Development of thin porous metal sheet as microfiltration membrane and inorganic membrane support," *J. Mem. Sci.*, pp. 409-410; 113-126; Aug. 2012.
Liu, W. et al., "Critical material and process issues for CO2 separation from coal-powered plants," *JOM*, vol. 41, No. 4, pp. 36-44, Apr. 2009.
Liu, W. et al., "Micro-structured inorganic membrane reactor," Presentation at the 9th International Congress on Membranes and Membrane Processes, Honolulu, Hawaii, USA, Jul. 18, 2008.
Liu, W. et al., "High surface area inorganic membrane for process water removal," U.S. Department of Energy Initiative Flier, 2 pages, Oct. 1, 2008.
Luis et al., "Facilitated transport of CO2 and SO2 through supported ionic liquid membranes (SILMs)," *Desalination*, vol. 245, pp. 485-493, Sep. 15, 2009.
Masuda et al., "Preparation of hydrophilic and acid-proof silicalite-1 zeolite membrane and its application to selective separation of water from water solutions of concentrated acetic acid by pervaporation," *Separation and Purification Technology*, vol. 32, pp. 181-189, Jul. 1, 2003.
Mineo et al., "Very fast CO2 response and hydrophobic properties of novel poly(ionic liquid)s," *J. of Materials Chem.*, vol. 19, No. 46, pp. 8861-8870, Oct. 19, 2009.
Morigami, Y. et al., "The first large-scale pervaporation plant using tubular-type module with zeolite NaA membrane," *Separation and Purification Technology*, vol. 25, pp. 251-260, Elsevier, Japan, Oct. 2001.
Morigami, Y. et al., "The first large-scale pervaporation plant using tubular-type module with zeolite NaA membrane," *Separation and Purification Technology*, vol. 25, pp. 251-260, Oct. 1, 2001.

Mosca et al., "Structured zeolite NaX coatings on ceramic cordierite monolith supports for PSA applications," *Microporous and Mesoporous Materials*, vol. 130, pp. 38-48, May 2010.
National Energy Technology Laboratory (NETL) "Carbon dioxide capture from existing coal-fired power plants," DOE/NETL-401/110907, Final Report (Original Issue Date, Dec. 2006), Revision Date, Nov. 2007.
National Energy Technology Laboratory (NETL), "Cost and Performance Baseline for Fossil Energy Plants," DOE/NETL-2007/1281, vol. 1: Bituminous Coal and Natural Gas to Electricity, Final Report (Original Issue Date, May 2007), Revision 1, Aug. 2007.
Piera et al., "High separation selectivity with imperfect zeolite membranes," *ChemComm*, pp. 1309-1310, Zaragoza, Spain, Apr. 16, 1999.
Sandru et al., "Composite hollow fiber membranes for CO2 capture," *Journal of Membrane Science*, vol. 346, pp. 172-186, Jan. 1, 2010.
Sandstrom et al., "High flux zeolite X membranes," *JMS*, vol. 354, pp. 171-177, May 2010.
Sato et al., "A high reproducible fabrication method for industrial production of high flux NaA zeolite membrane," *Journal of Membrane Science*, vol. 301, pp. 151-161, Elsevier, Japan, Sep. 2007.
Sebastian et al., "Zeolite membrane for CO2 removal: Operating at high pressure," *Journal of Membrane Science*, vol. 292, pp. 92-97, Jan. 24, 2007.
Shekhawat et al., "A review of carbon dioxide selective membranes," *US DOE Topical Report*, DOE/NETL-2003/1200, Dec. 1, 2003.
Tang, J. et al., "Enhanced CO2 absorption of poly(ionic liquid)s," *Macromolecules*, vol. 38, pp. 2037-2039. Feb. 18, 2005.
Tang, J. et al., "Low-temperature CO2 sorption in ammonium-based poly(ionic liquid)s," *Polymer*, vol. 46, pp. 12460-12467, Nov. 4, 2005.
Wang, Z. et al., "High performance zeolite LTA pervaporation membranes on ceramic hollow fibers by dipcoating—wiping seed deposition," *J. Am. Chem. Soc*, vol. 131, pp. 6910-6911, American Chemical Society, Apr. 30, 2009.
Ward et al., "Carbon dioxide-oxygen separation: facilitated transport of carbon dioxide across a liquid film," *Science*, vol. 156, pp. 1481-1484, Jun. 16, 1967.
Wee et al., "Membrane separation process—pervaporation through zeolite membrane," *Separation and Purification Technology*, vol. 63, pp. 500-516, Nov. 3, 2008.
Xomeritakis et al, "Tubular ceramic-supported sol-gel silica-based membranes for flue gas carbon dioxide capture and sequestration," *Journal of Membrane Science*, vol. 341, pp. 30-36, May 23, 2009.
Yan et al., "Adsorption of CO2 on the rutile (110) surface in ionic liquid. A molecular dynamics simulation," *J. of Phys. Chem. C*, vol. 113, No. 45, pp. 19389-19392, Oct. 19, 2009.
Yegani et al., "Selective separation of C02 by using novel facilitated transport membrane at elevated temperatures and pressures," *Journal of Membrane Science*, vol. 291, pp. 157-164, Jan. 18, 2007.
Yokozeki et al., "Hydrogen purification using room-temperature ionic liquids," *Applied Energy*, vol. 84, pp. 351-361, Mar. 2007.
Yu G.R. et al., "Structure, interaction and property of amino-functionalized imidazolium ILs by molecular dynamics simulation and ab initio calculation," *AIChE J.*, vol. 53, No. 12, pp. 3210-3221, Dec. 2007.
Yu, G. et al., "Design of task-specific ionic liquids for capturing C02: A molecular orbital study," *Ind. Eng. Chem. Res*, vol. 45, No. 8, pp. 2875-2880, Feb. 24, 2006.
Zhang, J. et al., "Supported absorption of C02 by tetrabutylphosphonium amino acid ionic liquids," *Chem. Eur. Journal*, vol. 12, pp. 4021-4026, May 15, 2006.
Zhang, S. et al., "Fixation and conversion of C02 using ionic liquids," *Catalysis Today*, vol. 115, pp. 61-69, Mar. 29, 2006.
Zhang, Y. et al., "Dual amino-functionalised phosphonium ionic liquids for C02 capture," *Chem. Eur. J.*, vol. 15, pp. 3003-3011, Mar. 3, 2009.
Zheng et al., "Ethylenediamine-modified SBA-15 as regenerable C02 sorbent," *Ind. & Eng. Chem. Res.*, vol. 44, pp. 3099-3105, Mar. 25, 2005.

(56) References Cited

OTHER PUBLICATIONS

Zou et al., "C02-selective polymeric membranes containing amines in crosslinked polyvinyl alcohol)," *Journal of Membrane Science*, vol. 286, pp. 310-321, Oct. 10, 2006.

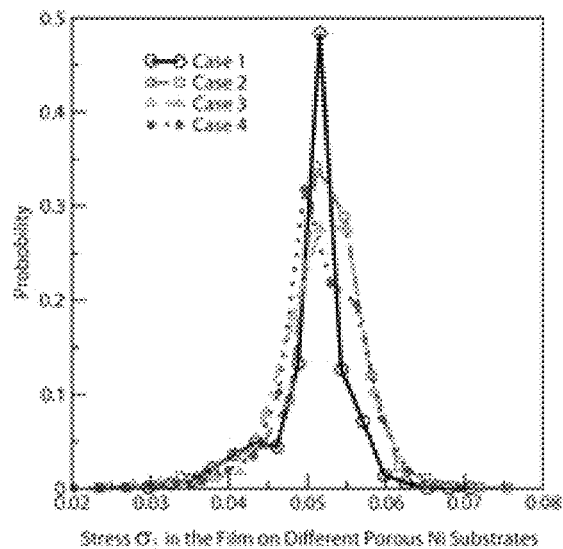 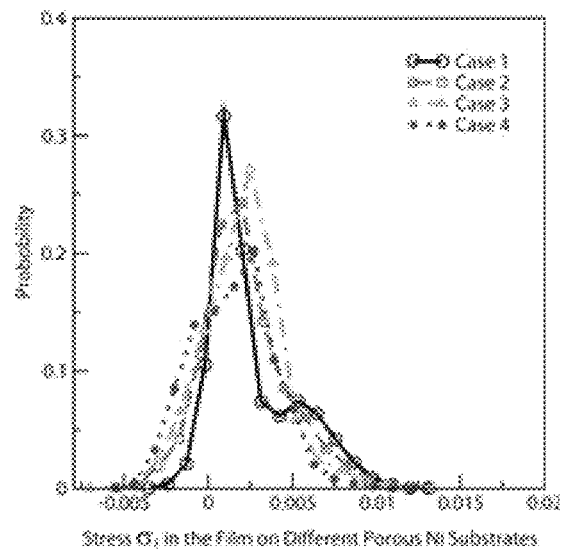
FIG. 5A    FIG. 5B
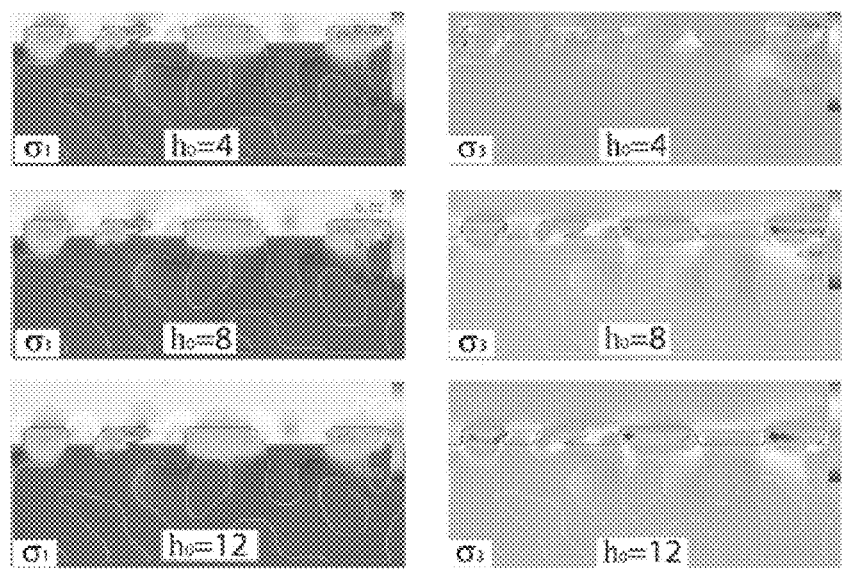
FIG. 6

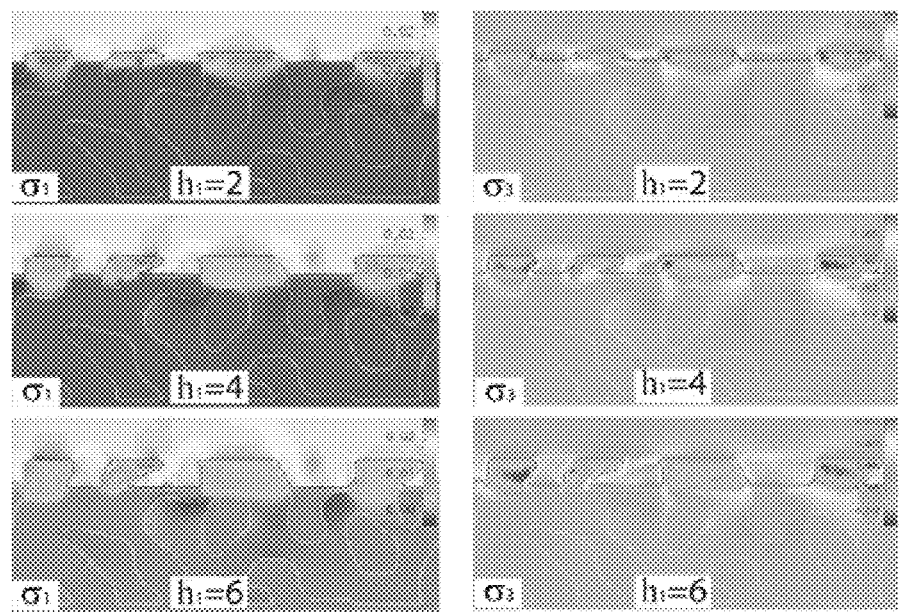
FIG. 7
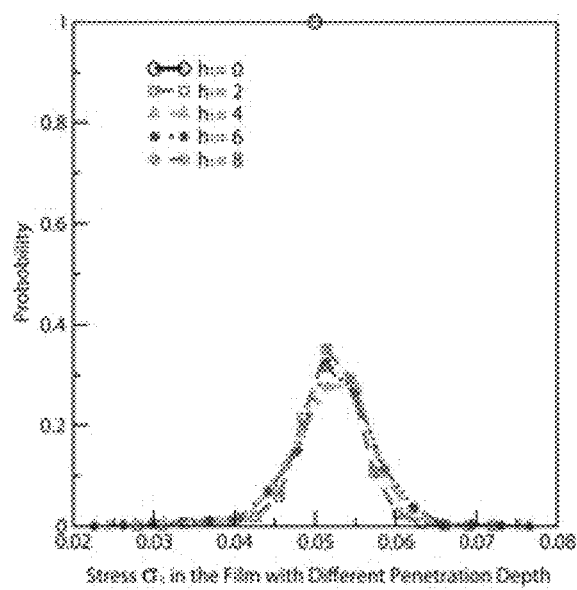 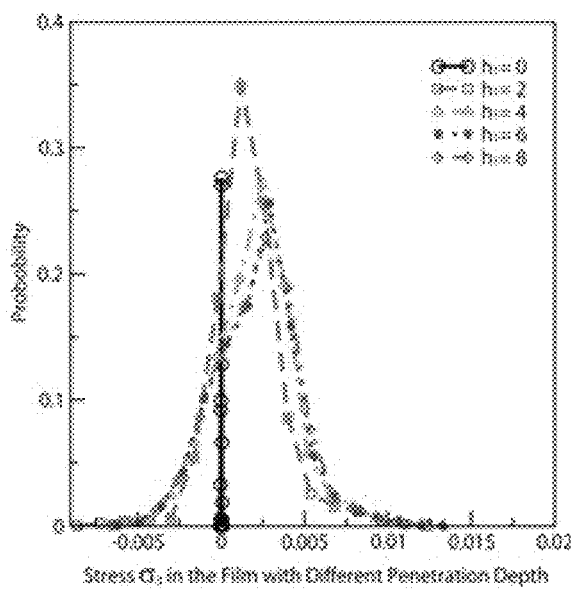
FIG. 8A FIG. 8B

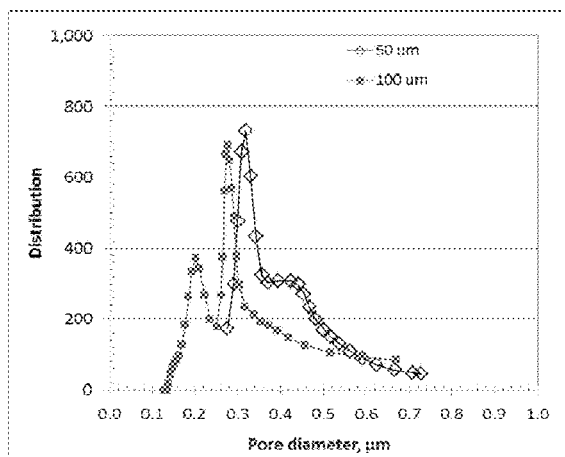
(a) by capillary flow
FIG. 10A
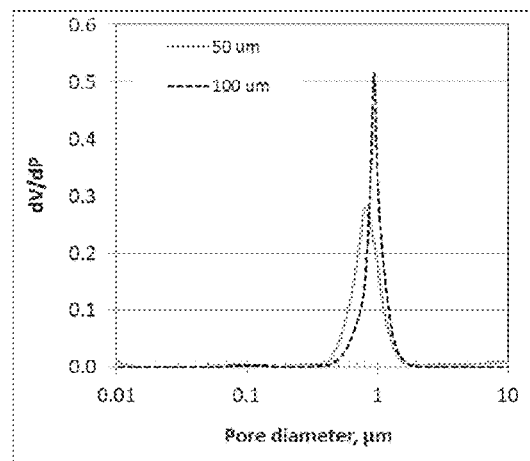
(b) by mercury porosimetry
FIG. 10B
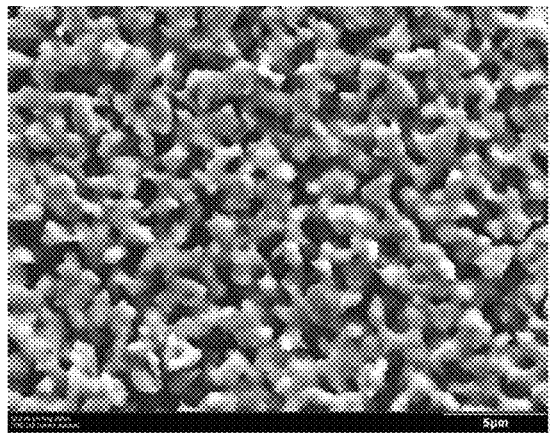
11A Surface texture of 50% porosity
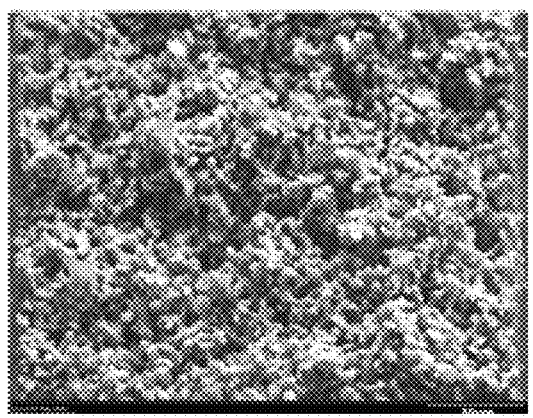
11B Fractured thickness of 50% porosity
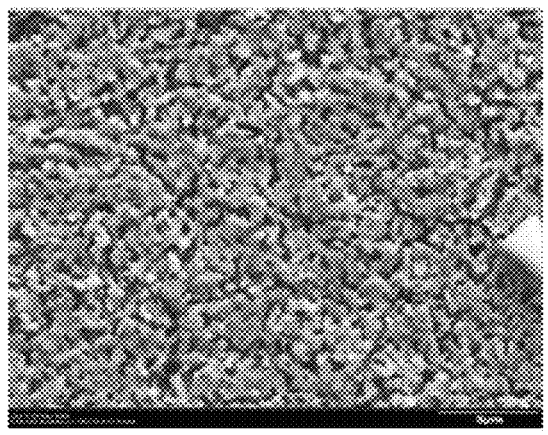
11C Surface texture of 35% porosity
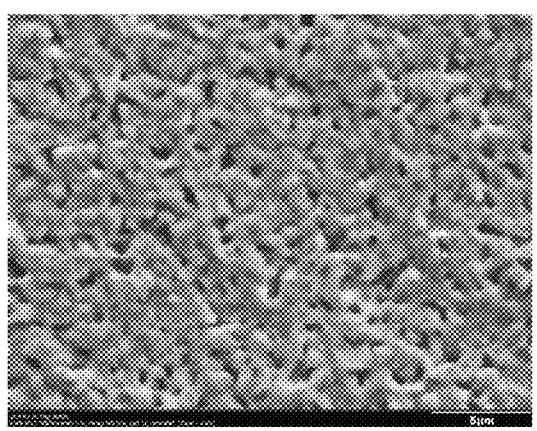
11D Surface texture of 10% porosity
FIGS. 11A-11D a). Parent NaA powder 1 (nano-A)  b). Parent NaA powder 2 (micro-A)

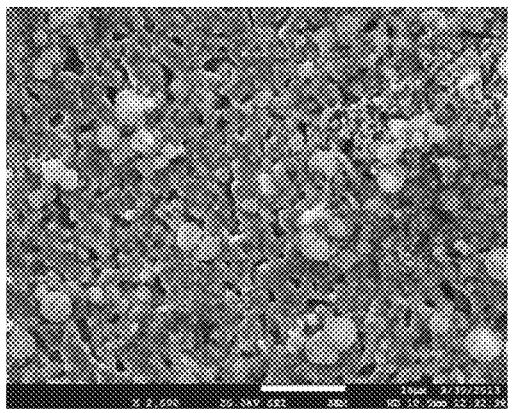
13A low mag of micro-A-seeded surface
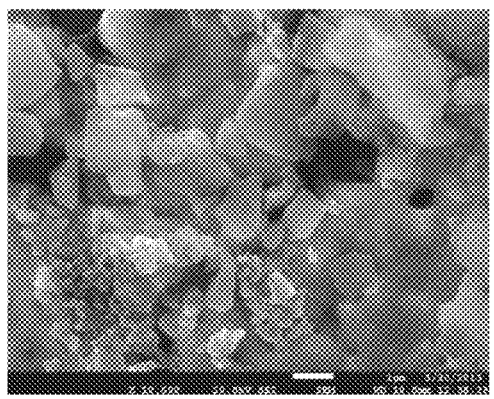
13B high mag of micro-A-seeded surface
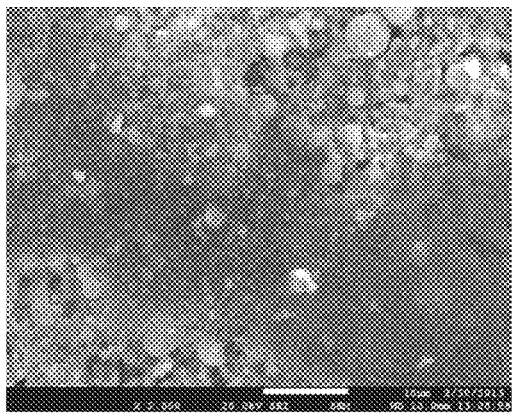
13C low mag of nano-A-seeded surface
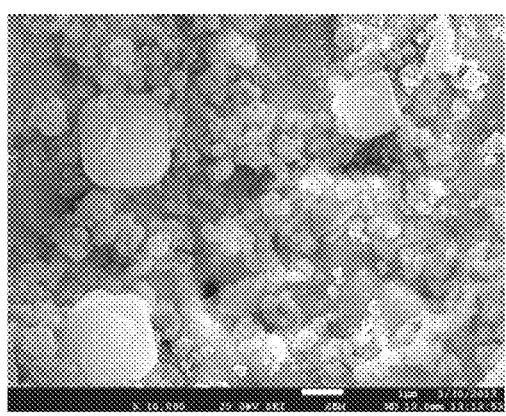
13D high mag of nano-A-seeded surface
FIGS. 13A-13D
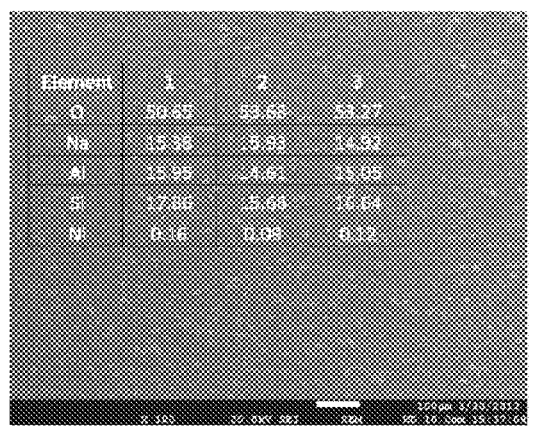
Surface texture at low mag
FIG. 14A
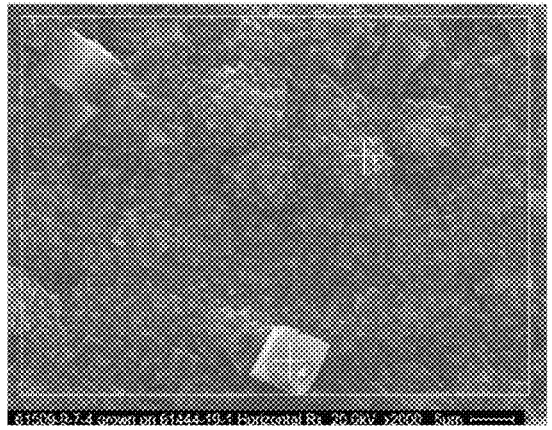
Surface texture at high mag
FIG. 14B

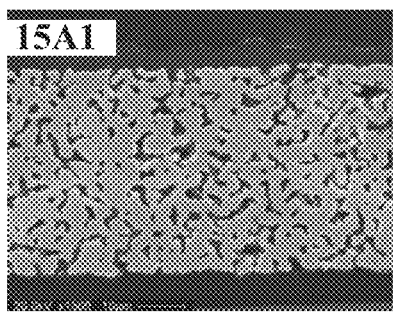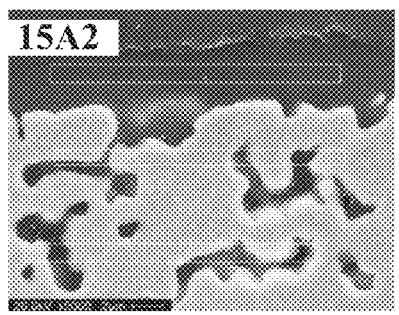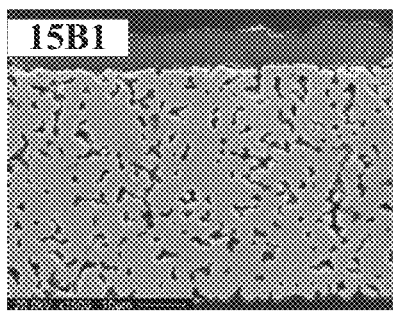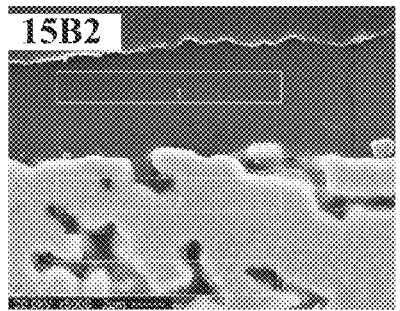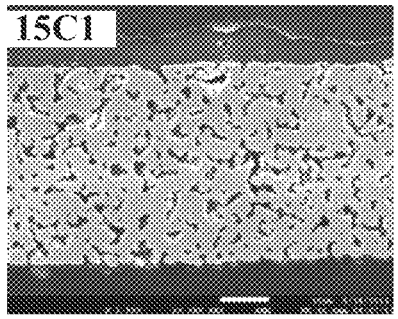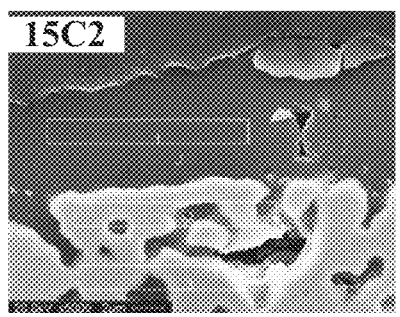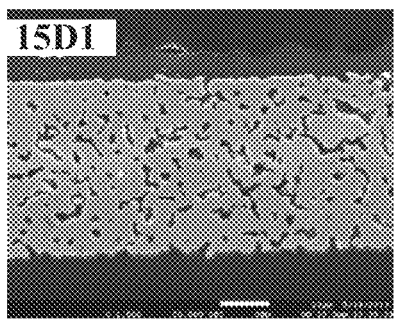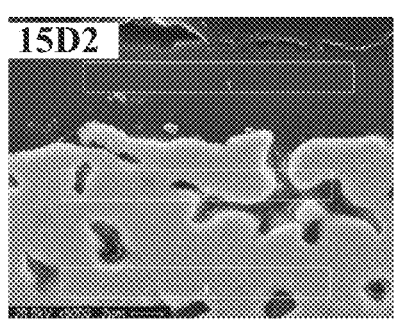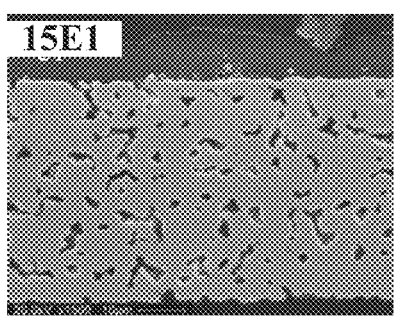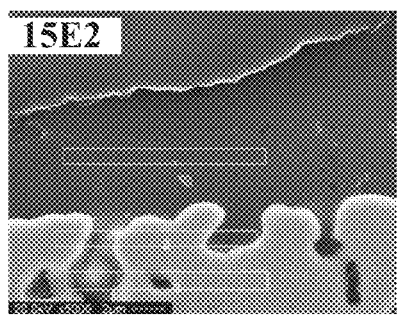
FIGS. 15A1-15E2

17A 1.7 μm micro-A for mem #65-3

17B 1.7 μm macro-A for mem #65-2

17C 1.7 μm macro-A for mem #65-1

17D 1.3 μm macro-A for mem #65-4

18A mem#65-1

18B mem#65-4

18C mem#65-4

18D mem#13-6

21A Surface texture of mem #94-1

21B Cross-section ross- mem #94-1

21C Surface texture of mem #96-94-1

21D Cross-section ross- mem #96-94-1

21E Surface texture of mem #98-94-1

21F Cross-section-mem #98-94-1

23A As-received bare support

23B After spray coating with 0.18 mg/cm² seed loading

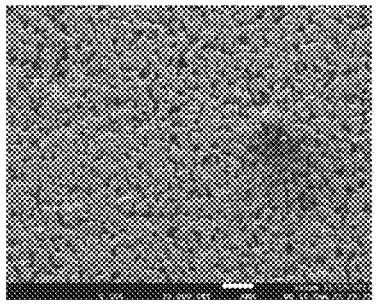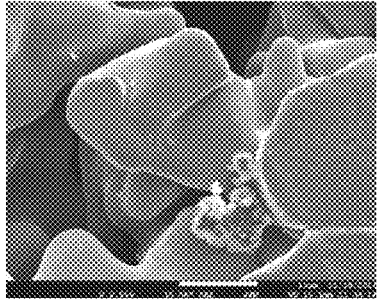
24A Bare support
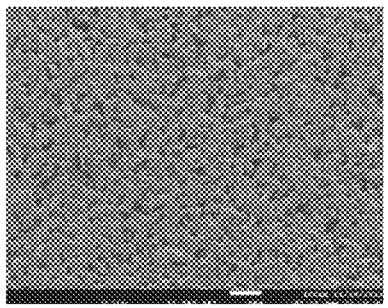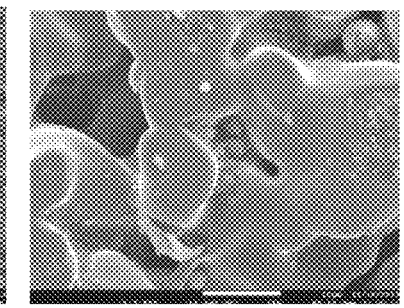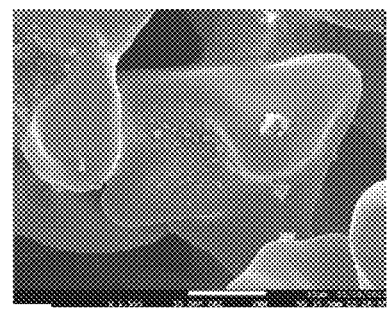
24B After spray coating with seed loading of 1.16 mg/cm$^2$
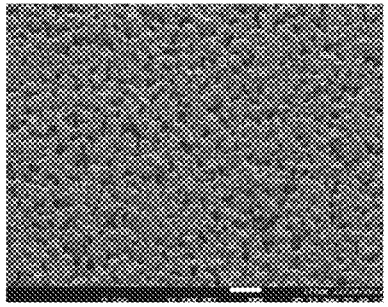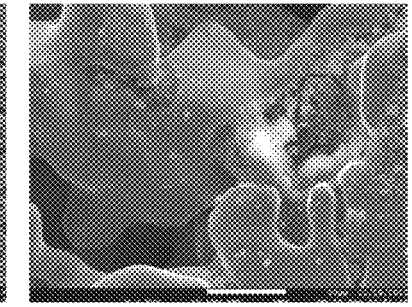
24C After spray coating with seed loading of 0.28 mg/cm$^2$
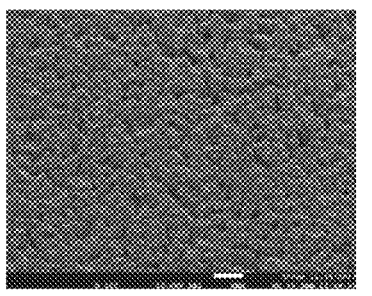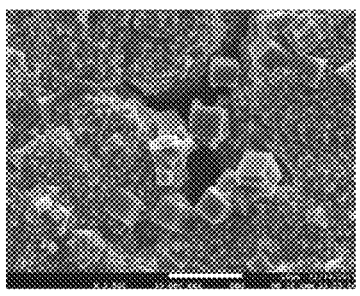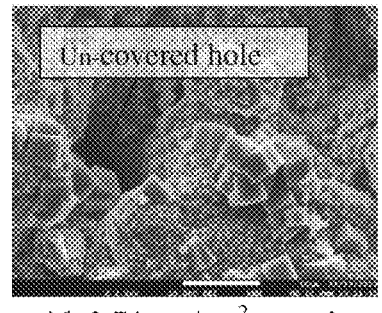
24D Membrane grown on the 1.28 mg/cm$^2$ seeded-support with 3.74 mg/cm$^2$ growth gain
FIGS. 24A-24D

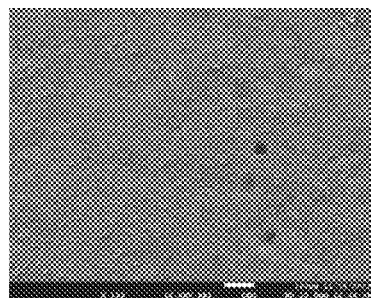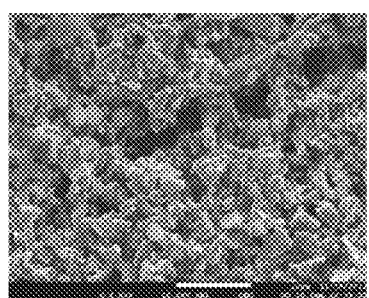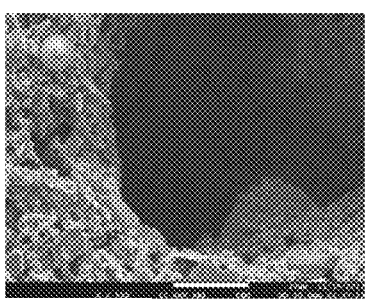
25A After spray coating with 0.17 mg/cm² seed loading
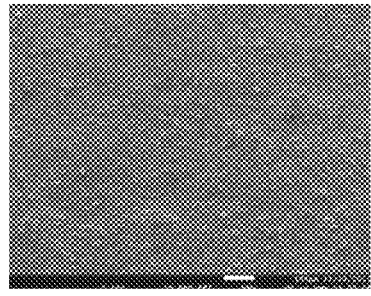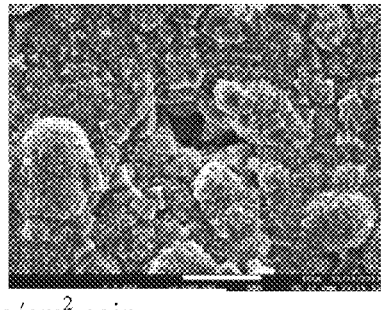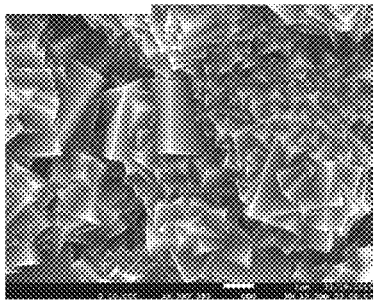
25B After growth with 4.5 mg/cm² gain
FIGS. 25A-25B

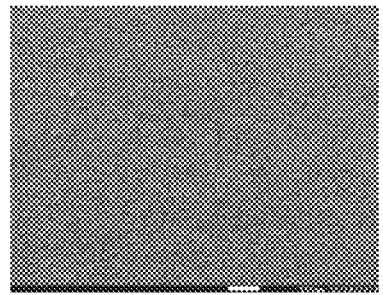 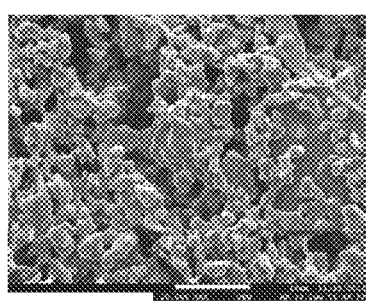 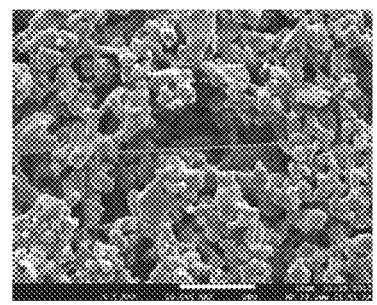
26A As-received support
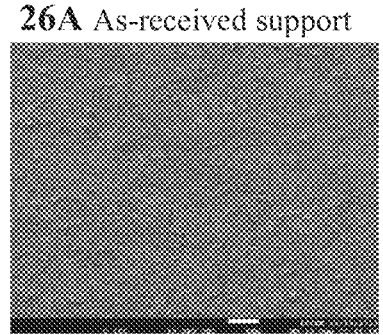 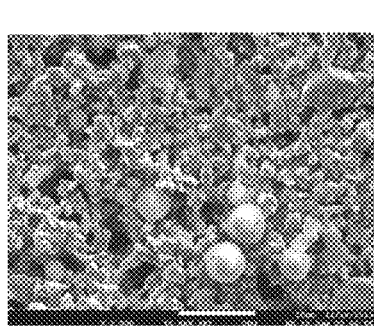 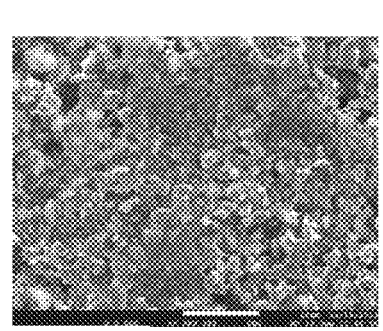
26B After spray coating with 0.38 mg/cm² seed loading
 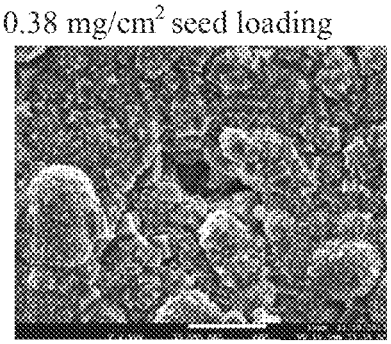 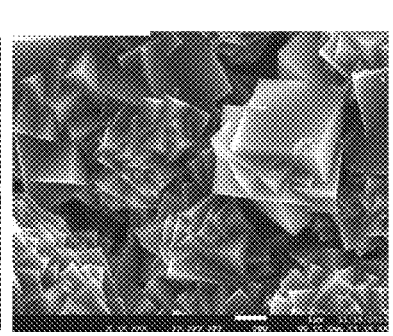
26C Growth with 4.5 mg/cm² gain
FIGS. 26A-26C

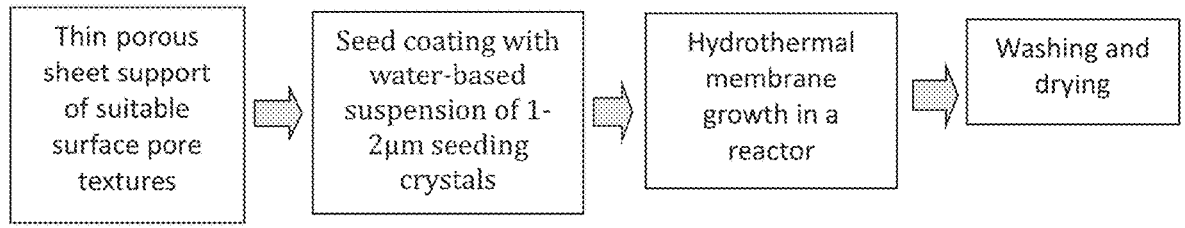
FIG. 35
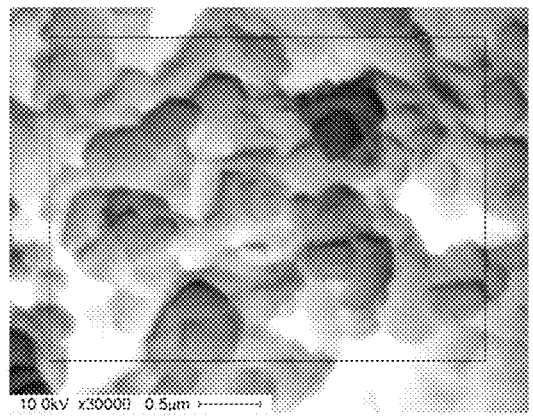
FIG. 36A NaY Zeolite (HS-320)
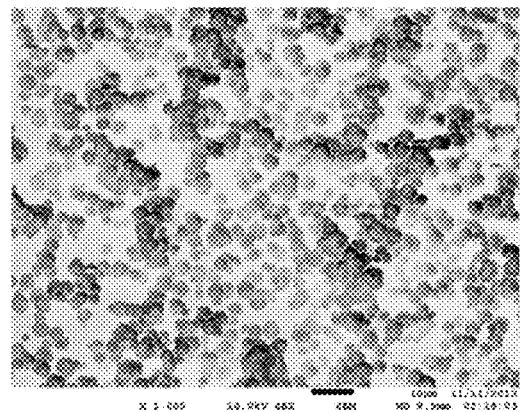
FIG. 36B NaX (F9, through 75 um)
FIGS. 36A and 36B
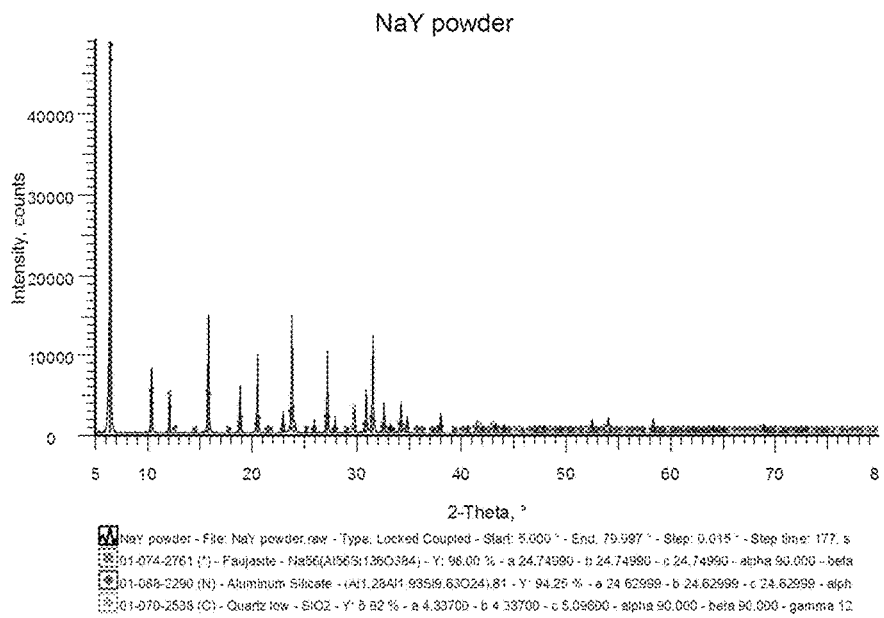
FIG. 37

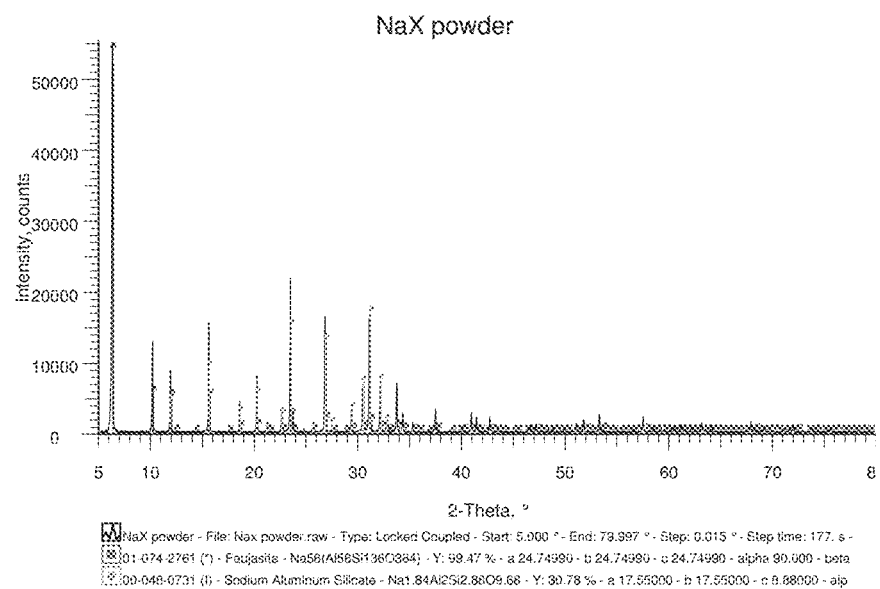
FIG. 38
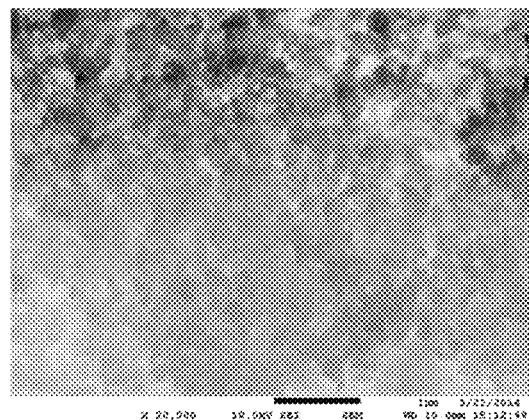
FIG. 39A. 4-h
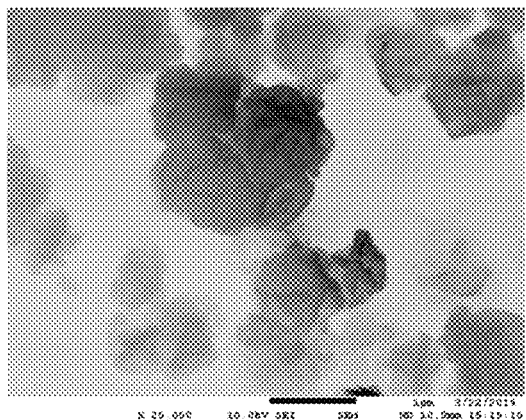
FIG. 39B. 8 h
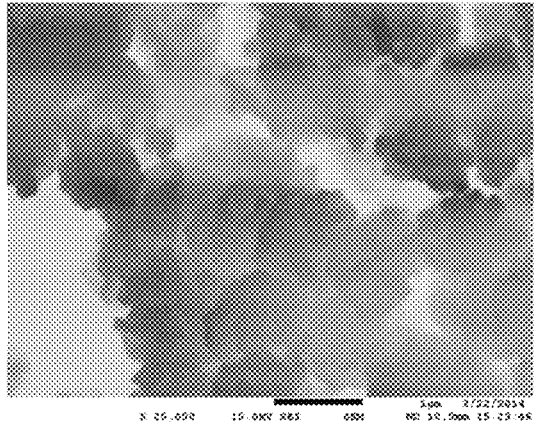
FIG. 39C. 20h
FIGS. 39A-39C

41A Seeded surface (4-h wet)

41B Membrane surface (4-h wet)

41C Seeded surface (8-h wet)

41D Membrane surface (8-h wet)

41E Seeded surface (8-h dry)

41F Membrane surface (8-h dry)

41G Seeded surface (20-h wet)

41H (20-h wet)

42A seed-coated surface

42B 0 h

42C 3.5 h

42D 16 h

45A Parent NaA/Ni membrane

45B 81-1Ca&Na at RT

45C 81-6 Ca&Na @60°C

45D 81-2 K&Na @RT

45E 81-7 K&Na @60°C

45F 81-4 H@RT

45G 81-5 Cs@RT

45H 81-10 Cs@60°C

45I 95-1 Ag@RT 2h

45J 95-2 Ag@RT 4h

45K N5-3 Ng@RT 6h

45L 95-4 Ag@RT 16h

46A #1. As-prepared

46B #2. OS2 Modified

46C #3. Nafion modified

46D #4. NaOH modified

46E #5 Nafion-modified

46F #6 Modified by CVD of TEOS

46G #7 Modified with TEOS wet impregnation

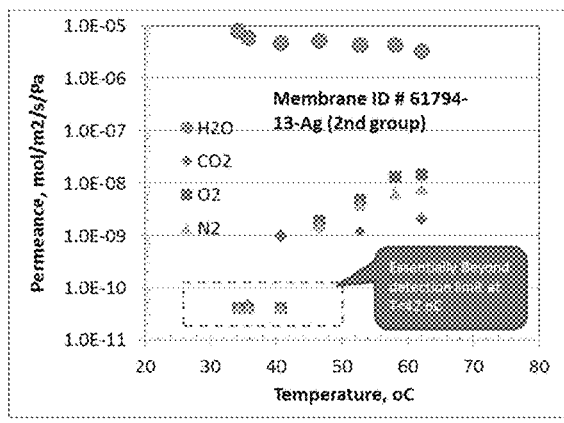
47A Humid gas at different temperature
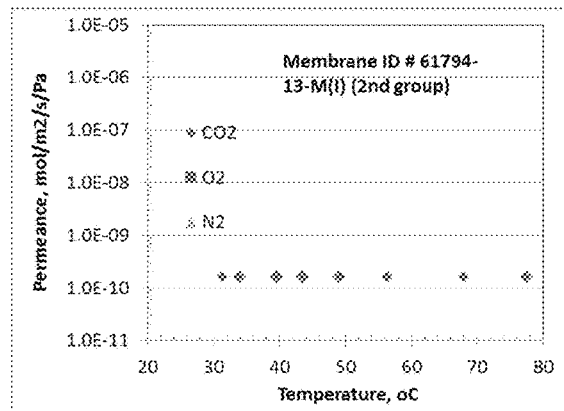
47B Dry gas at different temperatures
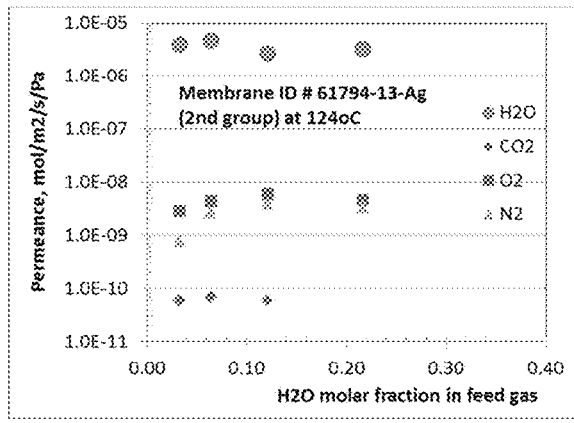
47C Gas mixture with different $H_2O$ content
FIGS. 47A -47C
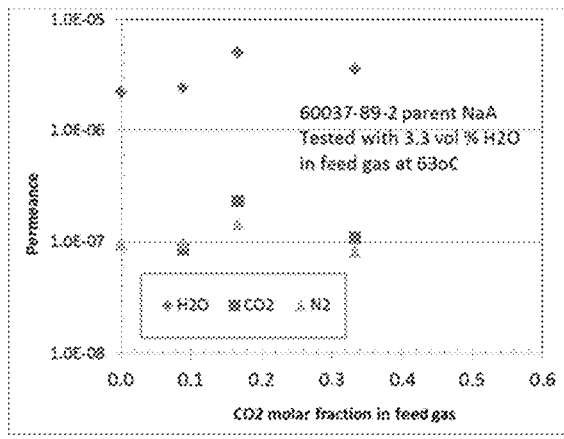
48A Humid gas with different $H_2O$ content
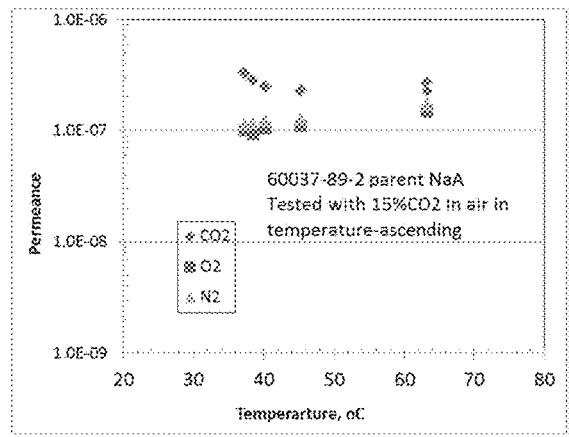
48B Dry gas at different temperature
FIGS. 48A and 48B

49A NaA/Ni membrane as prepared

49B NaA/Ni membrane tested

49C Ag ion-exchanged NaA/Ni after test

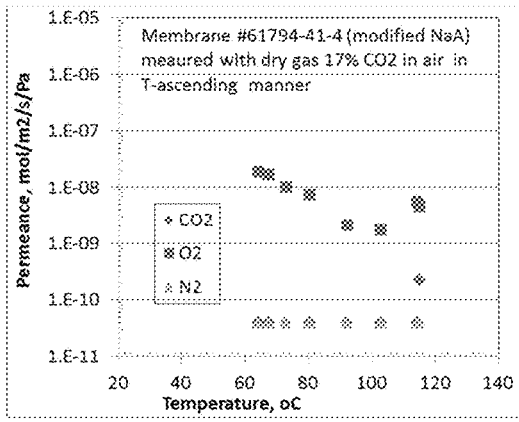
50A dry gas at different temperatures
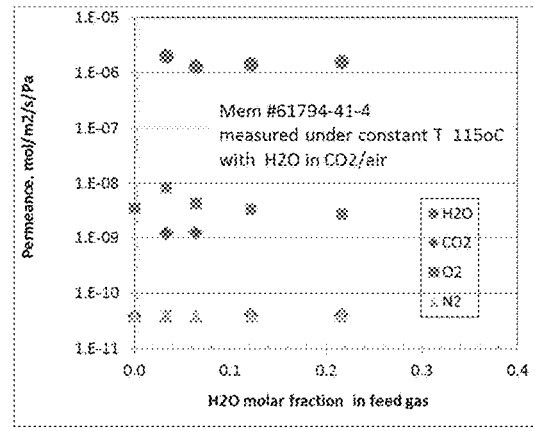
50B Different $H_2O$ content at 115°C
FIGS. 50A and 50B
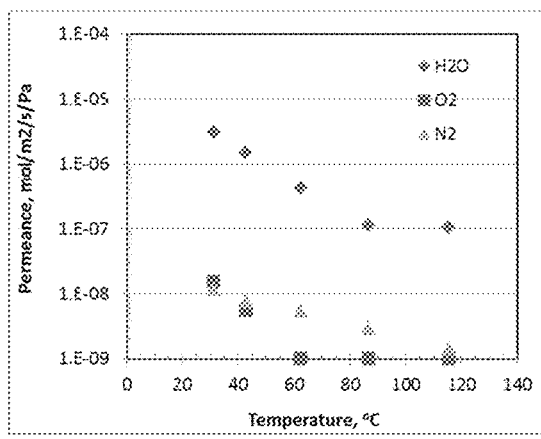
51A 3.3 mol% $H_2O$ feed gas
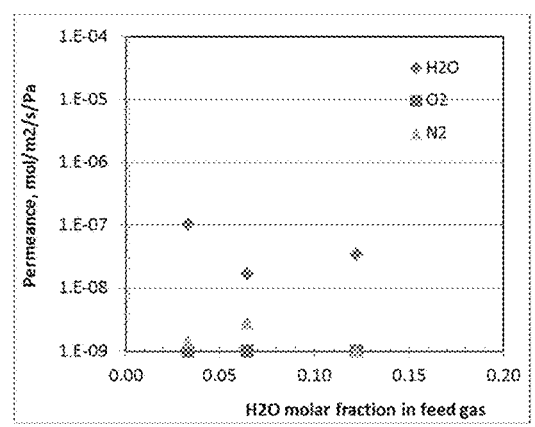
51B Different $H_2O$ content at 115°C
FIGS. 51A and 51B
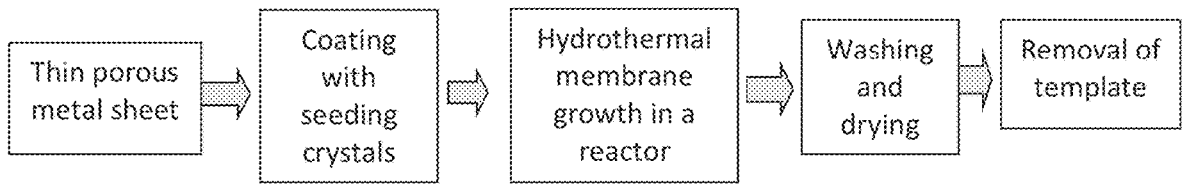
FIG. 52

53A Membrane separation driven by a vacuum pump

53B Membrane separation driven by gas sweep 54A as-synthesized    54B calcined 55A 0.15 mg/cm² of calcined seeds 55B 0.24 mg/cm² of calcined seeds 55C 0.18 mg/cm² of as-synthesized seeds 55D 0.27 mg/cm² of as-synthesized seeds

56A Surface texture of mem #99-95-1　　56B Cross-section of mem #99-95-1

56C Surface texture of mem #99-97-3　　56D Cross-section of mem #99-97-3

56E Surface texture of mem #99-97-4　　56F Cross-section of mem #99-97-4

THIN-SHEET ZEOLITE MEMBRANE AND METHODS FOR MAKING THE SAME

CROSS REFERENCE TO RELATED APPLICATIONS

This application claims priority from and is a divisional of currently pending U.S. patent application Ser. No. 14/733,735, filed Jun. 8, 2015, which claims priority from and is a continuation-in-part of U.S. patent application Ser. No. 13/032,752, filed Feb. 23, 2011 (now U.S. Pat. No. 9,079,136, issued Jul. 14, 2015), which claims priority from and is a continuation-in-part of U.S. patent application Ser. No. 12/817,694, filed Jun. 17, 2010 (now abandoned), and is a continuation-in-part of U.S. patent application Ser. No. 12/470,294, filed May 21, 2009 (now U.S. Pat. No. 8,673,067, issued Mar. 18, 2014). U.S. patent application Ser. No. 12/817,694 also claims priority from U.S. Provisional Patent Application 61/218,521, filed Jun. 19, 2009. Each of the aforementioned applications is incorporated herein by reference in their entirety.

ACKNOWLEDGEMENT OF GOVERNMENT SUPPORT

This invention was made with government support under Contract Nos. DE-AC0576RL01830, DE-AR0000138, DE-AR0000372, and DE-FC36-04G098014 awarded by the U.S. Department of Energy. The government has certain rights in the invention.

FIELD

The present disclosure relates to membranes, specifically to thin-sheet zeolite membranes, materials and methods of making and using the same for selective gas separation, such as separation of $H_2O$ molecules.

BACKGROUND

While membrane separation is viewed as an energy and capital efficient process, present membrane technologies can often fall short of performance requirements for many separation and reaction tasks. For example, polymeric membranes can be degraded by hydrocarbons that exist in many industrial processes. The polymeric membranes operate at relative low temperatures. The permeation flux and selectivity of the polymeric membrane is relatively low. Inorganic and ceramic membranes, including zeolites, supported on porous substrates can provide high permeation flux and separation selectivity while exhibiting chemical and thermal stability. However, they are typically fragile and are generally made as membrane tubes with a surface area packing density much smaller than the polymeric membranes.

Zeolites are made of in-expensive raw materials and possess some unique properties, such as molecular sieving functions and stability. Particularly, the zeolite framework is stable in hydrocarbon or organic solvent medium and at elevated temperatures. These are very desirable attributes as a membrane material. Thus, there has been a strong interest to making zeolite membranes worldwide. The feasibility of making zeolite membranes and their unique molecular-sieving functions were demonstrated in late 1990s and early 2000s. The reported flux and selectivity of a zeolite membrane can be one or two orders of magnitude higher than the polymeric membranes for solvent dehydration. Mostly small ceramic disks and single-hole tubes were used as a support to elucidate membrane preparation and structures, and to demonstrate basic separation process concepts. Such supporting materials served those research purposes well. For actual membrane product development, however, novel product designs and manufacturing processes are needed to produce large membrane areas suitable for industrial applications at a cost competitive with existing separation technologies.

For recent two decades, there has been research publications around NaA-type and other zeolite membranes. The NaA membrane supported on ceramic alumina tubes has been commercialized for ethanol and solvent dehydration. Instead of single holes, several holes can be made into one membrane tube to increase the membrane area packing density. However, the tubular membrane cost cited in the literature is viewed too high for widespread usage. Membrane area packing density is another key issue to applications requiring large membrane areas.

The area packing density increases with decreasing the tube diameter. Exploratory studies of capillary inorganic membrane tubes have been reported with an attempt to achieve dramatic enhancement of the membrane area packing density. The feasibility to deposit a quality NaA membrane on an alumina hollow fiber of 1.2 mm O.D×0.6 mm thickness was shown. The ceramic capillary tubes tend to be brittle. An alternative is development of ceramic monolithic membranes. In the monolithic membrane body, a number of small membrane channels (<1.0 mm) are embedded in a sturdy, porous ceramic matrix so that making and packaging of individual, fragile capillary tubes is avoided, and manufacturing productivity of the membrane can be enhanced at the same time. The monolithic designs represent promising progress toward getting the surface area packing density of inorganic membranes close to polymeric hollow fiber membranes.

The attempt to make flat sheet zeolite membranes has been reported in the literature using sintered porous metal plates and metal meshes as a support. However, those porous metal supporting structures had rough pores and were too thick. The thick support is associated with high metal material costs and mass transport resistance. The rough pore of the support requires thick coating of modification and/or membrane layer. The thick coating adds membrane preparation complexity and presents potential adhesion/crack problems.

Inorganic membranes can have distinct advantages regarding resistance to degradation by various chemicals, stability at elevated temperatures, and high permeation flux and selectivity. Inorganic membranes are typically tubular in shape or are thick coatings on thick substrates. Tubes are commonly associated with relatively lower surface area packing density and higher cost per unit membrane area and engineering cost. Thick membranes have traditionally been important to seal defects such as pinholes and void structures present in thin membrane films, which are typically caused by less-than-ideal preparation procedures for the substrate structure and membrane. The thicker membranes generally provide low permeation flux and are associated with adhesion problems when the membrane and substrate are two different kinds of materials. For example, thermal mismatch between the membrane coating and substrate material can become pronounced with increasing the membrane thickness. A thick substrate (1 mm or above) is typically used in the conventional zeolite membrane synthesis due to the strength requirement. Porous ceramic tubes or disks are fragile and can easily be broken if made thin. Conventional metal screens or foams have large pores and are weak if made thin. Furthermore, thick substrates can increase the cost and weight of the membrane structure. Thicker substrates also impose additional resistance for the permeate to move through. These issues, and others, have been a major barrier hindering the development of efficient, thin, inorganic membranes having widespread applicability.

SUMMARY

To reduce membrane fabrication cost and achieve high separation performances at the same time, disclosed herein are thin-sheet zeolite membranes. The disclosed zeolite membrane are as thin as metal foils and papers so that the membrane sheets can be manufactured with high throughput at competitive costs and packaged into membrane modules of area packing density as high as polymeric membrane sheets. This unique combination of performance attributes has not been obtained yet with conventional ceramic or polymeric materials alone. As such, methods to manufacture thin-sheet zeolite membranes by direct deposition of a pure, continuous, inter-grown zeolite crystal layer on thin porous support sheets are disclosed. The fundamental feasibility was studied with model simulation of the stress distribution. The zeolite film thickness and its penetration depth into underneath support pores are important membrane design parameters. For a given membrane/support pair of different thermal expansion coefficients, it is desirable for these two parameters to be maintained below a certain value to avoid membrane cracks caused by the thermal stresses, which could be induced during membrane preparation and usage. In particular, the inventors evaluated a 50 μm-thin porous metal sheet formed as a membrane support and NaA (4A) as an exemplary zeolite framework. Molecular separation functions of the resulting membranes are characterized with $H_2O$/air gas-phase separation tests. Selective removal of water vapor from humid air has large application opportunities for air dehumidification in buildings and in industrial processes as well. In addition, selective $H_2O$/air separation presents more stringent selectivity requirement than separation of $H_2O$ from other lager molecules such as alcohols. Secondary growth was demonstrated as one effective method to make the proposed membrane. The support surface textures are also vital for formation of a continuous, dense zeolite membrane layer. The support surface needs to be substantially free of any holes, pores, and cavities above 10 μm. The preferred support porosity is from 20% to 50%. $H_2O$ permeance of 1.0E-5 mole/s/m$^2$/Pa with $H_2O/N_2$ separation factor above 3000 can be obtained with an optimum membrane.

The present invention teaches thin but robust zeolite membrane sheets comprising a zeolite membrane formed directly on a thin metal support sheet. The membrane sheets exhibit combined performance attributes, which include high flux and selectivity, chemical and thermal stability, mechanical flexibility and strength, and high surface area packing density, that are not be provided by conventional polymeric, ceramic or metallic membrane products.

Embodiments of the present invention include thin zeolite membrane sheets and methods of making the same. The zeolite membrane sheets comprise a zeolite membrane layer having a thickness of less than or equal to 20 μm, such as less than 10 μm (e.g., between 2 μm and 10 μm, 3 μm and 9 μm, 3 μm and 5 μm, 4 μm and 8 μm, including 1 μm, 2 μm, 3 μm, 4 μm, 5 μm, 6 μm, 7 μm, 8 μm, 9 μm, or 10 μm) formed above a thin porous metal support sheet having a thickness less than or equal to approximately 200 μm, such between 20 μm and 200 μm and the zeolite membrane layer having a penetration depth of less than about 20 μm, such as 5 μm (e.g., such as between 2 μm and 10 μm, 3 μm and 9 μm, 3 μm and 5 μm, 4 μm and 8 μm, including 1 μm, 2 μm, 3 μm, 4 μm, 5 μm, 6 μm, 7 μm, 8 μm, 9 μm, or 10 μm) formed below the support surface. In some embodiments, the zeolite membrane layer has a thickness of less than 20 μm and is formed on a thin porous metal support sheet having a thickness less than or equal to approximately 200 μm. The zeolite membrane layer is formed by applying a uniform seeding layer to a bare metal surface of the porous metal support sheet at a loading of 0.03 to 0.5 mg of seeding crystals per cm$^2$ of the support surface. In one example, a support sheet is substantially free of any holes, pores and/or cavities greater than 10 μm and the support sheet has a porosity from 20% to 50%. Substantially-free is a phrase used to describe a condition in which no cavities and/or cracks can be visually seen on the support sheet by a person with normal vision, no light transmission through the support sheet can be seen when the support sheet is against a visible light source, and no large holes or pores greater than 10 μm can be seen when a sample of the support surface is observed under microscopy (scanning electron microscopy (SEM) or high-resolution optical microscopy) or the probability for observation of such large defects under microscopy is less than 1%. For example, metal meshes that can readily transmit visible light are not suitable support for present invention. Thick sintered metal plates and porous metal foams that do not transmit visible light, but show rough pores greater than 10 μm under microscopy even though their average pore sizes can be well below 10 μm are not the suitable support for present invention. In some examples, the seeding layer comprises parent zeolite crystals having an average particle size less than or equal to 3 μm, such as between 0.1 to 2.0 μm, as seeds for zeolite membrane growth. The particle size of seeding crystals is typically determined by use of a standard particle size analyzer (Micotrac) when they are dispersed in a seed coating solution. The larger particles in the seed coating solution typically sediments on the bottom of the bottle and are not used for seed coating. The seed coating solution is preferably wettable on the support surface so that certain penetration of the seed coating solution into the support pores can occur to let some seeding crystals sit inside the support pores. The seed coating solution is typically water-based, and some solvent and additives may be added to modify the surface tension and contact angle of the solution on the support surface. The seed coating solution can be prepared by dispersing the parent zeolite crystals, which is often in powder form, into a fluid at solid loading of 1 to 6 wt. %. The coating solution needs to be homogeneous and stable during the seed coating process. If the parent zeolite powder comprises distinctive, small particles, the zeolite powder may be simply dispersed by stirring. If the parent zeolite powder comprises agglomerates, the powder can be ball-milled or attrition-milled in the dispersing fluid into the mean particle size of about 0.2 to 2.5 μm. Crystal purity of the parent zeolite material to be used as seeding crystals needs to be confirmed by XRD analysis. The ball-milling or attrition-milling is controlled in such a degree that no significant degradation of the parent zeolite crystal occurs. The seed coating is preferably conducted by spray or dip-coating so that presence of excessive coating solution on the support surface is minimized. In some examples, the seeding layer comprises zeolite crystals having an average diameter less than or equal to 2.0 μm. For example, an exemplary porous metal support sheet comprises an average pore size of less than 3 μm, a porosity between 30% and 45% and a thickness of less than or equal to 200 μm, such as between 25 μm and 200 μm and is coated with a seeding layer comprising zeolite crystals between 1.0 μm to 1.4 μm. In some examples, methods of preparing the membrane are disclosed which include coating of the support sheet surface with a seed coating solution containing the parent zeolite crystals with mean particle sizes from about 0.1 to 2.0 microns at loading of 0.05-0.5 mg/cm$^2$ without forming a continuous, distinctive seed coating layer, which can be determined by change of the support surface appearance from metallic lusters into white-colored paintings. The optimum seed loading on the support surface is that the support surface is fully decorated by the seeding crystals and support pores are filled by the seeding crystals, but there is no formation of thick coating layers, patches or spots. The thick coating can readily cause defects in the membrane growth.

The seeded support sheets are loaded into a hydrothermal growth reactor to form a dense, continuous, inter-grown zeolite membrane layer. The membrane sheets in the growth reactor are fully immersed in the growth solution. The growth solution is prepared in proper procedures with proper compositions specifically for growth of the targeted zeolite framework. The preparation procedures and compositions for growth NaA-type, Faujasite-type, and modern framework inverted (MFI)-type zeolite membranes will be described in the respective examples. The growth solution needs to be homogeneous and stable. The stability of the growth solution can be assessed by no significant phase segregation or precipitation in one hour when the solution is left still. A number of seeded sheets can be loaded into one reactor by having a gap between the sheets, such as 1-mm gap. The seeded sheets are preferably vertically oriented in the reactor. The reactor is built and operated in such a way that the temperature distribution in the growth zone is uniform. For example, a planar reactor can be made by applying uniform heating on the two reactor plates with a small spacing, and the growth solution is heated up by thermal conduction. The growth conditions are controlled to avoid under growth or over growth. In the under growth, a continuous membrane layer is not formed and the zeolite membrane crystal is not fully grown. In the over growth, the zeolite membrane layer is grown too thick and/or there are too much deposition of crystals and/or particles from bulk solution onto the membrane layer. The reaction heating rate is typically 1° C./min. For growth of NaA-type and Faujasite-type zeolite membranes, the preferred growth temperature and holding time at the growth temperature are 60° C. to 110° C. and 0 to 15 hours, respectively. For growth of MFI-type zeolite membrane, the preferred growth temperature and holding time are 120° C. to 160° C. and 1 to 4 hours, respectively.

In other examples, an exemplary porous metal support sheet with at least one surface comprises an average pore size of less than 3 μm with substantially free of pores and defects greater than 10 μm, a porosity between 15% and 55%, and a thickness of less than or equal to 200 μm. The pore size of a support surface is preferably determined by the mercury porosimetry or microscope. As a membrane support of present invention, knowing the average pore size is not sufficient, and the support surface must be substantially free of defects greater than 10 μm, preferably the probability of presence of such large defects on a support surface is <1%. The support sheet coated with the seeding crystal is immersed in a zeolite growth solution to hydrothermally form an inter-crystal growth layer and complete the zeolite membrane layer. The inter-crystal growth layer incorporates the seeding layer, comprises the same zeolite as the zeolite crystals, and completes formation of the continuous zeolite membrane layer to a thickness less than or equal to approximately 20 μm, such as less than or equal to 10 μm, including between 1.0 μm and 5 μm. The membrane growth can be characterized by growth weight gain, and the preferred growth weight gain is 0.3 to 3.0 mg/cm2 of the support surface. The membrane thickness is checked by cross-section analysis of the membrane sheet under microscopy. Since the porous metal substrate and zeolite membrane layer are two different materials and have different chemical compositions and coefficients of thermal expansion, the thinness of the zeolite membrane layer is critical to avoid formation of cracks by withstanding stresses induced during membrane processing and membrane separation operation. There is no chemical bonding between the zeolite crystals and support. Having an adequate growth penetration depth of zeolite membrane layer into underneath support is necessary to have good membrane adhesion by mechanical interlocking. This is controlled by seed coating and growth. There is a fraction of seeding crystals in the seed coating solution with smaller sizes than the support surface pores to sit in the support pore. The seed coating is not too thick and the growth solution is not too concentrated so that secondary growth can start from exterior pores of the support, not just on the outer surface of the seed coating layer.

In some embodiments, the zeolite material comprises a water selective zeolite, a hydrocarbon-selective zeolite, or an alcohol-selective zeolite. Exemplary water-selective zeolites include, but are not limited to NaA-type framework that may be exchanged with different metal ions, and Faujsite-type frameworks (NaX and NaY). Exemplary hydrocarbon-selective and alcohol-selective zeolites include, but are not limited to pure silicalite, titanium silicate, and MFI-type and Y-type zeolite frameworks.

The metal support sheet preferably comprises porous Ni, a porous Ni alloy, or a porous steel. However, porous metal support sheets having one support surface that has an average pore size less than 3 μm with large pores and defects greater than 10 μm less than 1% of the support area, a porosity between 15% and 55%, such as between 30% and 45%, and a thickness less than or equal to 200 μm, such as 20 μm to 200 μm, can be suitable when the zeolite is formed directly on the bare surface of the support sheet without an intervening transition layer such as a ceramic material having a different composition than the zeolite membrane.

In some embodiments, the seeding layer can be formed by providing application of single solution containing the parent zeolite seeding crystals, such as by spraying. Multiple times of spraying may be performance to enhance uniformity of the deposition with intermittent drying. Spray coating is developed as a simple method to lay down the seeding crystals on the support sheet. An appropriate seed loading surface density (mg/cm$^2$) is necessary to grow a quality membrane without good adhesion and high permeance without defects and cracks. For example, the membrane layer thickness between 1 and 20 μm above the support surface and penetration depth greater than zero and less than <6.0 μm below the support surface were found with the membranes that are stable exhibiting both high permeance and selectivity when the membrane sheet is subject temperature changes during growth, post-treatment and application. In some examples, the disclosed methods include coating the support sheet surface with a seed coating solution containing the parent zeolite crystals with mean particle sizes from about 0.1 to 3.0 microns at loading of 0.05-0.5 mg/cm$^2$ and subsequent growth of the seeded sheet in a growth reactor loaded with a growth solution over a temperature range of about 60° C. to about 160° C. for 0 to 7 hours.

In other embodiments, the seeding layer can be formed by performing multiple applications of the zeolite crystals in a graded structure. Accordingly, initial zeolite seeding particles, closest to the porous metal support sheet, would be relatively larger, having average diameters between 1.0 and 3 μm, and the seeding particles in subsequent applications are smaller less than 1.0 μm. Some penetration of the seed crystals into the underneath support pores is preferred in order to obtain mechanic inter-locking between the zeolite membrane and the substrate sheet. However, significant filling of the support pores by the seeding particles should be avoided to minimize the stress induced to the support and minimize mass transport resistance across the support. The thin-sheet zeolite membranes of present invention can be packaged into a high throughput membrane module to conduct actual separation processes. Since the thin-sheet zeolite membrane can be made as thin and flexible as polymeric membrane sheets, the zeolite membrane sheet can be made like polymeric membrane modules, such as spiral-wound module and plate-type module. Since the zeolite/metal sheet has good mechanical strength and rigidity, new membrane modules may be designed and built according to specific application needs. Since the zeolite membrane sheet is so thin, a large membrane area can be packaged per unit module volume. For example, if 50 μm-thick zeolite membrane sheets are arranged with 1.0 mm spacing in a module, a membrane area packing density can be as high as 1000 $m^2/m^3$.

Molecular separation with the thin-sheet zeolite membrane is carried out by creating a differential in partial pressure or chemical potential of the permeate molecule between the two sides of the membrane. The membrane side of the sheet is exposed to a feed stream, while the backside of the sheet acts for the permeate. In one common practice, the permeate side can be maintained a lower pressure than the feed side. In such an arrangement, the membrane sheet is strong enough to withstand the pressure gradient. In another common practice, the permeate side of the membrane can be swept by a fluid when the two sides of the membrane sheet are kept at the similar pressure.

The presently disclosed membranes can be used in association with membrane separation and membrane reactors resulting in higher energy efficiency and/or lower capital costs. There are a range of energy conversion and environmental applications, such as, atmospheric air dehumidification for buildings and people comfort in other living systems, process water removal, ethanol or high alcohol production from biomass, $CO_2$ capture from a gas mixture, and removal of particular hydrocarbons from solvents or hydrocarbon mixtures.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

The foregoing features of the disclosure will become more apparent from the following detailed description, which proceeds with reference to the accompanying figures.

BRIEF DESCRIPTION OF THE DRAWINGS

FIGS. 5A and 5B illustrate probability distribution of stress in the region near the interface for the four different porous Ni substrate cases, $h_0$=10, $h_1$=4, in unit of μm and ΔT=200K FIG. 6 provides two dimensional stress distributions on the center plane A for the case ΔT=200K, and $h_1$=4, and different $h_0$=4, 8, and 12. in unit of μm.

FIG. 7 provides two dimensional stress distributions on the center plane A for the case ΔT=200K, and $h_0$=10, and different $h_1$=2, 4, and 6. in unit of μm.

FIGS. 8A and 8B provide probability distribution of stress in the region near the interface for the cases, ΔT=200K porous structure (Case 3), $h_0$=10, and different $h_1$=0, 2, 4, 6, and 8. in unit of μm.

FIGS. 10A and 10B illustrate pore size distribution of porous nickel sheets of two different thicknesses FIGS. 11A-11D are scanning electron microscope (SEM) images illustrating pore structures of 50 μm-thick porous Ni sheets prepared and used for zeolite membrane preparation.

FIGS. 13A-13D are SEM images illustrating textures of a porous Ni sheet seeded with micro-A and nano-A coating solutions sequentially (seeded support for growth of membrane 27-26-4, 3 wt. % solid loading in both seeding solutions, 0.278 mg/$cm^2$ total seed loading).

FIGS. 14A and 14B are digital images of surface textures of membrane an exemplary membrane (#9-7-4 membrane).

FIGS. 15A1-15E2 provide cross-sectional views of membranes grown under the same conditions on supports of different seeding crystal loadings (3.5 hours hold at 90° C.).

FIGS. 24A-24D are SEM images of surface textures of 150 μm-thick porous Ti support as-received, after seed coating, and after secondary growth.

FIGS. 25A and 25B are SEM images of surface textures of 43 μm/250 μm porous Ti support after seed coating and growth.

FIGS. 26A-26C are SEM images of surface textures of 43 μm/140 μm porous Ti support as-received, after seed coating, and after secondary growth.

FIG. 35 is a schematic illustrating an exemplary method for preparing Faujasite membranes according to the present invention.

FIGS. 36A and 36B are SEM images of synthetic NaY and NaX received from a commercial source (Wako) as seeding crystals.

FIG. 37 is an XRD analysis of as-received NaY powder used for NaY seeding crystal preparation.

FIG. 38 is an XRD analysis of as-received NaX powder used for NaX seeding crystal preparation.

FIGS. 39A-39C are SEM images illustrating crystal morphologies of Faujasite powder grown with different holding time at 90° C. (sample #60037-38).

FIGS. 47A-47C are graphs illustrating elective $H_2O$ permeance properties of NaA/Ni membrane modified by Ag ion exchange (membrane ID 61794-13-Ag).

FIGS. 48A and 48B are graphs illustrating gas permeance of parent NaA/Ni membrane (membrane ID 60037-89-2).

FIGS. 50A and 50B are graphs illustrating gas permeance of Ag ion-exchanged NaA/Ni membrane (ID61794-41-4).

FIGS. 51A and 51B are graphs illustrating gas permeance of Nafion N115-3 membrane.

FIG. 52 is a schematic illustrating exemplary process steps of MFI-type membrane preparation of present invention FIGS. 53A and 53B provide process flow diagrams for application of ethanol-selective MFI-type membrane to concentration of dilute alcohols in water.

DETAILED DESCRIPTION

Figures 1A, 1B:
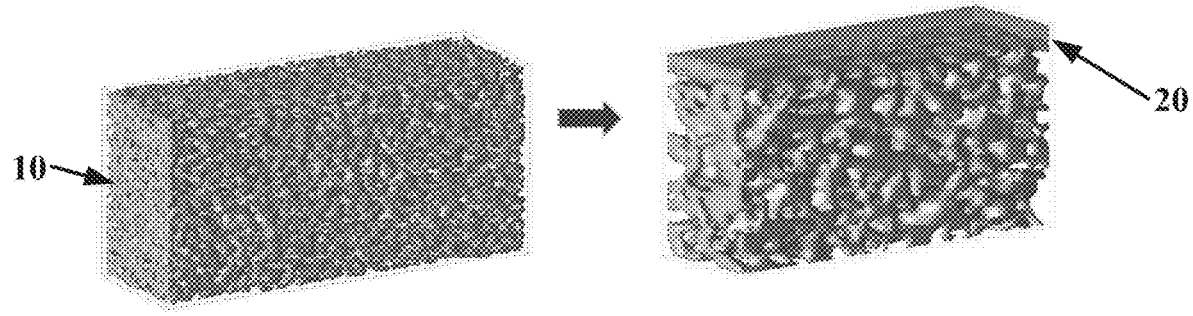
FIGS. 1A and 1B each provide a schematic of an exemplary membrane.
Figures 2A, 2B, 2C, 2D:
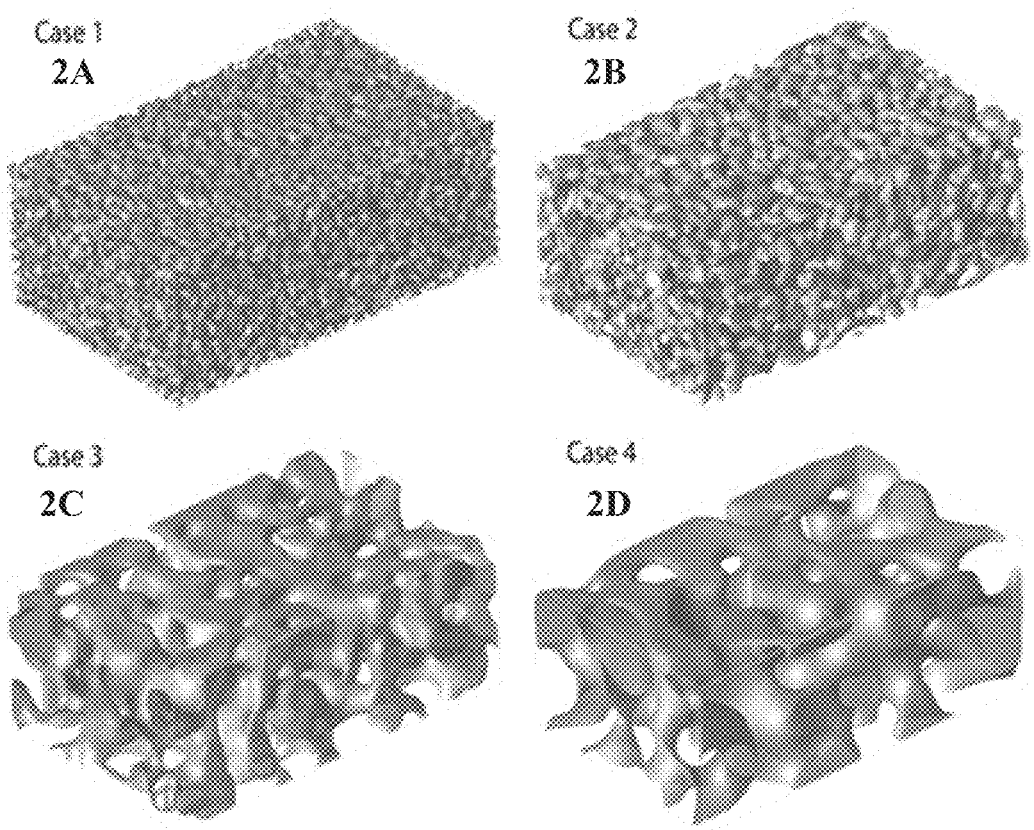
FIGS. 2A-2D provide phase-field generated porous structures with different pore sizes, but the same pore volume fraction (50%) (dimensionless pore size $\phi_p$ ($d_p$/h0)=0.12 for case 1, 0.25 for case 2, 0.81 for case 3, and 1.1 for case 4).

I. Abbreviations and Terms i. Abbreviations $\rho_s$=packing density of seed coating, g/cm³
$\rho_m$=packing density of membrane coating, g/cm³

$\delta_s$=nominal seed coating thickness, μm
$\delta_m$=nominal membrane coating thickness, μm
$\omega_s$=seed loading density, mg/cm$^2$
$\omega_m$=membrane growth density, mg/cm$^2$
$\Delta p_i$=partial pressure differential of species i between the feed and permeate side
$F_i$=permeation flow rate of specie i, mol/s
$J_m$=permeation flux, Kg/m$^2$/hr
$P_i$=permeance of specie i, mol/m$^2$/s/Pa
$S_{ij}$=separation factor of specie i to j
$SA_m$=working surface area of membrane
$SA_s$=area of the seed-coated support sheet.
$SA_m$=area of the membrane grown, cm$^2$
t=testing duration time to collect $W_p$
$W_p$=amount of liquid condensed in the liquid $N_2$ trap from the permeate
$W_m$=weight of the sheet after growth, mg
$W_o$=weight of bare support sheet, mg
$W_s$=weight of seed-coated sheet, mg
$W_o$=weight of bare support sheet, mg
$x_i$=molar fraction of specie i in feed side
$x_j$=molar fraction of specie j in feed side
$y_i$=molar fraction of specie i in permeate side
$y_j$=molar fraction of specie j in permeate side ii. Terms Unless otherwise noted, technical terms are used according to conventional usage. Further, unless otherwise explained, all technical and scientific terms used herein have the same meaning as commonly understood by one of ordinary skill in the art to which this disclosure belongs. The singular terms "a," "an," and "the" include plural referents unless context clearly indicates otherwise. Similarly, the word "or" is intended to include "and" unless the context clearly indicates otherwise. It is further to be understood that all base sizes or amino acid sizes, and all molecular weight or molecular mass values, given for nucleic acids or polypeptides are approximate, and are provided for description. Although methods and materials similar or equivalent to those described herein can be used in the practice or testing of this disclosure, suitable methods and materials are described below. The term "comprises" means "includes." The abbreviation, "e.g." is derived from the Latin exempli gratia, and is used herein to indicate a non-limiting example. Thus, the abbreviation "e.g." is synonymous with the term "for example."

Unless otherwise indicated, all numbers expressing quantities of ingredients, properties such as molecular weight, percentages, and so forth, as used in the specification or claims are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is recited.

All publications, patent applications, patents, and other references mentioned herein are incorporated by reference in their entireties. In case of conflict, the present specification, including explanations of terms, will control. In addition, all the materials, methods, and examples are illustrative and not intended to be limiting. In order to facilitate review of the various embodiments of the disclosure, the following explanations of specific terms are provided:

Absorption: A physical or chemical phenomenon or a process in which molecules in a gas phase are taken up into the bulk of a fluid of other matter, such as liquid fluid or solid-state fluid. Absorption is a different process from adsorption, since the molecules are taken up in the bulk of other matter, not by the surface of other matter. A more general term is sorption, which covers adsorption, absorption, and ion exchange.

Liquid Fluid: A fluid that has the particles loose and can freely form a distinct surface at the boundaries of its bulk material. Examples of liquids include water and oil.

Membrane support: The membrane support is a structure having a surface for deposition or coating of a selective membrane. The membrane support is permeable so that a molecule separated by the membrane can readily permeate through the membrane support. The membrane support provides mechanical integrity for a supported membrane.

Moisture: Any type of precipitation. In one example, moisture refers to the presence of water in air and gases, often in vapor phase.

Permeance or permeation: The degree to which a material admits a flow of matter or transmits another substance with unit of driving force. Permeable materials are those through which gases or liquids may pass. Membranes are one type of permeable material and are composed of thin sheets of natural or synthetic material. Frequently, membranes exhibit different permeances—e.g., permeation rates—for different chemical species. In this regard, permselectivity is the preferred permeation of one chemical species through a membrane with respect to another chemical species. Permselectivity of the desired permeate with respect to another chemical species is calculated as the ratio of the permeance of the desired permeate to the permeance of the other chemical species. Permselective membranes are promising in a variety of applications including gas separation, electrodialysis, metal recovery, pervaporation and battery separators.

Pore: One of many openings or void spaces in a solid substance of any kind that contribute to the substance's porosity. Porosity is a measure of the void spaces or openings in a material, and is measured as a fraction, between 0-1, or as a percentage between 0-100%.

Porous: A term used to describe a matrix or material that is permeable to fluids. For example, a porous matrix is a matrix that is permeated by an interconnected network of pores (voids) that may be filled with a fluid (such as a liquid or gas). In some examples, both the matrix and the pore network (also known as the pore space) are continuous, so as to form two interpenetrating continua. Many materials such as cements, foams, metals and ceramics can be considered porous media. In one example, a porous matrix is a nickel matrix prepared by the method of fabrication disclosed herein.

Selective Permeation: A process that allows only certain types of molecules or ions to pass through a material, such as a membrane. In some examples, the rate of passage depends on the pressure, concentration, and temperature of the molecules or solutes on either side of the membrane, as well as the permeability of the membrane to each solute. Depending on the membrane and the solute, permeability may depend on solute size, solubility, or other chemical properties. In one example, the membrane is selectively permeable to H2O as compared to O2.

Solubility: A physical property of a liquid multi component system describing its ability to dissolve a substance, the solute, at a specific temperature and pressure from another phase. Solubility is measured as the maximum quantity of a substance that may be dissolved in another, for example it is the maximum amount of solute that may be dissolved in a solvent.

II. Overview of Several Embodiments

The following description includes the preferred best mode as well as other embodiments of the present invention. It will be clear from the description of the invention that the invention is not limited to the illustrated embodiments but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed. On the contrary, the invention is to cover all modifications, alternative constructions, and equivalents falling within the spirit and scope of the invention as defined in the claims.

Rather than using nano-metallic particles to form the thin, porous metal support sheets, embodiments of the present invention start with less-ductile metal precursor materials such as oxides, hydroxides, hydrides, and metal-organics that can be acquired from commercial sources at bulk quantities. The less-ductile metal precursors in powder form after milled to suitable particles sizes such as micrometers and submicrometers are mixed with pore formers and other additives to form a homogenous slurry batch at micro- and nano-scale mixing. The slurry is cast into plates or sheets. The green sheet is dried at low temperatures to generate some-pores inside the body, which allows gas permeate inside in the subsequent step. Then, the metal precursor(s) is converted into metallic state or alloy by an appropriate high-temperature reaction processes, such as, direct reduction by $H_2$ gas at temperatures above 750° C. The metal crystal size and sintering can be controlled by the reaction conditions (temperature, time, and gas purity). A continuous hydrogen gas flow in the reduction reactor is preferred. This process step results in a metallic backbone of uniform pore sizes at micrometer or sub-micro-meter level. Optionally, the porous metal sheet can be annealed by applying a load onto the sheet during annealing to keep the sheet flat and minimize warping. The support sheet synthesis technique described above allows decoupling of material forming process at atomic, nano-, micro-, and macro-scales. Different from traditional metal foaming and sintering processes, embodiments of the present invention use non-metallic precursor materials, produce smaller and uniform pores, and utilize the porous network for tailoring of the metal grain and bonding. The porous metallic sheets can be made symmetric by use of single green tape, i.e., the same or similar pore structures on both side of the metal sheet. The porous metallic sheets can be made with a graded structure by use of laminated green tapes with different compositions, i.e., different pore structures on the two surface of the membrane sheet. Once the support sheet is formed, it is available for formation of a zeolite membrane layer on at least one side of the sheet (such as the front side). In the examples to demonstrate this invention, 50 μm-thick Ni alloy sheets of symmetric pore structures were made by use of single green tape, which was found to be a simple process. As-prepared metal sheets were examined prior to their usage for zeolite membrane deposition. First, the support sheets with any visible cracks, holes, marks, large cavities, and inclusion of large particles were rejected. Second, loose particulate on the membrane surface was removed by vacuum cleaning. Third, the metal sheet allowing visible light to go through was rejected. Fourth, the metal sheet that breaks at 90-degree bending was rejected. In one example, a zeolite membrane layer is grown directly on the porous metal support sheet having seeding crystals. The seeding crystals can be deposited or coated on the support by use of a seed coating solution comprising parent zeolite crystals of suitable sizes being dispersed in a water-based medium. The solution medium or carrier of the seeding crystal should be wettable on the support surface to be coated. The crystal phase of the seeding crystal is the same as the crystal phase of the zeolite membrane to be grown. While various zeolite materials can be suitable depending on the processing conditions and desired separations, preferably, the zeolite material for the seed crystals and the membrane layer are 4A (or NaA-type), Faujasite-type, MFI-type, or silicalite. An exemplary zeolite loading in the coating solution is 1-6 wt %, although other loadings can be suitable and appropriate. The proper particle size and solid loading of the seeding crystals are used to obtain a homogenous seed coating solution. The seeding solution can be made by sonication, ball-milling or attrition milling to break up larger particle agglomerates of the parent zeolite powder, resulting in a stable and uniform suspension. The large particle in the seed coating solution may be filtered out prior to coating.

In some instances, deposition of seeding crystals on the support is conducted by use of a single seed coating solution with mean particles from 0.1 to 3.0 μm, which is prepared out of one single source of parent zeolite powder. For example, methods of preparing the membrane are disclosed which include coating of the support sheet surface with a seed coating solution containing the parent zeolite crystals with mean particle sizes from about 0.5 to 2.0 microns at loading of 0.05-0.5 mg/cm2 and subsequent growth of the seeded sheet in a growth reactor loaded with a growth solution over a temperature range of about 50° C. to about 160° C. for 0 to 6 hours.

In other instances, multiple seeding solutions can be prepared each comprising a different average particle size or seeding crystal sizes. The seed coating can be conducted with multiple seeding solutions to avoid excessive penetration of the seeding crystals inside the support pores and excessive accumulation of the seeding crystals on the support surface. The particle size is the same as the crystal size only when the seeding crystals exist as distinctive, individual particles. In practice, seeding crystals often exist as particles comprising agglomerates of individual crystals. For example, a first solution can comprise the 1.5 μm average seeding crystals and a second solution can comprise 100 nm average seeding crystals. Preferably, the crystals used as seeding crystal are pure in terms of both chemical composition and crystal phase. Deposition of strange particulates or matters in the seed coating would likely cause membrane defects.

The seeding solution can be applied onto one side (i.e., the front side) of the porous metal support sheet by spraying, dip coating, slip coating or flow coating techniques. In any coating means, deposition of excessive coating solution on the support surface should be avoided. A protective layer can be applied to the opposite side of the support (i.e., the back side) to limit formation of the seeding layer to the front side. An exemplary protective layer can include a fluoropolymer material, such as polytetrafluoroethylene (PTFE), that is stable in the coating and growth solution. Generally, any material that can mask the back side to prevent accumulation of the seed coating solution on the backside of the support sheet can be suitable.

In one example, the front side of the porous metal support sheet contacts the seeding solution for a certain time typically ranging from a few seconds to one minute in spraying coating. The support sheet should contact with the coating solution in uniform manner to obtain a uniform coating. The other side of the support sheet is protected by a cover to prevent its contact from the solution. The zeolite seeding crystals are deposited on the support sheet surface by capillary force upon contacting. If the spray time is too short, in-sufficient amounts of the seeding crystal is deposited. If the spray time is too long, excessive solution tends to accumulate on the support surface, which can result non-uniform coating. The optimum solution/support contact time is dependent on the support sheet properties and solution properties. For example, a short time is needed if the seed loading in the solution is high and the support sheet is thin. After the support sheet/solution contact, the wet surface can be dried in ambient air, in an oven to dry, such as at 45 to 120° C., including 60 to 120° C. Multiple times of the spray coating may be conducted on the same support sheet using one single coating solution with intermittent drying to obtain uniform seed coating at a suitable loading level.

In other examples, the substrate is coated two times with different seed coating solutions. The first coating is made by using a solution having larger crystal sizes, while the second coating is made by using a solution having smaller size crystals. The sample is dried between the coatings. Additional coatings can be applied, but are not preferable. The multiple coatings can result in a graded coating structure. In some embodiments, the average seeding layer thickness is not more than three times the size of the pore opening in the support sheet. For example, for pore sizes of 1 μm, the seeding layer thickness should be less than 3 μm. Thicker coatings tend to result in delamination and/or mismatch between the zeolite layer and the metal support sheet.

After the seeding layer is dried, it is typically loose and does not yet comprise an acceptable zeolite membrane because of the voids between the zeolite seeding crystals. Accordingly, the zeolite membrane layer is completed by forming the inter-crystal growth layer. Inter-crystal growth is conducted inside a hydrothermal reactor. The seeded metal substrate sheet is placed inside a pressure vessel and completely immersed inside the growth solution. The growth is conducted at temperatures from 60 to 160° C. for 0 to 12 hours. The growth solution must be homogenous without significant phase segregation when it is placed still over one hour. The growth solution has suitable compositions for growth of the target zeolite framework. For example, NaA-type membrane is grown on the NaA-type seeding crystals with NaA-type growth solution, Faujasite-type membrane is grown on the Faujasite-type seeding crystals with Faujasite-type growth solution, and MFI-type membrane is grown on the MFI-type seeding crystals with MFI-type growth solution. The reactor can be pressurized to a value that keeps the water in liquid phase.

During the inter-crystal layer growth, zeolite crystal growth fills up the voids between the seeding crystals and bonds together, which results in a continuous, dense, strong layer. The dense, continuous zeolite membrane layer is surprisingly free of pinholes and gaps. The zeolite membrane layer leaves zeolite lattice channels as the only paths across which molecules can diffuse, thereby providing molecular sieving functionality. The hydrothermal growth may be repeated if some pin-holes remain.

The particular growth time and temperature can depend on the growth solution compositions and the kind of zeolite membrane being prepared. Generally, the zeolite crystal growth rate increases with temperature, and crystal size grows with time. Generally, a shorter growth time is needed with a higher growth temperature. However, the growth temperature may affect stability of the growth solution and/or support. For a given zeolite framework, growth temperature and growth time can be balanced to obtain a quality membrane. Insufficient growth tends to leave some voids and/or defects in the membrane. Over-growth can result in defected membranes and/or cause some side reactions. The defected membranes may comprise cracks, delamination, and/or inclusion of large bulk particles. The zeolite growth is preferred to occur on the seed-coated support surface and not anywhere else such as in the bulk solution or inside the support pores. Thus, the growth conditions are controlled in a way that a thin, dense zeolite membrane film is formed.

After the hydrothermal growth, the residual solution and any particulates on the sheet are rinsed away with water and may be further wiped out. The wet membrane sheet is left in the fume hood for drying. The dried membrane may then be subjected to an appropriate post-treatment. For example, if an organic template had been used in the growth solution such as in the case of MFI-type membrane growth, a heat treatment in oxygen/N2 or H2/nitrogen could be necessary to burn out the organic template. The Na-form NaA or Faujasite membrane may be modified by exchange with other metal ions, such as $Ag^{+1}$, $Li^{+1}$, $K^{+1}$, $Cs^{+1}$, $Ca^{+2}$, $Mg^{+2}$, $Cu^{+2}$, and $La^{+3}$. Ion exchange is a convenient way to change the zeolite membrane framework without going through the whole synthesis process, and to tailor the zeolite channel sizes and/or surface chemistry to meet specific application needs. The exterior surface of as-synthesized membrane may be modified through surface reactions with silanes and amine-functional groups to modify the chemistry and structure of the exterior surface of the zeolite membrane.

III. Exemplary Embodiment 1

A. Introduction

Zeolites are made of in-expensive raw materials and possess some unique properties, such as molecular sieving functions and stability. Particularly, the zeolite framework is stable in hydrocarbon or organic solvent medium and at elevated temperatures. These are very desirable attributes as a membrane material. Thus, there has been a strong interest to making zeolite membranes worldwide. The feasibility of making zeolite membranes and their unique molecular-sieving functions were demonstrated in late 1990s and early 2000s. The reported flux and selectivity of a zeolite membrane was one or two orders of magnitude higher than the polymeric membranes for solvent dehydration. Mostly small ceramic disks and single-hole tubes were used as a support to elucidate membrane preparation and structures, and to demonstrate basic separation process concepts. Such supporting materials served those research purposes well. For actual membrane product development, however, novel product designs and manufacturing processes are needed to produce large membrane areas suitable for industrial applications at a cost competitive with existing separation technologies.

Among various zeolite frameworks, 4A (NaA) zeolite membrane is the focus of this Example. It is contemplated that the disclosed membrane product design concepts and preparation methods discussed herein are applicable to other zeolite membranes. The A-type zeolite has a strong affinity specific to water molecule. Three A-type zeolite materials of respective pore sizes of 3A, 4A (NaA) and 5A have been widely used as an adsorbent in today's industrial drying processes, including natural gas and ethanol fuel dehydration. In adsorption or absorption processes, the saturated sorbent has to be periodically regenerated by varying temperature and/or pressure, and a significant amount of thermal energy needs to be supplied to compensate the heat of desorption. In membrane separation, water is continuously removed through the membrane without changing pressure and temperature of the process stream. The membrane separation is very desirable for drying and dehydration of process streams with large volume flow rates. Efficient drying and dehydration technologies are needed by many industries. Two noticeable application areas are air dehumidification for buildings and dewatering of ethanol fuels and bio-fuels in general. Air dehumidification is much needed to enhance air conditioning efficiency for buildings in hot and humid climate.

Figure 4A:
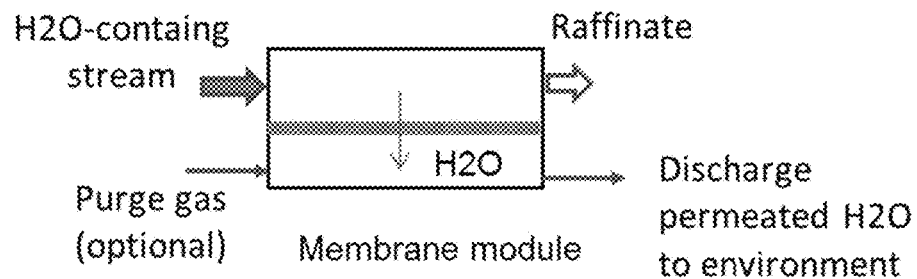
FIGS. 4A-4E provide schematics of methods of use of an exemplary membrane for water removal.

The H2O-selective membrane of present invention can be used for removal of water molecules from a variety of process streams with proper process configuration. FIG. 4A shows a simple method for removal of water molecules from a H2O-containing fluid under pressures, such as pressurized natural gas and air without recovery and usage of mechanical pumps. As the H2O-containing stream flows over the membrane surface, the water molecule permeates through the membrane driven by the pressure differential across the membrane and the permeated water vapor is discharged into atmospheric air or environment.

Figure 4B:
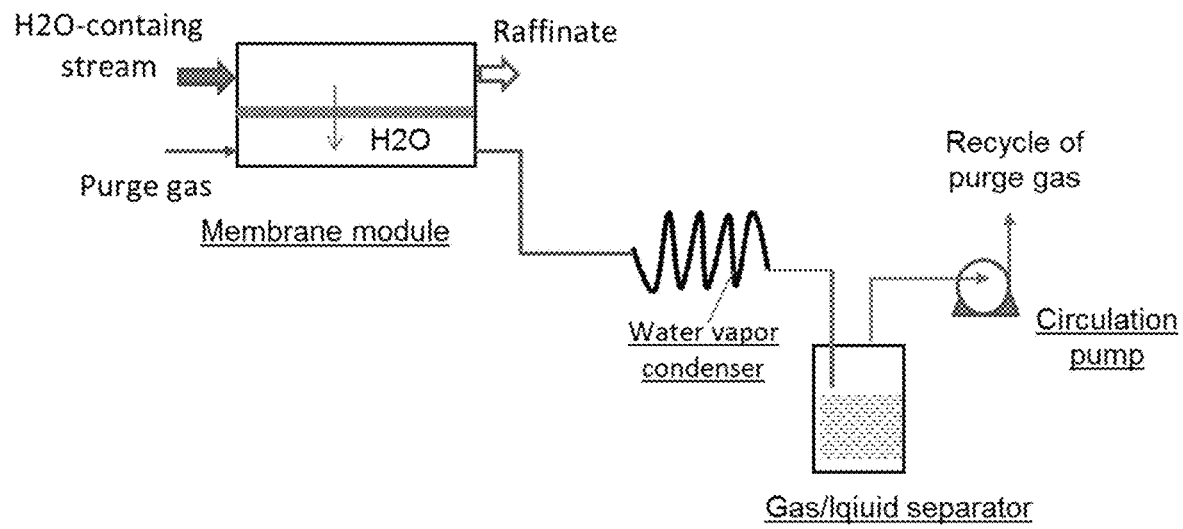

FIG. 4B provides a method of water removal by use of purge gas with water recovery. In the method shown in FIG. 4B, a purge gas may be introduced to the permeate side of the membrane to sweep the permeated water vapor out of the membrane module. The sweep gas can be cooled down to condense the water and the purge gas is recycled after the condensed water is separated out.

Figure 4C:
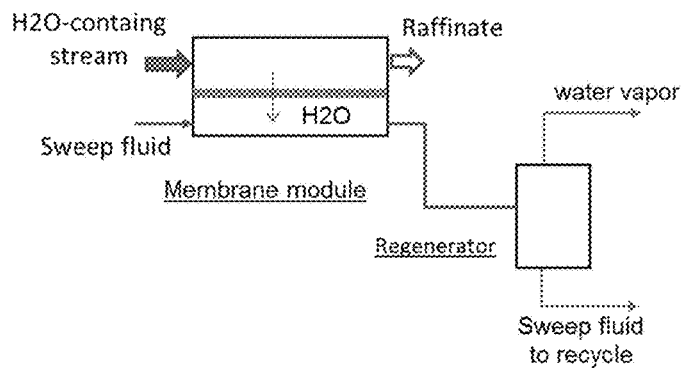

FIG. 4C shows a method with a liquid-phase sweep fluid. The sweep fluid carrying permeated water molecule can be regenerated, such as by heating. The regenerated sweep fluid can be re-used, while the water vapor released from the regeneration may be condensed for recovery of water.

Figure 4D:
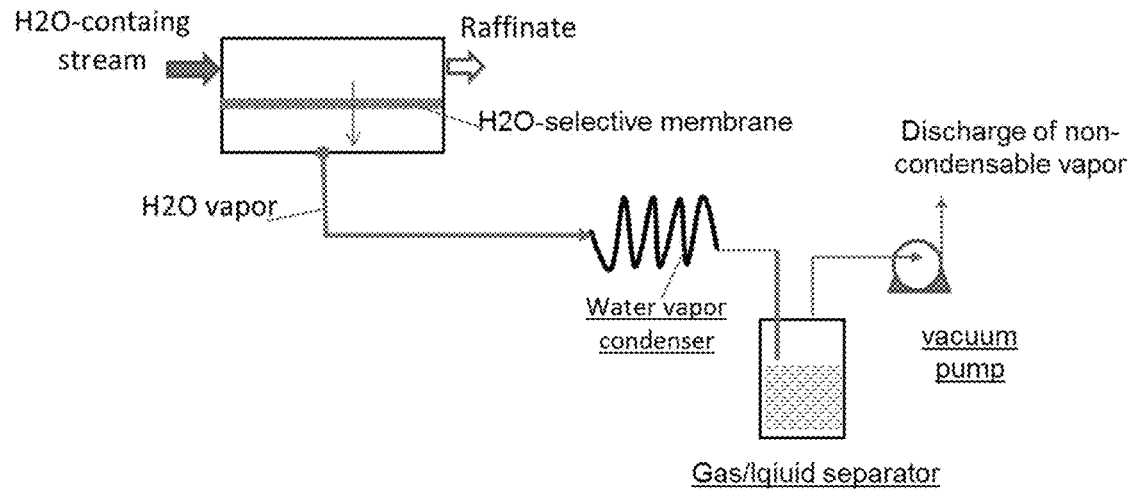

If the H2O-containing feed stream is at atmospheric pressure or at low pressure, FIG. 4D shows a method to recover the water by use of vacuum, such as rough vacuum, in the permeate side of the membrane. The permeated water vapor is condensed into water, and the non-condensable gas is pumped out to environment by a vacuum pump. The vacuum pump generates a lower pressure in the permeate side than the feed side pressure.

Figure 4E:
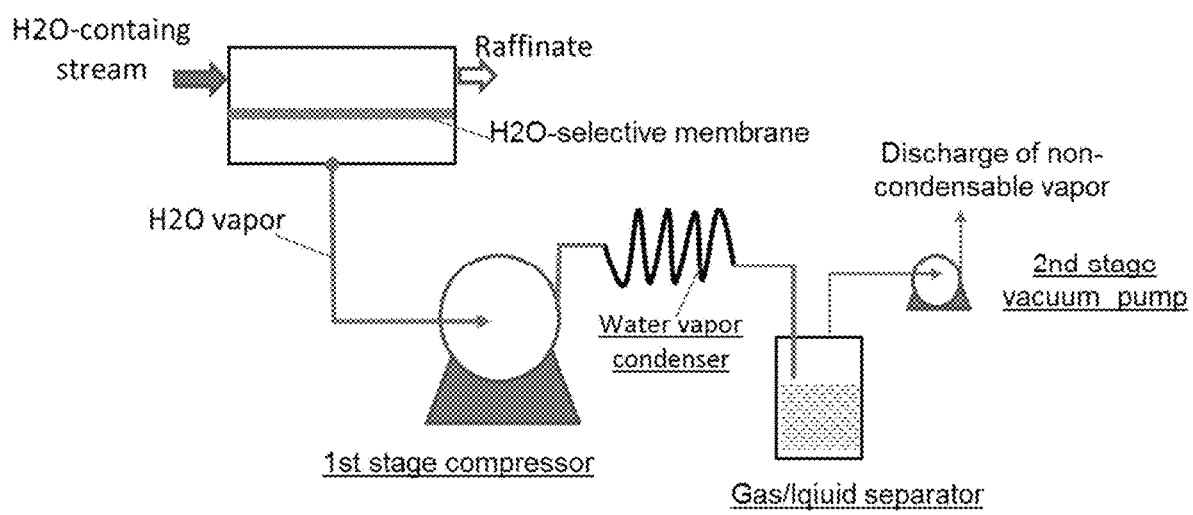

If H2O vapor partial pressure in the feed stream is low, such as humid atmospheric air, a two-stage water removal and recovery method is shown in FIG. 4E. First, an intermediate compressor pull the permeated water vapor out the membrane module and compresses it a condensation pressure, typically at environment temperature. The condensed water is recovered, and non-condensable gas is discharged by use of a $2^{nd}$-stage vacuum pump.

Ethanol fuel production in the US has experienced rapid growth since 2000. Currently, ethanol is produced from corn and sugar canes. It is expected that future growth will come from non-food grade, cellulosic biomass. Ethanol content in the fermentation broth of cellulose could be lower than what is obtained with corn. Thus, removal of water from more dilute fermentation broths demands energy-efficient dehydration processes.

The NaA membrane supported on ceramic alumina tubes has been commercialized for ethanol and solvent dehydration. Instead of single holes, several holes can be made into one membrane tube to increase the membrane area packing density. However, the tubular membrane cost cited in the literature is viewed too high for widespread usage. Membrane area packing density is another important issue to applications requiring large membrane areas.

The area packing density increases with decreasing the tube diameter. Exploratory studies of capillary inorganic membrane tubes have been reported with an attempt to achieve dramatic enhancement of the membrane area packing density. The feasibility to deposit a quality NaA membrane on an alumina hollow fiber of 1.2 mm O.D×0.6 mm thickness was shown. The ceramic capillary tubes tend to be brittle. An alternative is development of ceramic monolithic membranes. In the monolithic membrane body, a number of small membrane channels (<1.0 mm) are embedded in a sturdy, porous ceramic matrix so that making and packaging of individual, fragile capillary tubes is avoided, and manufacturing productivity of the membrane can be enhanced at the same time. The monolithic designs represent promising progress toward getting the surface area packing density of inorganic membranes close to polymeric hollow fiber membranes.

The attempt to make flat sheet zeolite membranes has been reported in the literature using sintered porous metal plates and metal meshes as a support. However, those porous metal supporting structures had rough pores and were too thick. The thick support is associated with high metal material costs and mass transport resistance. The rough pore of the support requires thick coating of modification and/or membrane layer. The thick coating adds membrane preparation complexity and presents potential adhesion/crack problems.

The disclosed thin-sheet zeolite membrane is designed to reduce membrane fabrication cost and achieve high separation performances at the same time. The disclosed zeolite membrane are as thin as metal foils and papers that the membrane sheets can be manufactured with high throughput at competitive costs and packaged into membrane modules of area packing density as high as polymeric membrane sheets. This unique combination of performance attributes has not been obtained yet with conventional ceramic or polymeric materials alone.

i. Thin-Sheet Zeolite Membrane Design Concept and Fundamental Analysis

FIG. 1A provides an illustration of an exemplary membrane. As shown in FIG. 1A, a thin (<200 μm, typically between 20 to 200 μm) porous sheet 10 serves as a support, on which a zeolite membrane layer 20 is directly deposited. The support has a smooth surface and pores at micro and sub-micrometer levels, free of any large pores (>10 μm) for the preparation of a continuous zeolite membrane layer. There is no chemical bonding between the zeolite membrane layer and underneath support. The membrane layer 20 adheres onto the support 10 mainly through mechanical interlock. There is a certain penetration of zeolite membrane growth into the underneath support pores, such as greater than zero and less than 10 μm below the support surface, while the majority of the support pores are intact (such as greater than 50% and up to 99%). The zeolite layer provides desired molecular separation functions that allow certain molecules go through while block other molecules and materials, while the support provides necessary mechanical strength of the membrane sheet.

In addition to the surface pore structure, there are several other features to the disclosed support membrane. For example, the disclosed support sheet is so permeable that its transport resistance is insignificant relative to the membrane layer, such as the permeance through the support is about an order of magnitude higher than the permeance through the membrane layer. The support is stable during the membrane preparation and has long-term stability under the separation conditions. The zeolite membrane growth often involves usage of a strong basic solution at elevated temperatures. Sometimes, the membrane is subject to thermal treatment after growth. The disclosed support is mechanically strong enough to withstand a pressure gradient (typically ≥1 bar) under the operation conditions for a long time (a few years). Light weight of the support with area density <150 mg/cm$^2$ is also a desirable attribute. For example, 1-mm thick sintered steel and Ti plates with 40% porosity would have an area density of 265 and 471 mg/cm2, respectively. By contrast, a 50 µm-thick Ni alloy sheet with the same porosity has a surface density of only 26.7 mg/cm$^2$. Finally, the support sheet needs to be cost effective. The process disclosed herein provides a thin porous metal sheets that are suitable for preparation of the thin-sheet zeolite membranes which has all of these aforementioned desirable properties.

A theoretical analysis was conducted to understand fundamental feasibility of the disclosed membrane structure. The stress is considered as one critical issue for fabrication of a supported zeolite membrane, because of a large difference in physical and chemical properties between the support and membrane layer. There could be chemical stresses and thermal stresses. Some changes in the zeolite lattice structures can occur when different molecules and/or atoms are introduced into the zeolite pore. The chemical stress is application specific, while the thermal stress is commonly encountered. The metal sheet has high thermal expansion coefficient, while zeolite materials have low or nearly zero thermal expansion coefficient. The thermal stress can be induced during the hydrothermal membrane preparation process, where the sheet needs to be heated and cooled between the growth and room temperature. The thermal stress can often occur during application when the process temperature varies. Thus, theoretical analysis of the thermal stresses was performed to rationalize the membrane design and preparation.

In order to analyze the thermal stress in the zeolite membrane sheet constrained by the support or substrate, the inventors developed phase-field models to mimic the actual membrane structure numerically by constructing a 3-dimensional heterogeneous planar structure including a film (zeolite membrane) and a porous substrate structure (porous Ni sheets). An iteration method described below was employed to calculate the thermal stresses in an elastically inhomogeneous material system subject to a temperature change.

ii. Construction of Zeolite Film on Porous Ni Substrate

Figure 3:
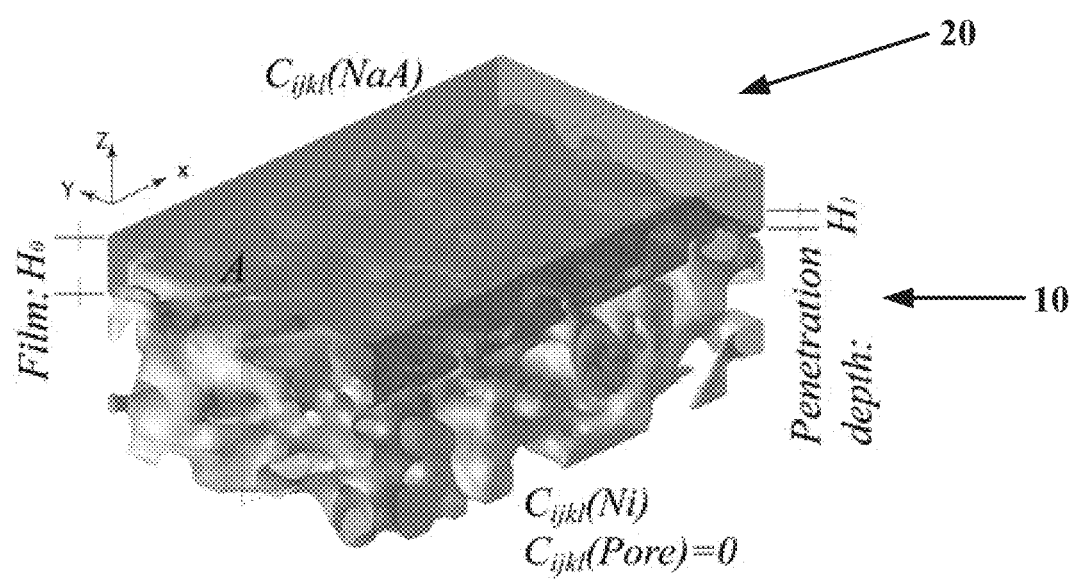
FIG. 3 provides an exemplary constructed film structure for thermal stress analysis.

The phase field (PF) method, as a unique mesoscale simulation tool, has been successfully applied to predict complex three-dimensional microstructure evolution kinetics in materials processes, such as solidification, ferroelectric and ferromagnetic phase transition, phase-separation and precipitation, martensitic transition, dislocation dynamics, twinning and de-twinning, and electrochemical processes. The phase-field model (PFM) of spinodal decomposition is developed to create porous metal sheets. Two-phase equilibrium in a binary alloy is considered as an analogue in the PFM. When overall concentrations of the alloys fall into the spinodal decomposition region, a phase separation takes place and two-phase microstructures are formed. The porous structure can be obtained by assigning one of the two phases to be pores. By changing the model parameters, one can use PFM to generate porous structures of different pore size distribution and volume fraction. For example, the overall concentrations of the alloy will determine the volume fraction of two phases, and the coarsening time can be used to control the pore size. Detailed description of the PFM method can be found in the literature (see, for example, Chen, *Annual Review of Materials Research* 32 (2002) 113-140 which is hereby incorporated by reference in its entirety). FIGS. 2A-2D present the porous structure created by the PFM, which have different pore sizes but the same volume fraction (50%). If the orientation of zeolite crystals in the membrane is not considered, i.e., the membrane is assumed to be uniform, the supported membrane structure can be constructed by attaching a membrane film onto the porous substrate structure. A uniform membrane film with certain penetration depth into the porous support is illustrated in FIG. 3. It is possible to create a polycrystalline zeolite membrane on the porous support by PFM of polycrystal growth. In the present example, only uniform films were considered.

iii. Stress and Failure Analysis in Zeolite Films on Porous Ni Substrate

The geometry and coordinate system of the supported film structure constructed for thermal stress analysis are shown in FIG. 3. For simplicity, it is assumed that the polycrystalline NaA film and nickel phase have homogeneous thermo-mechanical properties, which can be calculated with their properties of single crystals. The materials properties used in the simulations are listed in Table 1.

TABLE 1

Thermo-mechanical properties of NaA and Ni phases

| Material properties | | Single crystal (GPa) | Lower bound of poly-crystalline | Upper bound of poly-crystalline | Average |
|---|---|---|---|---|---|
| Elastic constants of NaA | $C_{11}$ | 171.3 | 167.3 | 167.4 | 167.4 |
| | $C_{12}$ | 11.6 | 13.5 | 13.6 | 13.6 |
| | $C_{44}$ | 75.0 | 76.9 | 76.9 | 76.9 |
| Elastic constants of Ni | $C_{11}$ | 248.3 | 284.4 | 306.0 | 295.2 |
| | $C_{12}$ | 152.2 | 134.2 | 123.3 | 128.8 |
| | $C_{44}$ | 120.2 | 75.1 | 91.3 | 83.2 |

| Thermal expansion coefficient α (NaA) | −5.2 × 10$^{-5}$/K  25~100° C. |
| | 5.0 × 10$^{-5}$/K  100~150° C. |
| | −5.0 × 10$^{-6}$/K  150~450° C. |
| Thermal expansion coefficient of α (Ni) | 1.5 × 10$^{-5}$/K |
| Fracture strength of NaA | 0.0026~0.026$C_{44}$ |

The abrupt change of thermal expansion coefficient with temperature is due to the phase transition. In the simulations, this discontinuous change was considered. The iteration method (Hu and Chen, *Acta Mater.*, 49(2001)1879, which is hereby incorporated by reference in its entirety) was used to calculate the thermal stresses in an elastically inhomogeneous material system subject to a temperature change. With the model, the effect of porous structures, membrane thickness, penetration depth, and temperatures on stresses and failure mechanisms of the membrane were investigated. Different stress states cause different failure mechanisms. The tensile stress may cause cracking, while the compress stress on the thin film may cause buckling. $\sigma_1$, $\sigma_2$, $\sigma_3$ are normal stresses, while $\sigma_4$, $\sigma_5$, $\sigma_6$ are shear stresses. In xyz coordinate shown in FIG. 3, $\sigma_{xx}=\sigma_1$, $\sigma_{yy}=\sigma_2$, $\sigma_{zz}=\sigma_3$, $\sigma_{yz}=\sigma_4$, $\sigma_{xz}=\sigma_5$, $\sigma_{xy}=\sigma_6$.

iv. Effect of Porous Structures

Four porous Ni substrates were used in the simulations. The porous Ni substrates have the same pore volume fraction (50%), but different pore sizes. The stress distributions on the cross-section of the membrane structure are calculated, i.e., plane A shown in FIG. 3. It is clearly found that the maximum tensile and compressive stresses locate near the interface between the film and substrate. To manifest the effect of porous structures, the probability distribution of stresses in a region $z_0-2dz \leq z \leq z_0+2dz$ was calculated where $z_0$ is the z-coordinate of the interface between the film and substrate, and dz is the grid size. The probability distribution functions for stresses $\sigma_1$ and $\sigma_3$ are plotted in FIGS. 5A and 5B. The tensile stress $\sigma_1$ may cause the film cracking on the plane. The probability of the maximum $\sigma_1$ value for the support of the smallest pore is higher than that for the other three supports of larger pores. The probability of the maximum compressive stress $\sigma_3$, which may cause the interface cracking, decreases as the pore size increases.

v. Effect of Film Thickness and Penetration Depth

The effects of film thickness and penetration depth on the stresses were simulated with the porous support structure Case 3. FIG. 6 shows the stress distributions for the membrane films of the same penetration depth ($H_1=4$) but different film thickness. From the stress distribution contour, we can see that the maximum tensile and compressive stresses weakly depend on the film thickness if the penetration depth is the same. The conclusion was also confirmed by analyzing the probability distributions of the stresses near the interface. The effects of film penetration depth on the stresses are shown in FIG. 7. The probability distributions of the stresses near the interface are plotted in FIG. 8A. For comparison, the results in the case where the penetration depth is zero are also plotted in FIG. 8B with the symbol of black circle. In this case, the stresses are constant and the stress component $\sigma_3$ is zero. A clear trend can be observed that the maximum tensile and compressive stresses increase with the penetration depth.

vi. Failure Mechanisms

Figures 9A, 9B, 9C, 9D, 9E:
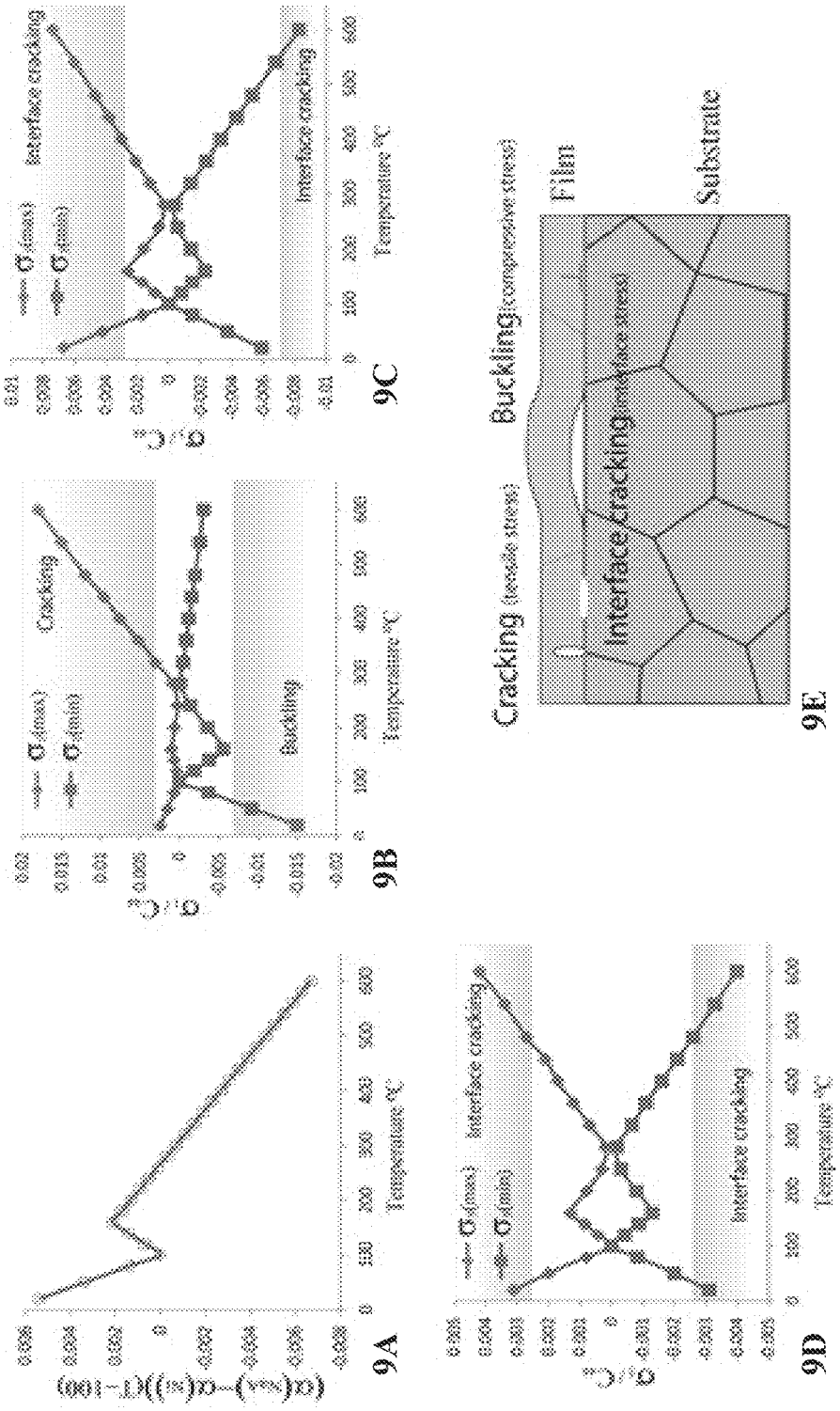
FIGS. 9A-9E illustrate temperature dependence of maximum stresses and failure modes in the film.

Because the thermal expansion coefficient of zeolite strongly depends on the temperature as presented in Table 1, the stresses and failure modes may vary with the temperature. FIG. 9A plots the lattice mismatch strain vs the temperature. The mismatch strain is positive when the temperature is lower than 100° C. while it is negative when the temperature is higher than 100° C. For the film structure with film thickness ($h_0=10$), penetration depth ($h_1=4$) and porous structure (Case 3), the maximum tensile and compressive stress $\sigma_1$ and $\sigma_3$, the maximum shear stress $\sigma_5$ on the interface are calculated for different temperatures. The results are plotted in FIGS. 9B-9D. Three different failure mechanisms are schematically drawn in FIG. 9E. The critical stresses for different failure modes are estimated from the data in the literature and listed in Table 1. Film cracking is determined by the maximum tensile stress $\sigma_1$. Film buckling is determined by the maximum compressive stress $\sigma_1$. When the maximum tensile stress $\sigma_3$ and shear stress $\sigma_5$ on the interface are larger than their critical values the interface cracking may occur. According to the critical stresses for different failure modes, the failure modes are determined, and shown by the shadow regions in FIGS. 9B-9D. At low and high temperatures, the failure mode could be interface cracking because of the large tensile stress $\sigma_3$ and shear stress $\sigma_5$. At high temperatures, the large tensile stress $\sigma_1$ may cause the film cracking, while at low temperature the large compressive $\sigma_1$ may lead to film buckling.

In summary, the simulations demonstrate that 1) the maximum thermal stresses are found near the interface between the film and substrate; 2) for a given penetration depth, the stresses weakly depends on the film thickness; 3) penetration of film into the porous substrates causes the maximum stresses increase; 4) pore structure has stronger effect on stresses than penetration depth. The model enables one to investigate the effects of film thickness, penetration depth, support pore structures, and temperature on the thermal stresses and failure. The model has not taken into account the defects such as de-coherence at interface, microvoids/pinholes, interface roughness, surface roughness, and grain boundaries. The calculated stress distributions can be used to assess potential cracking near defects.

B. Materials and Methods

The porous Ni support sheet was prepared in-house with a process described in Liu and Canfield (*J. Mem. Sci.*, 409-410 (2012)113-126), which is hereby incorporated by reference in its entirety. The porous Ti support sheets were supplied by ADMA Products. Three NaA zeolite powders used for preparation of seeding crystals are Nano-Zeolite LTA from NanoSpace denoted as nano-A, synthetic Zeolite 4A (2-4 µm) from Wako denoted as micro-A, synthetic Zeolite 4A (<75 µm) denoted as macro-A. The materials used for preparation of growth solution are NaOH (>97%), aluminum hydroxide, sodium silicate powder G ($SiO_2$: $Na_2O=3.22$), and de-ionized water.

Membrane Preparation.

Ball milling of the parent NaA powder as seeding crystals was conducted by rolling a mixture of 200 g $H_2O$, 10 g zeolite powder, and 100 beads in a 500-$cm^3$ polypropylene bottle at 60 RPM. Attrition milling of NaA powder was conducted by mixing 50 g zeolite powder and 60 g water in an attrition miller at 720 RPM. The particle size was determined using a particle size analyzer (Microtrac VSR). The milled slurry was diluted with deionized water to obtain a seed coating solution. The solid loading was typically 1-3 wt %.

Spray coating was used to lay down the seeding crystal on the support sheet. The support sheet was mounted onto a wheel surface. As the wheel was rotated at 40 RPM, the coating solution was sprayed on the wheel surface via a Siphon Fed Flat Fan Pattern nozzle (Exair). Several support sheets can be mounted on the wheel surface and be coated in one batch run. Continuous rotation of the wheel enabled the support surface be sprayed many times in a given period of spraying. The spraying was stopped when the support surface got fully wet. It typically took 1 min for 50 µm-thick porous Ni support sheets. After the coated support sheet was dried, the sheet was took off the wheel and weighed. If the seed loading was less than the target and/or the coating looked not uniform, the coating was repeated. With each coating solution, 2 or 3 times of coating were often conducted.

The growth solution was prepared in three steps. In first step, an Al precursor solution was prepared by heating a mixture of 19.48 g Al $(OH)_3$, 35.14 g NaOH, and 360 g water $H_2O$ in glass flask at 95° C. under continuous stirring for 2 hours. After the $Al(OH)_3$ powder was dissolved and a clear solution was formed, the heating was stopped and the solution was let to cool down to room temperature. In second step, a Si precursor sol was prepared by mixing 24.8 g sodium silicate and 310.68 g water in a beaker at 80° C. under stirring for 30 minutes. After a clear solution was formed, the heating was stopped and the solution was let to cool down to room temperature. In third step, the Al solution was added into the Si solution under stirring to form a milky solution.

The membrane growth was conducted in a planar reactor built and designed in-house. Firstly, the seeded support sheet was mounted onto a support frame and the frame was inserted into the reactor chamber in vertical orientation. Then, the growth solution was introduced to fill the growth chamber. Then, the reactor was closed and pressure tested. If there was no leakage, the heater was turned on to raise the growth temperature to 90° C. at 1° C./min. The holding time at 90° C. was typically 3.5 hours unless specifically noted. Finally, the reactor was let to cool down naturally. The growth solution was discharged from the bottom of the reactor, and the membrane support frame was taken out. The membrane surface was rinsed with deionized water and the residual solids on the surface were wiped out with a clean room cloth. Then, the membrane sheet was left in the fume hood for drying. By use of a support frame, four membrane sheets could be loaded into the reactor and grown in one batch run.

The resulting membrane was inspected with any visual defects. Then, it was checked with Red40-colored water. The colored water was dropped on the membrane surface. After a while, the other side of the membrane sheet was checked to see if any color leaked through. If yes, the membrane was determined of large defects. The membrane sheet without any color leakage was chosen for gas separation tests.

Membrane Structure Analysis.

Morphologies and pore structures were analyzed using scanning electron microscopy (SEM). A JEOL 5900 SEM was used for all the screening work, while detailed analysis was completed using a JEOL JSM-7600F. Images were collected at a working distance of 10-12 mm with an accelerating voltage of 20 kV. Both Secondary Electron (SEI) and Backscatter Electron (BSE) images were collected. SEI provides better topographical information of a sample, while BSE reveals elemental information that can be useful for displaying material distribution in a sample. In addition, an EDS (Energy-dispersive X-ray Spectroscopy) was used for quantitative elemental analysis.

For detailed analysis of some selected membrane sheets, a polished cross-section area was carefully prepared by fixing the sample in an epoxy mount and grinding the mount with a series of successively smaller grit sand papers. The mount was polished using a 1 µm diamond suspension and a sub-micron colloidal silica suspension. After the specimen was cleaned in a Fiscione Plasma Cleaner, a carbon coating roughly 15 nm thick was applied to reduce charging under the electron beam. The resulting sample stub was placed into the JEOL JSM-7600F for examination at 20 kV gun voltage. Images were taken at a probe current of roughly 2 nA and a focal distance of 6 mm, while a nominal 20 nA beam and a focal distance of 15 mm were utilized for EDS data collection using an Oxford X-Max 80 Silicon Drift Detector. The data were analyzed using the Oxford Inca Microanalysis Suite, version 4.12.

Membrane Separation Tests.

Molecular separation characteristics of the membrane were characterized by separation tests with air, humid air, and humid $CO_2$/air mixture. Gas flows from respective gas cylinders were introduced into the feed side of the membrane testing cell by use of mass flow controllers. In the tests with humid gas, de-ionized water was delivered by a syringe pump and pre-vaporized prior to mixing with the feed gas stream. The feed side of the test cell was typically maintained under atmospheric pressure, while the permeate side of the cell was pulled vacuum. The permeated water vapor was scrubbed by use of a 3A molecular sieve adsorbent bed. The permeated water was determined based on the weight change of the adsorbent bed. The residual gas discharged by the vacuum pump and swept by a helium gas stream was analyzed by an on-line mass spectrometer (Accu Quad, Kurt J. Lesker Co.). The gas permeation rate was determined based on the residual gas composition and the sweep gas flow rate.

Permeation rate ($R_i$) of non-condensable gases such as $N_2$ and $O_2$ was calculated based on the sweep gas flow rate ($n_s$) and molar fraction ($x_{i,s}$) in the sweep gas by the following equation:

$$R_i = x_{i,s} \cdot n_s$$

Permeation rate of water vapor ($R_{H2O}$) was determined based on both the scrubbed amount and sweep gas composition as follows:

$$R_{H2O} = \frac{\Delta n_{water}}{t} + x_{H2O,S} \cdot n_s$$

$\Delta n_{water}$ is the moles of water collected in the adsorbent bed within a time period of t.

Permeance of individual molecule is calculated based on the permeation rate and partial pressure differential:

$$P_i = \frac{R_i}{S_m \cdot \Delta p_i}$$

$$\Delta p_i = p_F \cdot x_i - p_P \cdot y_i$$

$H_2O$/air separation factor was calculated based the gas compositions in the feed ($x_i$) and permeate ($y_i$) side of the membrane cell:

$$S_{ij} = \frac{(y_i / y_j)_P}{(x_i / y_j)_f}$$

C. Results

The procedures and conditions, formulations, and raw materials were systematically studied to obtain quality thin-sheet zeolite membranes of consistent performances. The membrane sheets prepared by use of secondary growth method showed higher quality and better performances than those prepared via direct growth. Among various preparation steps in the secondary growth, seed coating was found to be the critical one. Impacts of the seed coating on the membrane performance will be discussed below. The procedures and conditions developed based on the in-house porous Ni support sheet were applied to the membrane preparation on other support materials to show the importance of the support.

i. Supports Used for Preparation of Thin-Sheet Zeolite Membranes

The pore size of porous support sheets can be characterized with two common techniques: capillary flow and mercury porosimetry. Pore size distribution measured with these two techniques is compared in FIGS. 10A and 10B for two in-house porous Ni sheets. The distribution curves of the pore size measured with the same technique look similar for the two sheets of different thicknesses (50 µm versus 100 µm). However, the distribution profiles measured with the two different methods for the same sheet differ significantly. The results reflect different characteristics of the pore structure for a porous sheet.

The capillary flow is based on gas permeation through the sheet, while the mercury porosimetry involves intrusion of a liquid from the external surface of the sheet into the interior pores. To a large degree, the capillary flow measurement characterizes all the pores through which the gas (or fluid) flows along the sheet thickness. By contrast, the mercury extrusion captures characteristics of exterior pores of the sheet. The pore sizes obtained with these measurements are tabulated in Table 2.

TABLE 2

Pore sizes of porous Ni sheets measured with two different methods

| Ni sheet name | 50 μm | 100 μm |
|---|---|---|
| Capillary flow technique | | |
| Bubble point diameter, μm | 0.73 | 0.71 |
| Mean flow pore diameter, μm | 0.39 | 0.31 |
| Mercury porosimetry technique | | |
| Pore diameter at peak position, μm | 0.79 | 0.72 |
| Volume-based median pore size, μm | 0.74 | 0.58 |

The bubble point pore diameters are much larger than the mean pore diameter. Thus, a number of small pores contributed to gas permeation in the capillary flow measurement. The pore diameters at the distribution peak position from mercury intrusion analysis are fairly close to the pore volume-averaged diameters, which indicate the narrow pore size distribution. In general, the pore sizes of the porous nickel sheets are in the sub-micrometer level. The porous nickel sheets show uniform pore sizes on the exterior surface with a mean pore size ranged from 0.6 to 0.90 μm, depending on specific thickness. Pertinent to the thin-sheet zeolite membrane preparation, the present authors think that the pore size distribution measured with the mercury porosimetry is more useful.

It was found that direct examination of the surface pore structures of a support sheet with SEM is beneficial to membrane preparation. The pore size values obtained with the above techniques are all calculated based on certain model equations from experimental data. SEM analysis reveals actual physical features of the membrane support surface. FIGS. 11A-11D show the SEM images of typical porous Ni sheets studied for zeolite membrane preparation in this work. The three sheets of different porosity exhibits uniformly porous surface structures. The 3-D networked pore structure is revealed by the cross-sectional SEM image of the 50% porosity sheet (FIG. 11B). It is clearly seen that the surface pores vary significantly in both sizes and shapes. The surface porosity and pore size tend to decrease with decreasing sheet porosity, which indicates uniformity of porous structures along the sheet thickness.

ii. Membrane Preparation on Thin-Porous Metal Sheets with Graded Seed Coatings

In the secondary growth, zeolite crystals of the parent zeolite framework are first coated on the support to serve as a seed for crystal growth later. Thus, kinds of the seeding crystal and coating textures have direct impacts on the subsequent zeolite membrane growth. To let the zeolite crystals inter-grow to form a dense membrane layer, uniform seed coating of the support is necessary. In other aspect, some seeding crystals need to be planted inside the support pores to let certain penetration of the zeolite membrane growth into underneath support pores occur to enhance the membrane adhesion.

Figure 12A:
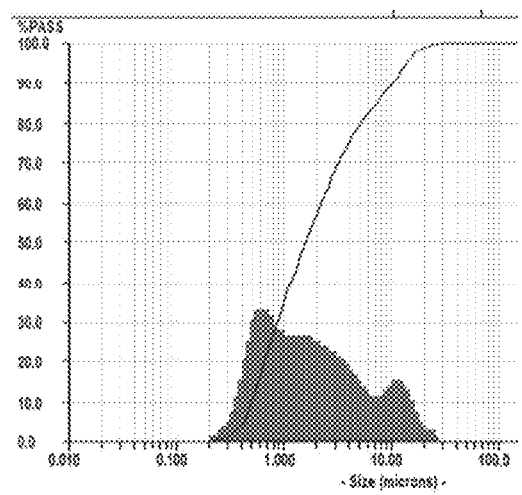
FIGS. 12A and 12B illustrate particle size distribution of ball-milled parent zeolite powder for seed coating.
Figure 12B:
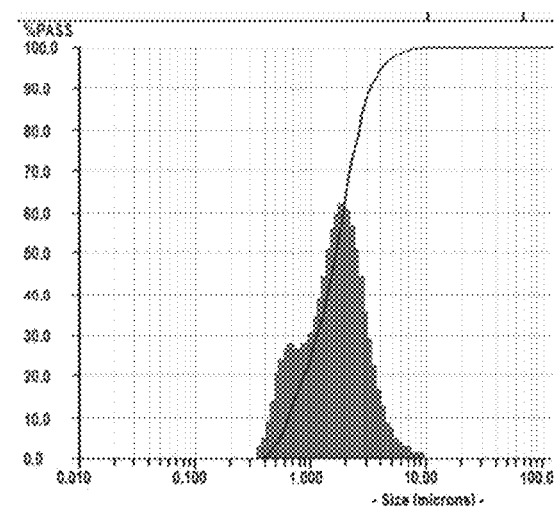

Sequential coatings of the support with different sizes of seeding crystals were chosen first to obtain the desirable seed coating structures. The idea was to use a larger seeding crystal to cover the large support pore and smoothen the seed coating by use of a smaller seeding crystal. The larger seeding crystal was prepared by ball-milling of parent NaA powder with product specification of 2-4 μm particle size, which is named as micro-A in this paper. The smaller seeding crystal was prepared by ball-milling of parent NaA powder with product specification of 300 nm nano-zeolite, which is called as nano-A. The coating solution was prepared in de-ionized water with 1 wt % solid loading. FIGS. 12A and 12B show particle size distributions for the two coating solutions. The particle size distribution for nano-A is very broad with d50=1.57 μm and D95=13.2 μm. This seems to be contrary to what would have been expected for such dilute slurry made of nano-sized parent crystals. The small crystal size of this sample was confirmed by XRD and SEM analyses. The broad distribution is mainly due to agglomeration. The small crystals have high surface free energy and tend to cluster together. The micro-A seeding solution has d50=1.63 μm and D95=3.97 μm, which is within the product specification. It seems that the particle size was not reduced by the ball-milling. The discrepancy between the actual crystal size and measured particle size is also explained by agglomeration of the crystals.

The porous Ni sheet was spray coated with micro-A first and followed with spray coating of nano-A. The seed loading is characterized by surface loading density as calculated below:

$$\omega_s = \frac{W_s - W_0}{SA_s}$$

The nominal coating thickness can be estimated based on the surface loading density by assuming a uniform layer of coating:

$$\delta_s = \frac{\omega_s}{\rho_s} \times 10$$

Similarly, the membrane growth surface density and nominal membrane thickness can be calculated with the following equations:

$$\omega_m = \frac{W_m - W_0}{SA_m}$$

$$\delta_m = \frac{\omega_m}{\rho_m} \times 10$$

First set of membrane preparation studies was conducted by varying the seed loading while keeping the membrane growth conditions constant. The preparation results are summarized in Table 3.

TABLE 3

Membrane preparation with sequential coatings of two different parent zeolite powders as seeding crystals

| Mem ID 61509- | Support porosity % | micro-A seeding mg/cm$^2$ | nano-A seeding mg/cm$^2$ | Total seeding mg/cm$^2$ | Growth time h | Growth gain mg/cm$^2$ | Thickness from SEM µm |
|---|---|---|---|---|---|---|---|
| 27-26-1 | 38.4 | 0.011 | 0.045 | 0.056 | 3.5 | 1.7 | 4.8 |
| 9-7-4 | 30.4 | 0.070 | 0.000 | 0.070 | 3.5 | 1.6 | 7.4 to 8.1 |
| 27-26-2 | 38.4 | 0.085 | 0.055 | 0.140 | 3.5 | 1.7 | 4.4 to 7.3 |
| 27-26-4 | 35.5 | 0.123 | 0.155 | 0.278 | 3.5 | 2.0 | 5.3 to 8.4 |
| 27-26-3 | 33.8 | 0.147 | 0.212 | 0.358 | 3.5 | 2.2 | 9.3 |
| 28-26-2 | 37.7 | 0.074 | 0.075 | 0.149 | 1 | 1.7 | 4.4 |
| 27-26-2 | 38.4 | 0.085 | 0.055 | 0.140 | 3.5 | 1.7 | 4.4 to 7.3 |
| 28-26-1 | 36.3 | 0.070 | 0.061 | 0.131 | 6 | 2.1 | 6.9 |

As the seed loading density was varied dramatically from 0.056 to 0.358 mg/cm$^2$, the growth density only increased slightly from 1.7 to 2.2 mg/cm$^2$. There was no strong correlation between the seeding density and membrane growth density. With a packing density of 1 g/cm$^3$ for the seed coating, the nominal coating thickness is from 0.56 to 3.58 µm, which is within the range of the expectation. With a packing density of 1.6 g/cm$^3$ for the membrane layer, the calculated nominal membrane thickness is from 10 to 14 µm, which is fairly thick. In the second group of studies, the supported sheets of similar seeding density were used while the holding time at 90° C. growth temperature was varied. Significant weight gain was obtained even after 1-h growth hold. Further increasing the holding time to 6 hours did not result in substantial weight gain.

Desirable structural features were revealed by SEM analysis. The surface texture after seed coatings are illustrated by the SEM images in FIGS. 13A-13D. After spray coating with the micro-A seeding crystals, the bare support remained visible but the support surface was uniformly decorated with the micro-A seeding crystals (FIG. 13A). Under high magnification (FIG. 13B), small fragments of the seeding crystal can be seen clearly. After further spray coating with the nano-A seeding crystal, the support surface was substantially covered (FIG. 13C). Some support pores remained visible but were significantly narrowed compared to the bare support. Presence of small or nano-sized seeding crystals is evident under high magnification (FIG. 13E).

The membrane surface textures looked all the same for these membranes listed in Table 3, which are illustrated in FIGS. 14A and 14B.

The surface uniformity can be seen from the low-magnification picture. The crystal structure of the zeolite membrane is clearly seen under the high magnification. The membrane surface is not very smooth but comprises densely inter-grown zeolite crystals. Some large crystals on the surface were likely deposited from the bulk phase during growth. EDS analysis of several spots on the membrane shows consistent atomic composition, which is a good indication to crystal purity of the resulting membrane.

The membrane design features are well revealed by SEM analysis of polished cross-section of the membrane sheet. The images for those membranes grown under the same conditions on the supports of different seed loadings are compared in FIGS. 15A1-15E2. First of all, the membrane thickness is much less than the value calculated based on the growth weight gain. There is some correlation between the seed loading and membrane thickness measured from the SEM image. The membrane thickness increases with the seed loading. However, the membrane thickness is not uniform throughout the membrane sheet and varies with location. Regardless the thickness, all the membranes showed a dense membrane layer. The some cracks shown in the SEM images could be caused during the SEM sample preparation, while defected membrane spots were certainly observed. As shown by FIG. 15C2, a void exists in the membrane layer. Fortunately, the void is surrounded by a dense zeolite membrane shell. This phenomenon indicates that the secondary growth has abilities to repair some defects on the seeded sheet. The large difference in the membrane thickness between the actual measurement and calculation is explained by deposition of some materials inside the support pores, which can be seen from the SEM image. Inevitably, some growth solution would get into the support pores at the beginning of growth. After growth, the trapped growth solution in those pores would leave a solid deposit. The cross-section images show that the majority of support pores are intact despite the extra solid deposition.

The growth of membrane layer into the underneath support pore is shown by all these membranes as expected from the design. It can be seen that the support of higher porosity would provide more surface locations to have mechanical interlocking. The cross-sectional images for the two membrane samples grown with different holding time show the features similar to the membrane grown at 3.5 hours. The results indicate a rapid zeolite crystal growth rate with the growth solution prepared in this Example.

Molecular sieving functions of the resulting membranes are characterized by air dehumidification tests. The results are summarized in Table 4.

TABLE 4

Impacts of seeding crystal loading and growth time on membrane performances (testing conditions: 30.3° C., 3.1 mol % H$_2$O in feed air at atmospheric pressure)

| | Air dehumidification performance | | |
|---|---|---|---|
| Mem ID | Permeate, mbar | H$_2$O permeance mole/(m$^2$ · s · Pa) | H$_2$O/N$_2$ separation factor |
| 27-26-1 | 7 | 3.8E−06 | 11 |
| 9-7-4* | 5 | 5.2E−06 | 364 |
| 27-26-2 | 6 | 5.9E−06 | 252 |
| 27-26-4 | 5 | 2.8E−06 | 321 |
| 27-26-3 | 5 | 3.2E−06 | 371 |
| 28-26-2 | 5 | 5.8E−06 | 485 |
| 27-26-2 | 6 | 5.9E−06 | 252 |
| 28-26-1 | 5 | 6.1E−06 | 331 |

Except for first sample, all other membranes exhibit excellent H$_2$O/N$_2$ selectivity. The seed loading density for first sample was likely too low to have sufficient coverage of the bare support for growth of a continuous dense membrane. Although no obvious defects were seen from the SEM analyses, some minor defects could have existed in this membrane. Thus, the seed loading needs to be above 0.056 mg/cm$^2$. If the seed loading is too high, such as ≥0.278 mg/cm$_2$, $H_2O$ permeance can be decreased. There appears to be an optimum seed loading. It is interesting to note that the $H_2O$ permeance is similar for the three membranes grown with different holding times on the support of similar seed loading (0.13-0.15 mg/cm$^2$). It is confirmed that 1-hour growth time could be sufficient, and prolonging the growth after the membrane is formed may not have any benefit.

iii. Membrane Prepared with One Kind of Seeding Crystal

Figure 16:
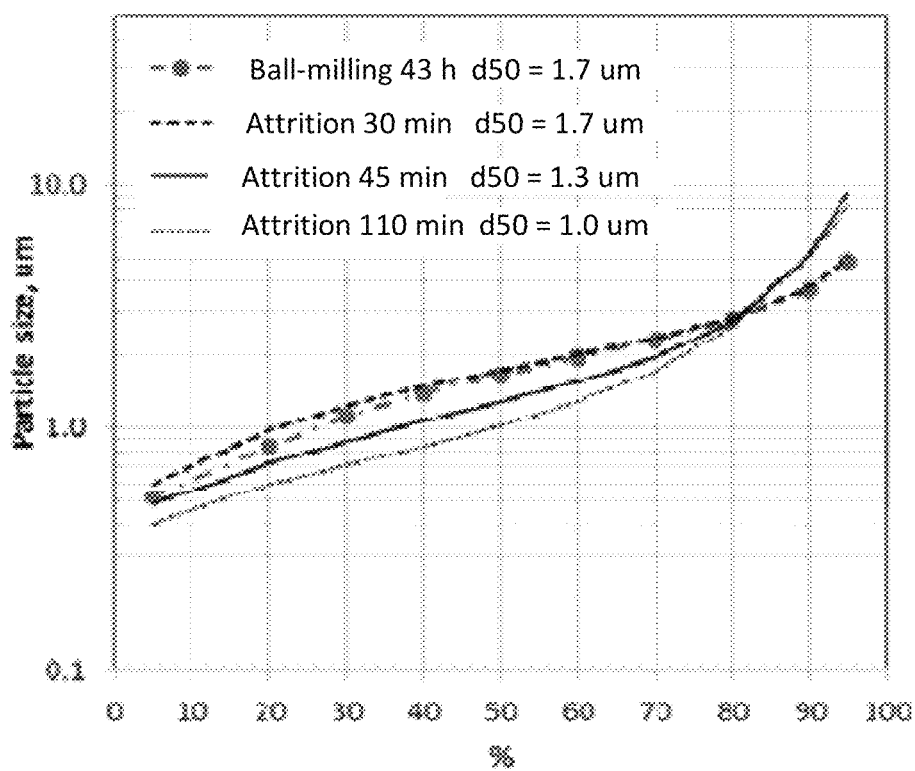
FIG. 16 is a graph illustrating particle size distribution of macro-A parent powder milled at different conditions for seed coating.
Figure 17A:
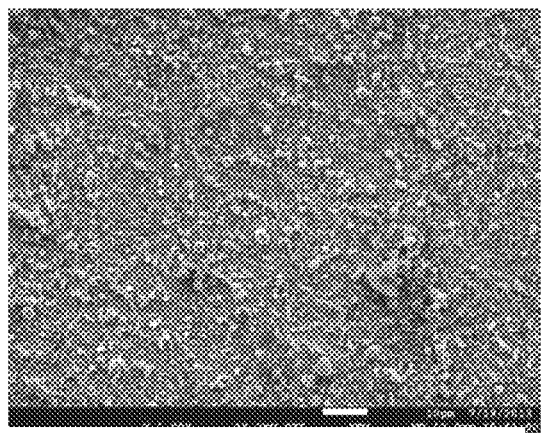
FIGS. 17A-17D are SEM images illustrating surface textures of porous Ni sheets seeded with different parent NaA powder.
Figure 17B:
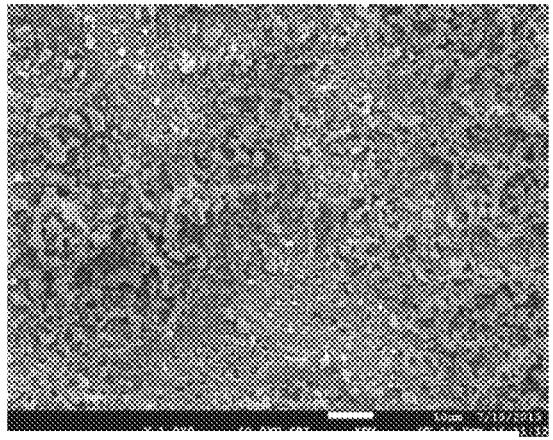
Figure 17C:
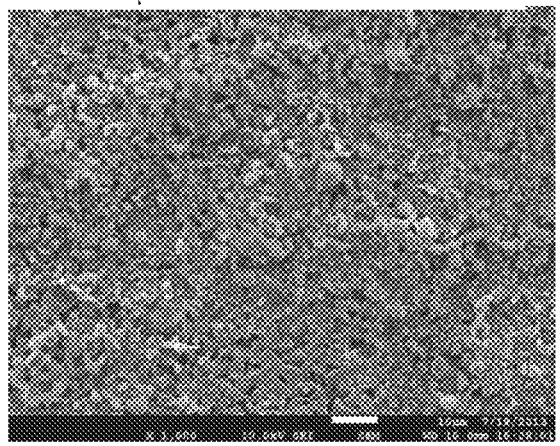
Figure 17D:
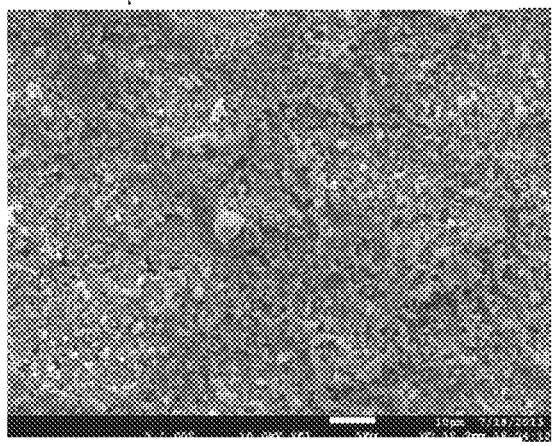

The nano-A and micro-A are specialty NaA parent powder. The sequential coatings with these two materials were considered complicated. Thus, cheaper NaA powder materials and simplified seed coating processes were studied to lower potential manufacturing costs of the seed coating procedure. The macro-A powder—a commodity material was identified to be a fairly effective seeding crystal for membrane growth. As-received powder had rough particle sizes in tens of am and the particle quickly settled when the powder was added into water. Thus, its particle size has to be broken down to obtain a stable coating solution. Attrition milling was found to be a more efficient technique than ball-milling. FIG. 16 shows that 30-min attrition milling resulted in a particle size distribution profile similar to the one obtained with 43-hour ball milling with a mean particle size of 1.7 μm. The mean particle size can be readily reduced to 1.3 and 1.0 μm by increasing attrition milling time. However, increasing the milling time caused tailing of the particle size distribution, i.e., an increased particle size at 90% pass. An explanation for this is agglomeration of smaller fragments produced by the milling. A relatively stable coating solution was prepared with the milled powder for spray coating. Table 5 summarizes the preparation and air dehumidification testing results of a group of membranes grown on the support seeded with one kind of coating solution only.

support surface. The $H_2O$/air selectivity was substantially enhanced by conducting two times of spray coating with the same seeding solution. SEM analyses of the seeded supports confirmed that the seeding crystals were indeed better dispersed with two-time coating than one-time (FIG. 17C versus FIG. 17B). The $H_2O/N_2$ selectivity was improved using the 1.3 μm macro-A seeding crystal (mem #65-4 in Table 5). The lower $H_2O$ permeance for this sample is attributed to the low support porosity of the support. Excellent air dehumidification performances were obtained with the membranes grown by using the 1.1 μm macro-A seeding crystals on a support of about 40% porosity. $H_2O$ permeance reached above 1.0E-5 mole/s/m$^2$/Pa with $H_2O/N_2$ separation factor above 3000.

SEM analyses of the seeded support (FIGS. 17A-17D) revealed no substantial difference in the composition and crystal size between the micro-A and macro-A after milling. The particle and crystal size of the parent NaA powder is not an issue for making an effective seeding crystal. Instead, crystal purity was found to be important as seeding crystals. For a given parent NaA powder, milling conditions can have substantial impacts on the seed coating and zeolite membrane growth. The seeding crystals need to maintain crystal purity and have a suitable size distribution profile so that some seeding crystals can get into the support pore while majority of the seeding crystals decorate exterior surface of the support. The SEM images showed presence of some isolated larger crystals on the seeded surface, indicating that additional optimization of seed coating may be desirable.

Figure 18A:
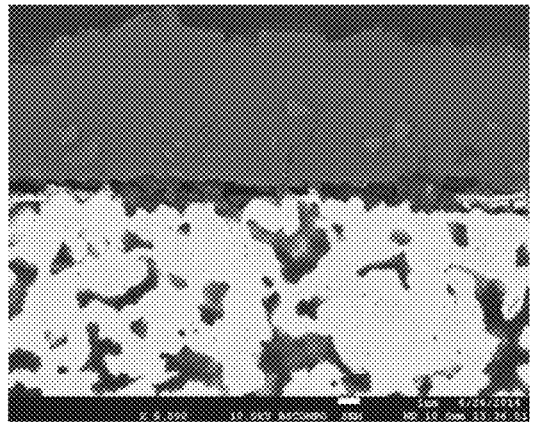
FIGS. 18A-18D are SEM images illustrating surface and interface structures of zeolite membranes grown on the support seeded with one type of seeding crystals.

Both surfaces and cross-sections of this group of membranes were analyzed by SEM to reveal the membrane structural features. The surface structures for all these membranes looked the same or similar. Some characteristics between different membranes were shown by the cross-sectional analysis. Typical SEM cross-sectional images of the four membranes grown with the macro-A seeding crystals are compared in FIGS. 18A-18D. With the 1.7 μm macro-A seeding crystal, the membrane does not appear to be locked into the support well (FIG. 18A). The membrane

TABLE 5

Preparation conditions and air dehumidification performances of zeolite membranes grown with only one kind of seeding crystal (air dehumidification testing conditions: 30.3° C., 3.1 mol % $H_2O$ in feed air)

| Mem ID 61509 | Membrane preparation | | | | | Air dehumidification | | |
| --- | --- | --- | --- | --- | --- | --- | --- | --- |
| | Support porosity % | Seeding crystal | No of spray coating | Seed loading, mg/cm$^2$ | Growth gain, mg/cm$^2$ | p, mbar | $H_2O$ permeance | $H_2O/N_2$ separation factor |
| 65-3 | 46.0 | 43-h ball-milled 1.7 μm micro-A | 3 | 0.19 | 1.18 | 5 | 7.6E−06 | 621 |
| 65-2 | 42.7 | 43-h ball-milled | 1 | 0.20 | 2.04 | 14 | 8.7E−06 | 5 |
| 65-1 | 43.8 | 1.7 μm macro-A | 2 | 0.25 | 1.73 | 5 | 7.1E−06 | 176 |
| 65-4 | 32.9 | attrition-milled 1.3 μm macro-A | 3 | 0.21 | 1.51 | 5 | 4.8E−06 | 280 |
| 13-6 | 42.7 | attrition-milled | 2 | 0.17 | 1.91 | 5 | 1.2E−05 | infinite |
| 11-5 | 42.4 | 1.1 μm macro-A | 2 | 0.18 | 1.87 | 5 | 1.0E−05 | 3333 |

Figure 18B:
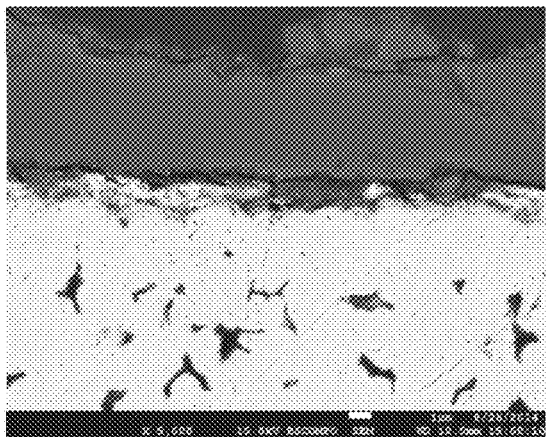
Figure 18C:
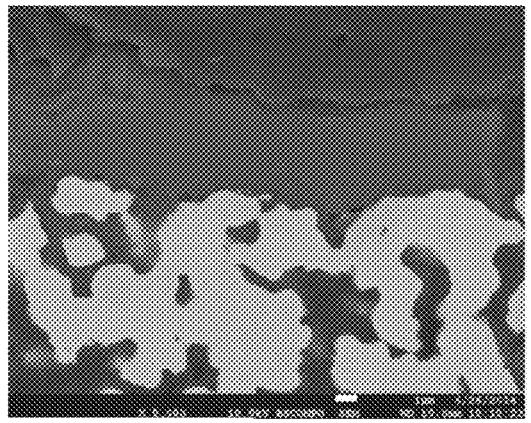
Figure 18D:
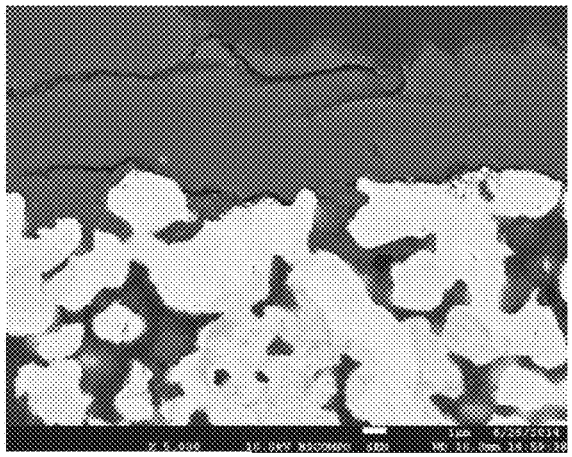

The membrane grown with the micro-A seeding crystal showed both higher $H_2O$ permeance and $H_2O/N_2$ selectivity than those membranes with the sequential seeding of micro-A and nano-A. Thus, additional seed coating with nano-A is not necessary to obtain a quality zeolite membrane. One-time spray coating with the 1.7 μm macro-A seeding crystal resulted in a membrane of poor $H_2O/N_2$ selectivity, indicating that one-time coating was not sufficient to disperse the seeding crystals uniformly on the seems to exist as a separate layer from the support. This is explained by in-sufficient penetration of the seeding crystal into support pores and in-sufficient zeolite membrane growth into the pore. The impact of the support porosity on the membrane growth is illustrated by FIG. 18B. The support used for preparation of this membrane (mem #65-4) happened to have fairly low surface porosity. The membrane seems to exist as a segregated layer. The low porosity caused blockage of permeation paths after molecules diffuse through the membrane layer, which explains the low $H_2O$ permeance of this membrane. By use of the support of higher porosity and macro-A seeding crystals of smaller sizes, excellent interlocking between the membrane layer and support is shown (FIGS. 18C and 18D). The cracks in FIG. 18D were caused by polishing during the SEM sample preparation.

It is found by this study that a support sheet of 35 to 45% porosity produces consistently high $H_2O$ permeance and $H_2O/N_2$ selectivity. The optimum particles size to use the macro-A as a seeding crystal is between 1.0 to 1.4 μm (d50).

Figure 19:
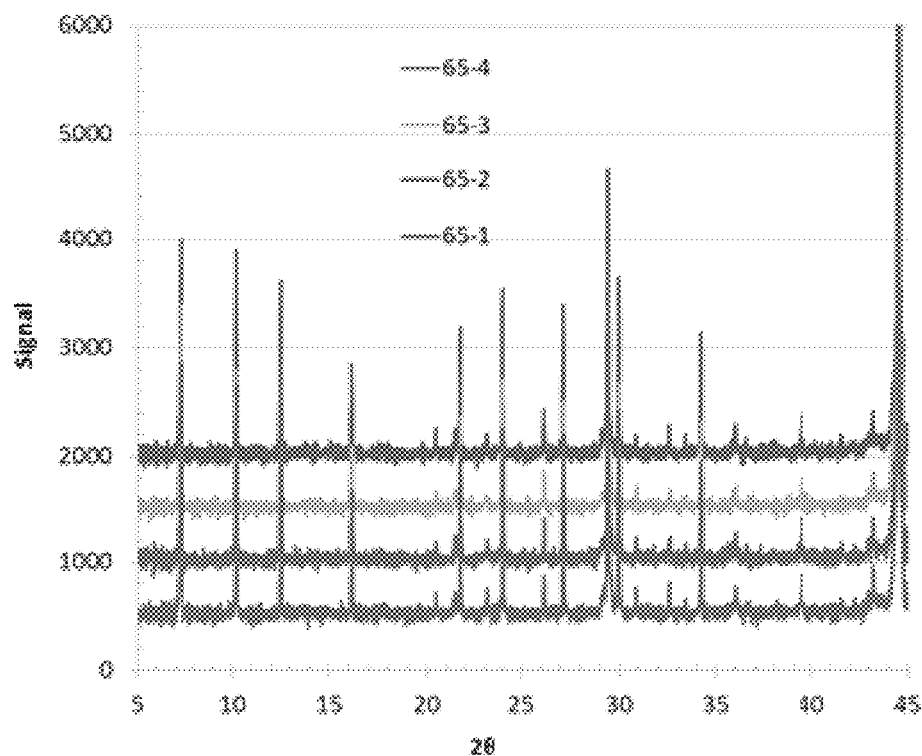
FIG. 19 is a tracing illustrating XRD patterns of NaA membranes grown on the support seeded with one type of seeding crystal.

The NaA crystal phase $(Na_{12}(Si_{12}Al_{12}O_{48})\times H_2O)$ of the resulting membranes was confirmed by XRD analyses. FIG. 19 shows that the XRD patterns of four membranes grown with different seeding crystals completely overlap. Thus, the zeolite membrane crystal phase is not affected by usage of different seeding crystals of different sizes. The membranes of the same XRD pattern can exhibit very different gas separation performances. The gas separation performances such as permeance and selectivity are substantially affected by detailed membrane structures that depend on membrane preparation.

Another group of membranes (Table 6) were prepared using the same seed coating process but different growth temperatures to further understand membrane growth with the macro-A seeding crystal.

ever, the relative XRD peak intensity for the membrane grown with 3.5-hour hold looks very different from the previous two. This can be explained by deposition of zeolite crystals from bulk solution onto the membrane surface during growth. Extensive surface coverage of the membrane grown with 3.5-hour hold is shown by the SEM image in FIGS. 21A-21F. The membrane surface textures revealed by SEM are consistent with observation of the spent growth solution. The growth solution generated from 3.5-hour holding showed rapid solid precipitation after discharged from the reactor. By contrast, the growth solution discharged from the 0-hour hold growth was homogenous without any solid precipitation or phase segregation, which looked like the fresh growth solution. The solution discharged from 1-hour hold growth had a phase state between the above two. Thus, the bulk phase zeolite growth occurred significantly with 3.5-hour hold at 90° C. and large zeolite crystals were formed. Those large crystals could adhere onto the membrane surface during settling under the growth condition. This study shows that the zeolite membrane grows faster than the bulk-phase crystal growth, and the growth time can

TABLE 6

Membranes prepared with standardized seed coating procedures and conditions
(seeding crystal: attrition-milled macro-A; growth conditions: 1° C./min to 90° C.; separation
testing conditions: 30° C., 3.3% $H_2O$ in $CO_2$/air mixture)

| | Membrane preparation | | | | | Gas permeance, mole/m²/s/Pa | | | |
|---|---|---|---|---|---|---|---|---|---|
| Mem ID 60037- | Support porosity % | Seed loading mg/cm² | Hold time at 90° C. h | Spent soln | Growth gain mg/cm² | $H_2O$ | $CO_2$ | $O_2$ | $N_2$ |
| 94-1 | 41.4 | 0.25 | 3.5 | Solids settled quickly | 2.29 | 5.8E−06 | ND | ND | ND |
| 96-94-1 | 44.1 | 0.24 | 1 | some solids settled but some remained dispersed | 1.89 | 5.7E−06 | 2.0E−09 | ND | ND |
| 98-94-1 | 40.3 | 0.22 | 0 | No solid settling | 1.35 | | | | |

Figure 20:
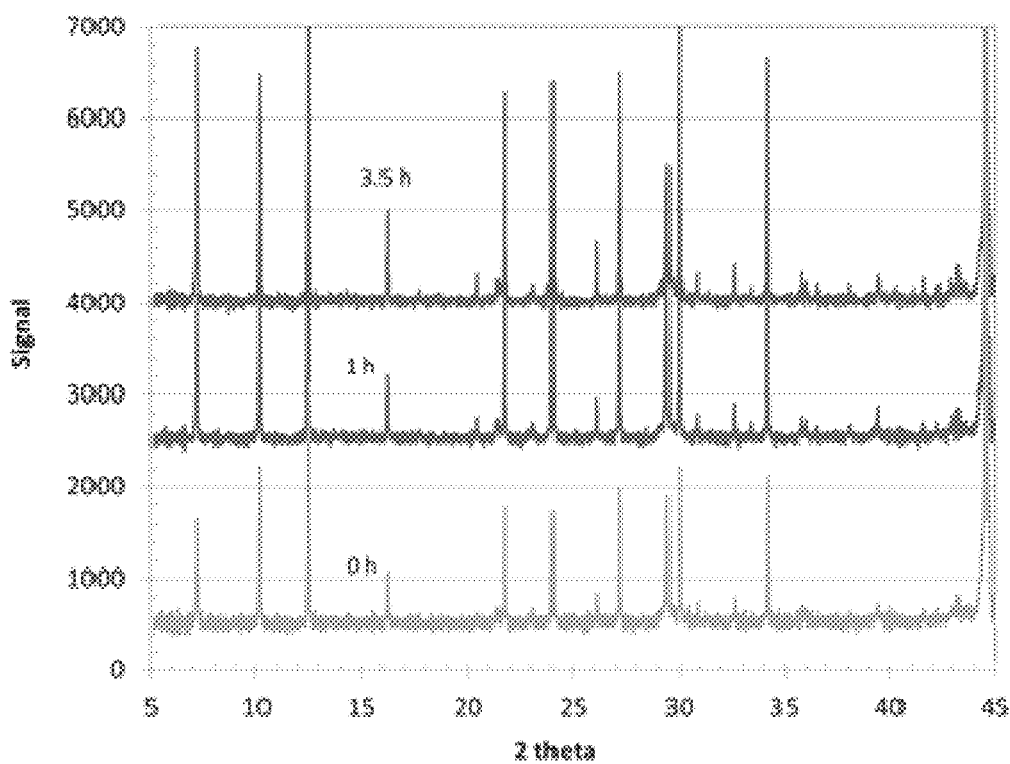
FIG. 20 is a comparison of tracing obtained from NaA membranes grown with different holding time at 90° C.
Figure 21A:
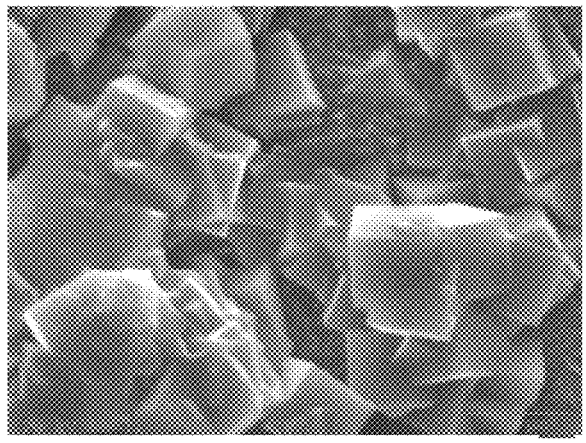
FIG. 21A-21F are SEM images for surface and polished cross-section of membranes grown at different holding time at 90° C. on the support seeded with identical seeding solution and procedures.
Figure 21B:
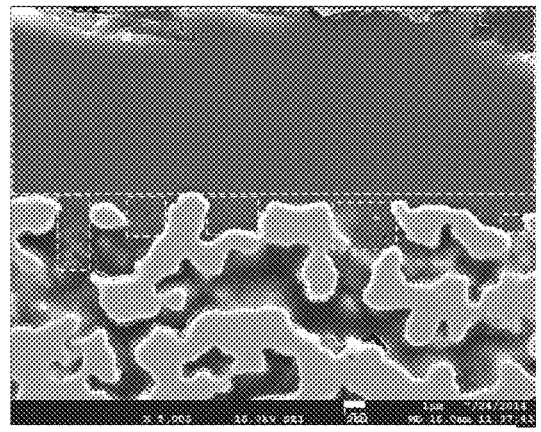
Figure 21C:
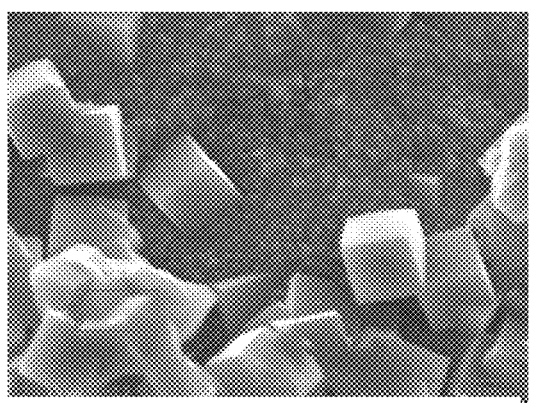
Figure 21D:
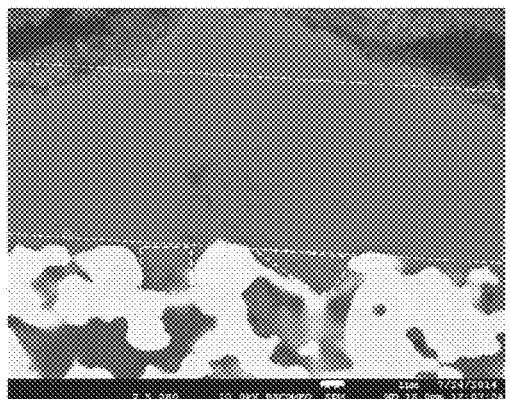
Figure 21E:
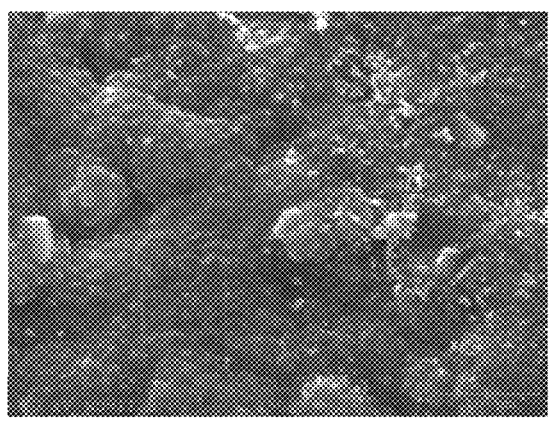
Figure 21F:
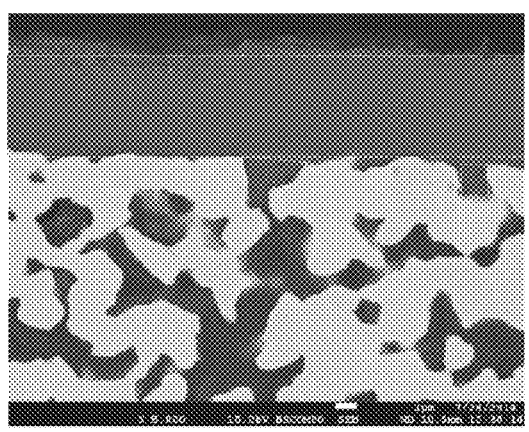

The three porous Ni sheets of desirable porosity were coated with the 1.1 μm macro-A seeding solution in one batch under the same conditions. The loading levels for the three sheets are approximately same—around about 0.23 mg/cm². The zeolite membrane growth was conducted with different holding times at 90° C. The weight gain after growth decreased with reducing holding time. The NaA crystal phase was identified by XRD analysis for all the three membranes (FIG. 20). It is very interesting to note that the zeolite membrane can be formed at such a short holding time, indicating a rapid zeolite crystal growth rate on this macro-A seed. The relative XRD peak intensity for the membrane grown with 0-hour hold matches well with that for the membrane grown with 1-hour hold. Thus, there is similar crystal orientation in these two membranes. Howbe optimized to obtain a dense membrane layer while minimize deposition/inclusion of the bulk-phase crystal on the membrane.

The air dehumidification testing results suggest that deposition of the bulk crystal on the membrane surface may not affect $H_2O$ permeance and $H_2O/N_2$ selectivity. But, inclusion of large bulk crystals into the membrane may induce some stresses and become a membrane durability issue that remains to be studied in the future.

Inter-growth of the zeolite membrane layer with the support is clearly manifested by these three membrane samples of adequate support porosity and seed coating. The SEM images of cross-sections in FIGS. 21A-21F show clear penetration of the membrane growth into underneath support pores while bulk support pores are fully open. The membrane structural parameters for the thin-sheet zeolite membrane design are measured with the SEM images and summarized in Table 7.

TABLE 7

Membrane/support interface features of the membranes prepared with standardized procedures

| Mem ID 60037- | Mem thickness | Interface spot | 1 | 2 | 3 | 4 | 5 | 6 | Max | Avg |
|---|---|---|---|---|---|---|---|---|---|---|
| 94-1 | ~8.7 μm | Pore width, μm | 1.5 | 1.8 | 2.5 | 3.0 | 1.2 | | 3.0 | 2.0 |
| | | Depth, μm | 3.6 | 1.9 | 2.3 | 2.3 | 0.9 | | 3.6 | 2.2 |
| 96-94-1 | 8.21 to 8.63 μm | Pore width, μm | 3.9 | 4.5 | 2.5 | 5.1 | | | 5.1 | 4.0 |
| | | Depth, μm | 1.2 | 5.4 | 2.3 | 2.3 | | | 5.4 | 2.8 |
| 98-94-1 | ~4.9 μm | Pore width, μm | 2.0 | 3.0 | 4.0 | 1.7 | 3.1 | 1.3 | 4.0 | 2.5 |
| | | Depth, μm | 1.3 | 1.0 | 1.2 | 2.1 | 2.5 | 1.6 | 2.5 | 1.6 |

Figure 22:
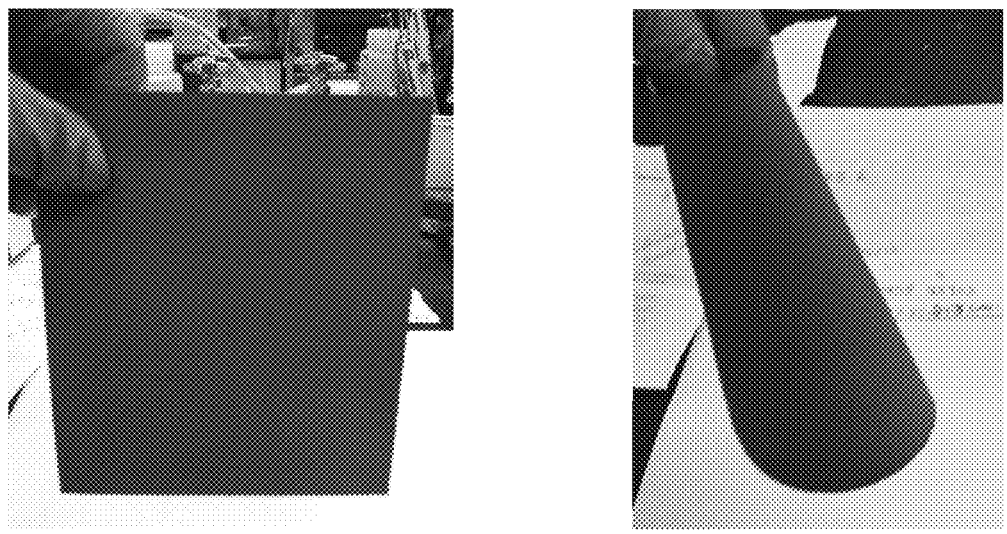
FIG. 22 is a set of digital images illustrating the mechanical strength and flexibility of a 50 μm-thick 12 cm×12 cm NaA/metal sheet membrane.

The membrane layer thickness can be as high as 8 to 9 μm without cracks. At such a membrane layer thickness, the zeolite membrane sheet exhibits the rigidity and flexibility same as the original metal support sheet. FIG. 22 shows that a 12 cm×21 cm zeolite membrane sheet can be self-stood and is also flexible to bend. The sheet can be bent onto ½" tube without cracking and is restored back to a flat sheet after bending. This may be attributed excellent elasticity of zeolite frameworks.

The support pore width and growth penetration depth are measured at different interface spots for the three membranes. These measurements are conducted at the spots of relatively large pore width to assess the upper limit of the support pore size and penetration depth for making a stable and quality zeolite membrane with the present design idea and preparation method. The smaller support pores are not a concern for formation of a continuous membrane layer and smaller penetration depth is not a concern for the membrane stress. Although no pore sizes greater than 2 μm were measured by the mercury porosimetry for these porous Ni support sheets used, the SEM images revealed frequent presence of pores with >2 μm width in these three membranes. The pore width and penetration depth vary significantly at different spots. The average values are mostly for reference purpose. For actual membrane preparation, the maximum allowable pore width and penetration depth are more useful. Thus, the largest pore width and penetration depth from a limited number of spots are identified for each membrane in Table 7. The maximum pore width looks to be about 5.1 μm, while the maximum penetration depth is about 5.4 μm.

iv. Membrane Preparation on Supports of Rough Pores

To further understand the support pore requirements for direct growth of a stable and quality zeolite membrane, the membrane preparation was conducted with a few support sheets different from the porous Ni sheet used in all the above studies. The seed coating solution, spray coating procedure, growth solution, and growth procedure and conditions were kept to be the same. Table 8 lists the preparation conditions with four porous Ti support sheets and air dehumidification testing results of resulting membranes.

TABLE 8

Growth of NaA membrane on different support materials (standard seeding, growth solution, and growth procedures)

| Membrane ID | Support Name | Porosity | Seed coating load, mg/cm² | Membrane thickness, μm | Growth gain, mg/cm² | Leak test | Air dehumidification tests P, mar | $P_{H2O}$ | $H_2O/N_2$ |
|---|---|---|---|---|---|---|---|---|---|
| 127-124-1 | 50 μm-Ni | 0.32 | 0.20 | 1.71 | 1.34 | No | 5 | 8.0E−6 | 347 |
| 127-124-6 | 134 μm-Ti | 0.37 | 0.18 | 1.49 | 4.56 | leak | | | |
| 127-124-11 | | 0.37 | 0.31 | 2.61 | 3.68 | leak | | | |
| 127-124-7 | 150 μm-Ti | 0.44 | 0.16 | 1.33 | 4.79 | leak | | | |
| 127-124-12 | | 0.44 | 0.28 | 2.35 | 3.74 | leak | | | |
| 127-124-8 | 43 μm/ 250 μm Ti | 0.47 | 0.17 | 1.41 | 4.54 | minor leak | 11 | 4.7E−6 | 4 |
| 127-124-13 | | 0.47 | 0.28 | 2.32 | 3.03 | leak | | | |
| 127-124-14 | 43 μm/ | 0.57 | 0.28 | 2.36 | 3.71 | No | 9 | 6.1E−6 | 11 |
| 127-124-9 | 140 μm Ti | 0.57 | 0.38 | 3.19 | 4.50 | No | 7 | 3.5E−6 | 10 |

A porous Ni sheet was used in this batch of studies for control purpose. The two porous Ti sheets have a symmetrical structure—same as the porous Ni sheet, while the other two Ti sheets have an asymmetric pore structure. For each Ti support sheet, two seed loading levels were used for membrane growth. The rationale was that those support sheets of larger pores than the porous Ni sheet would need more seed coating material to cover. The growth weight gains for those Ti support sheets are about 2 to 4 times of that for the Ni sheet. However, except for the last two membranes, all the other Ti-supported membranes leaked. The leakage was checked by dropping Red40-colored water on the membrane surface. The color molecules would emerge in the other side of the membrane sheet if there are major defects on the membrane. For a quality zeolite membrane such as the Ni-supported one, the color molecule permeation would be blocked. It is noted that for the first three Ti support sheets, more weight was gained from growth with the support of less seed loading. It seems to be contrary to general perception. The problem was caused by more zeolite growth in interior pores of the support of less seed loading, because a continuous membrane was not formed and the solute in the growth solution could consistently diffuse into the support pore during growth process. The membranes grown on the 43 μm/140 μm Ti support did not show color leakage, which is an encouraging sign. However, air dehumidification tests showed that $H_2O/N_2$ separation factor is only 10-11, which is dramatically less than 347 for the Ni-support membrane made in the same batch. For this support, increasing the seed loading did result in higher growth weight gain. The permeance decreased but the selectivity was not improved.

Figures 23A, 23B:
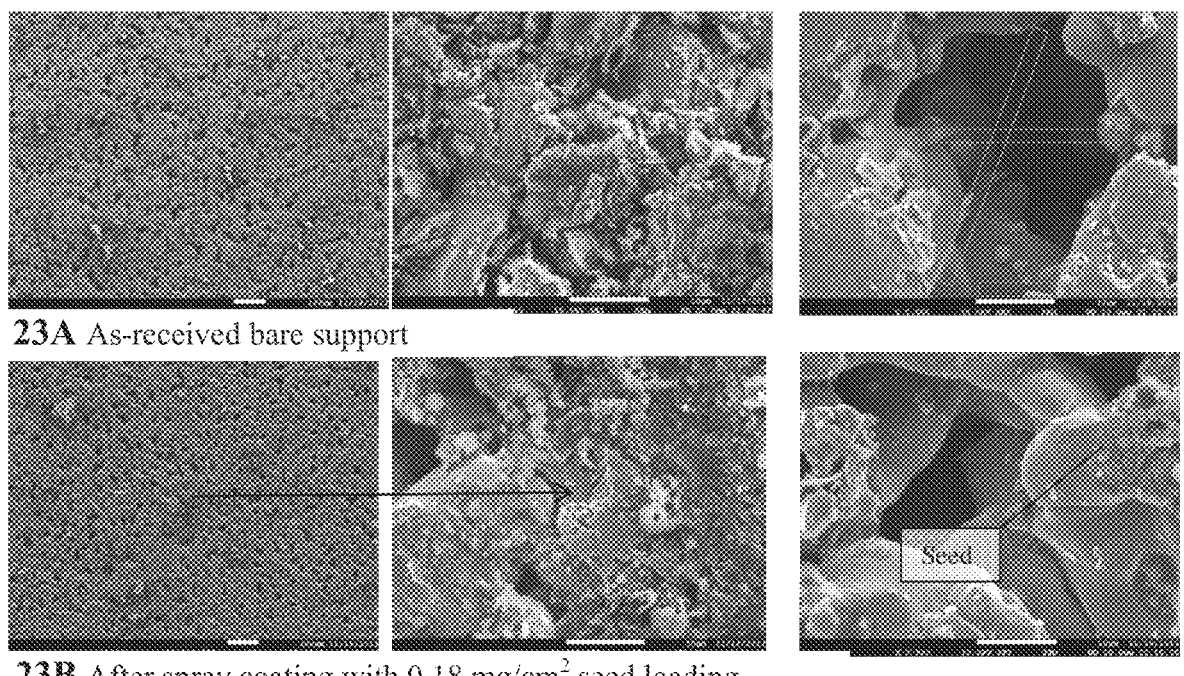
FIGS. 23A and 23B are SEM images of surface textures of 134 μm-thick porous Ti support as-received and after seed coating.

The root causes are revealed by SEM analysis. FIGS. 23A-26C show SEM images of the bare support, after seeding, and after growth for the four Ti supports, respectively. FIG. 23A shows that majority of the 134 μm-Ti support surface comprises pores of micro and sub-micrometer level. However, presence of pores as large as 10×20 μm was found. These large pores still exist after seed coating (FIG. 23B), because the pores are too large to be covered. Presence of large pores at tens of μm level was also found for the 150 μm-Ti support (FIGS. 24A-24D). Those large pores remained open after seed coating. Increasing the seed coating from 0.16 to 0.28 mg/cm² did not help. After zeolite membrane growth, those large pores were narrowed down significantly. However, the holes remained there. The pores were too large to be closed by the secondary crystal growth.

The coated Ti sheet (43 μm/250 μm Ti in FIGS. 25A and 25B) showed a fairly smooth surface with average pores at micrometer level. Unfortunately, there were holes of 10 to 20 μm size, and such holes are too large to be covered by the seed coating and secondary growth. The coating-modified 43 μm/140 μm Ti sheet exhibited the smoothest surface among the four Ti sheets studied (FIGS. 26A-26C). The average pore size for this support is much smaller than the first two and is comparable to the third Ti. Large holes at tens of μm level were not found. However, some surface pores or cavities of as wide as 20 μm still existed. After seed coating, majority of the support surface was covered by the seeding crystals. However, there were pores of width at about 5 to 10 μm level. After the zeolite growth, majority of the surface was covered with a dense inter-grown crystal layer. But, some cavities remained. This membrane showed molecular sieving functions but there must be large defected pores that limit the selectivity.

It becomes clear through this group of comparative membrane preparation studies that the support surfaces have to be free of large holes, pores, and cavities for making a thin-sheet membrane of high permeance, high selectivity, and good adhesion. Judging from the mean pore size and even from pore size distribution is in-sufficient, because presence of some isolated large pores and/or holes can ruin the membrane. Direct examination of the support surface structure is necessary. For preparation of thin-sheet zeolite membranes with the design principle and preparation method presented in this paper, the support surface need to be free of pores or defects above 10 μm.

D. Conclusion

Thermal stress distribution in the zeolite/metal sheet membrane has been modeled to understand impacts of some important structural and material parameters (membrane layer thickness, penetration depth, support pore size, thermal expansion coefficient) on formation of potential membrane defects. The thin-sheet membrane design concept is also elaborated experimentally using secondary growth method. The theoretical stress modeling results qualitatively agree with the experimental findings.

Seed coating is one critical step in making a high-performance membrane. The seeding crystals need to be uniformly dispersed on the support surface for uniform membrane growth, and a fraction of seeding crystals also need to be deposited into the outer pores of the support for certain penetration of membrane growth into underneath support pores. It is found that parent NaA powder of conventional sizes after proper milling can act as an effective seeding crystal. Spray coating is developed as a simple method to lay down the seeding crystals on the support sheet. An appropriate seed loading surface density (mg/cm²) is necessary to obtain a quality membrane. The membrane layer thickness <10 μm and penetration depth <5.5 μm were found with the membranes that are stable exhibiting both high permeance and selectivity.

The support surface textures are vital for formation of a continuous, dense zeolite membrane layer. In the present example, knowing the mean pore size is not sufficient. Direct examination of a support surface by microscopy allows one to assess if it is suitable for making the proposed membrane. The support surface needs to be substantially free of any holes, pores, and cavities above 10 μm, i.e., the probability to find such large defects under microscopy is less than 1% if representative given membrane support surfaces are sampled. The preferred support porosity is from 20 to 50%. $H_2O$ permeance of 1.0E-5 mole/s/m²/Pa with $H_2O/N_2$ separation factor above 3000 can be obtained with an optimum membrane.

IV. Exemplary Embodiment #2

In this specific example, the template-free solution for the water-selective zeolite membrane, NaA, has a composition comprising $4Na:2Si:2Al: 150H_2O$. It is prepared by forming an aluminate solution by dissolving 7.95 g sodium hydroxide (Wako, >97%) and 10.82 g aluminum hydroxide (Wako, >95%) in 45 g D.I. water by stirring at 100° C. (temperature measured by thermometer) for 30 minutes to get a non-clear solution. A silicate solution was prepared by dissolving 13.78 g sodium silicate (Wako, 17-23% $Na_2O$) in 123 g D.I. water by stirring at 50° C. for 2 hours to get a clear solution. The aluminate solution was then added into the silicalite solution drop-wise at room temperature and the resulting mixture was stirred vigorously for 30 minutes at room temperature to produce a homogeneous gel without observable precipitation or phase segregation. The preferred conditions for inter-crystal layer growth using the above solution are about 3 hours and 100° C.

Figure 27A:
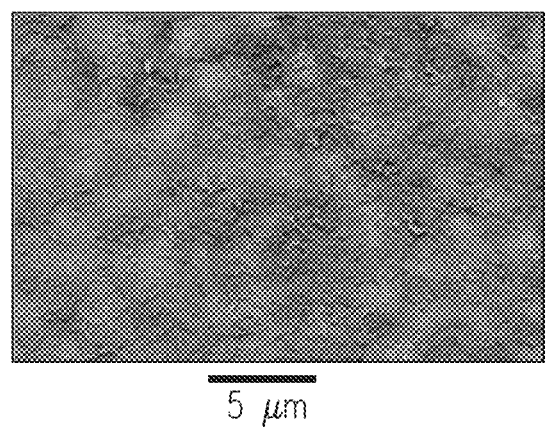
FIG. 27A-27C are SEM micrographs of an embodiment of a zeolite membrane sheet in which the membrane layer was prepared with a seeding layer and using a template-free synthesis solution.
Figure 27B:
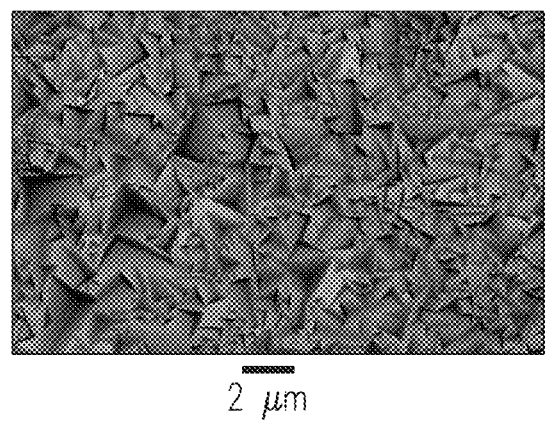
Figure 27C:
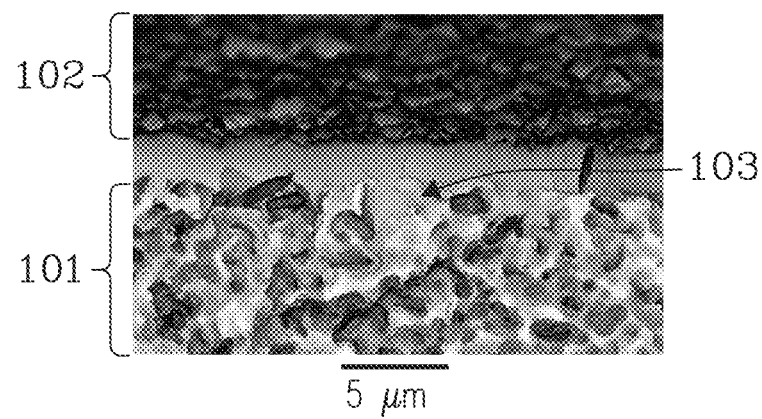

FIGS. 27A-27C are scanning electron microscope (SEM) micrographs showing the structure of the water-selective (NaA) membrane prepared by hydrothermal growth of seeded porous metal substrate with template-free synthesis solution, as described above. FIG. 27A shows the surface of the porous metal substrate coated with seed crystals having a size of about 0.3 μm. FIG. 27B shows the surface of the membrane layer after hydrothermal growth. FIG. 27C is a cross-sectional view of the membrane sheet. The pores of the metal support 101 are fully covered by two times of coating with NaA seed crystals of about 0.3 um crystal sizes. Distinctive seed crystals are visible on the seeded substrate. A dense and continuous zeolite membrane 102 is formed after hydrothermal growth. The cross-sectional view of fractured membrane sheet shows certain penetration 103 of the seed crystal into the support pore, which is important to have strong adhesion.

For forming a hydrocarbon-selective or an alcohol-selective membrane, a similar procedure is followed except the seeding and inter-crystal growth solutions would contain precursors for the hydrocarbon-selective or the alcohol-selective zeolite and, in the particular example below, a template-containing synthesis solution was used. For example, a silicalite membrane can be prepared according to the following. A thin porous Ni sheet is first spin-coated with approximately 100 nm silicalite seed crystals. The seeding suspension was prepared by mixing 10 g of 3 wt % silicalite suspension with 4 g of 20 wt % polyethylene glycol (PEG) solution and 5 g of 25 wt % surfactant C18EO10/isopropanol solution under sonication. The suspension was shaken for two days. The seeding suspension was degassed and filtered using a 5 μm filter before spin coating. The thin porous Ni sheet was placed on a magnet tape and the spin-coating was conducted using a spin coater. The spin rate was 1500 rpm. After that, the seed-coated substrate was dried at 150° C. for 20 minutes.

The silicalite synthesis solution for hydrothermal growth had a molar composition of 1.0 TPAOH: 8.14 TEOS: 589H2O and was prepared by mixing 5.65 ml Tetrapropylammonium hydroxide (TPAOH, 1M solution in water, Aldrich), 10.2 ml Tetraethyl Orthosilicate (TEOS, 98%, Acros) and 60 ml D.I. water. The mixture was stirred at 5° C. for 2 hours and a clear solution was obtained. A disc substrate was mounted in a reactor with its seeded surface facing down-wards. The reactor was put into an oven pre-heated to 180° C. for 2 hours and then cooled down naturally in air. The sample was taken out, rinsed under running D.I. water, dried with compressed air, and kept in a 50° C. oven overnight. The silicalite membrane sheet was then heated at 400° C. for 4 hours in 2 vol. % O2/N2 mixture. The rate for both heating and cooling were 1° C./min.

Figure 28A:
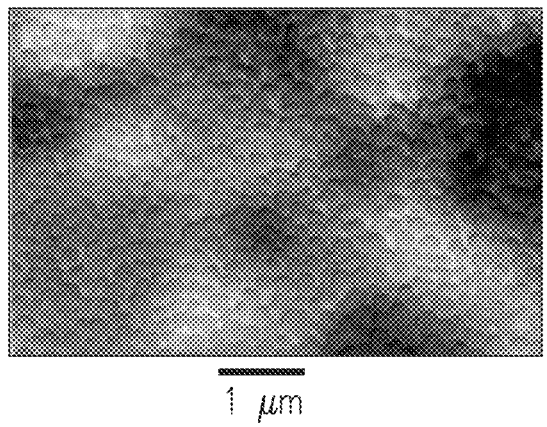
FIGS. 28A-28D are SEM micrographs of an embodiment of a hydrocarbon-selective and/or alcohol-selective zeolite membrane sheet in which the membrane layer was prepared with a seeding layer and using a template-containing synthesis solution.
Figure 28B:
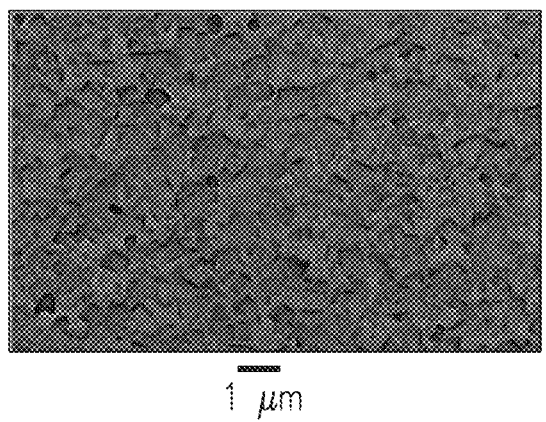
Figure 28C:
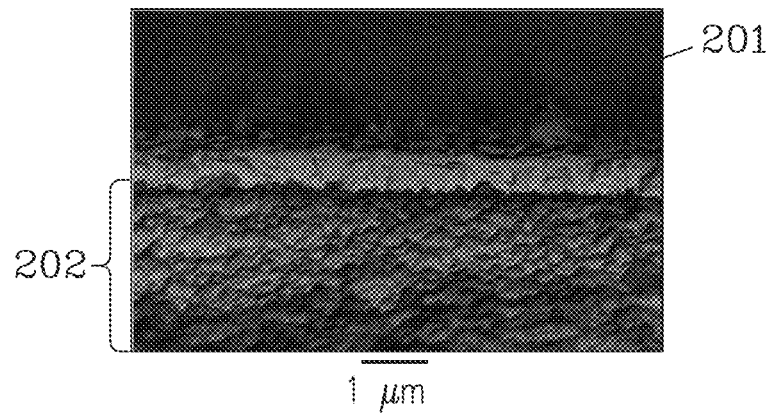
Figure 28D:
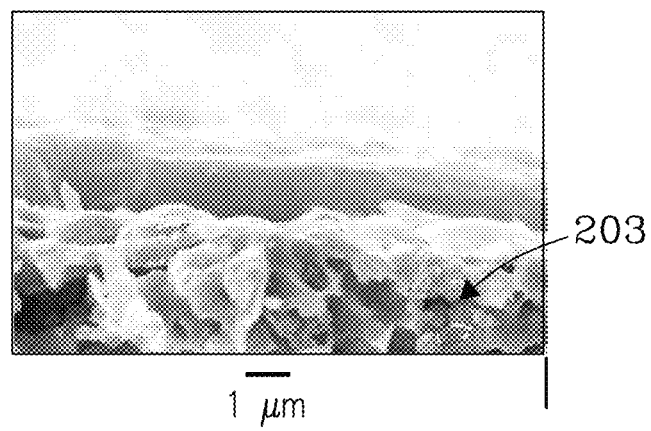
Figure 28E:
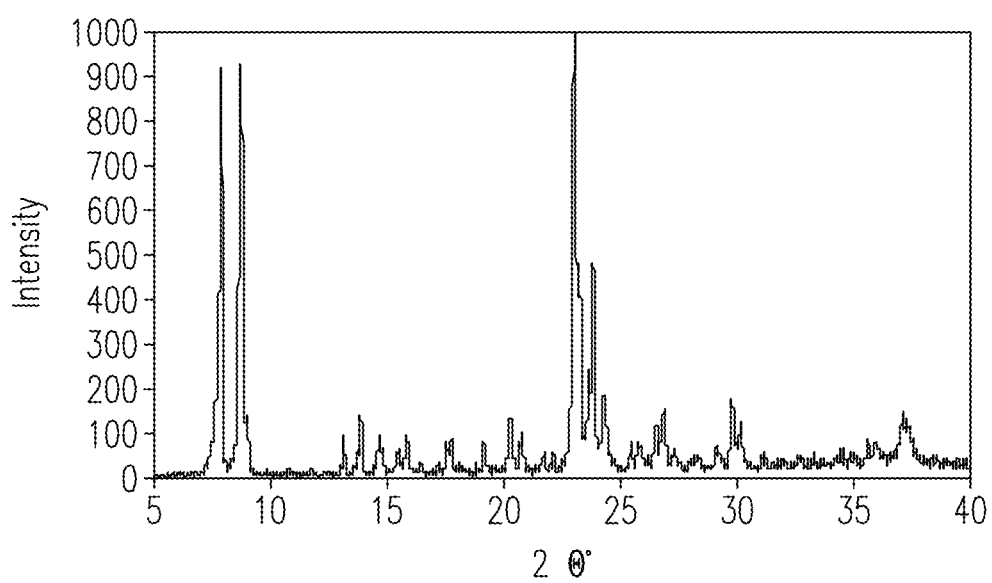
FIG. 28E is a X-ray diffraction spectrum obtained from an embodiment of a hydrocarbon-selective and/or alcohol-selective zeolite membrane sheet in which the membrane layer was prepared with a seeding layer and using a template-containing synthesis solution.

FIGS. 28A-28D are SEM micrographs obtained from a hydrocarbon-selective and/or alcohol-selective zeolite membrane formed according to embodiments of the present invention. FIG. 28A shows the porous metal substrate coated with silicalite seed crystals. FIG. 28B shows the surface of the membrane layer after hydrothermal growth and calcination. FIG. 28C is a cross-sectional view of the membrane sheet. FIG. 28D is another cross-sectional view showing a smaller scale with greater detail and, again, shows certain penetration 203 of the seed crystal into the support pore. The membrane was prepared by hydrothermal growth of the seeded substrate with a template-containing synthesis solution as described above. Referring to FIG. 28C, a continuous zeolite film 201 of thickness 1~2 um is formed on the substrate 202. Referring to the X-ray Diffaction (XRD) spectrum in FIG. 28E, existence of the zeolite crystal structure is verified by the thin-film XRD measurement.

In some instances, the zeolite membrane layer can be formed directly on the porous metallic sheet without the use of a seeding layer. For example, a NaA zeolite membrane can be formed on a thin, porous metal support sheet without a seeding layer using a synthesis solution having a molar composition of 10 $Na_2O$: 0.2 $Al_2O_3$:$SiO_2$: 200 $H_2O$. The solution was prepared by combining 0.2 g aluminum powder (200 mesh, 99.95+%, Aldrich) and 64.12 g DI water in a 250 ml polypropylene bottle and stirring for about 10 mins. 14.828 g of sodium hydroxide (Aldrich) was added and the bottle quickly capped. Stirring for additional 30 minutes. 3.71 g Ludox LS30 colloidal silica (30 wt %, silica, Aldrich) was added drop-wise to the stirring solution. Solution was stirred for approximately 4 hrs until it become clear.

The direct hydrothermal growth was performed in a reactor with the front side of the porous Ni support sheet facing downward. The back side of the support sheet was covered with Teflon or another substrate to avoid crystal growth. 18 ml of the NaA synthesis solution was poured into the reactor. The reactor was then sealed and heated in a pre-heated oven at 65° C. for 7 hours. After the hydrothermal growth, the reactor was cooled down naturally in air. The NaA membrane sheet was taken out, rinsed under running D.I. water, dried with compressed air, and kept at 50° C. overnight. The membrane was then heated at 400° C. for 4 hours in 2 vol. % O2/N2 mixture. The rate for both heating and cooling were 1° C./min.

Figure 29A:
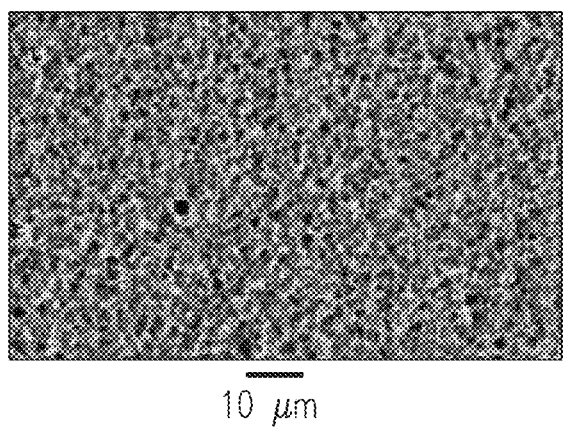
FIGS. 29A-29D are SEM micrographs of an embodiment of a water-selective zeolite membrane sheet in which the zeolite membrane is formed directly on the support sheet without a seeding layer.
Figure 29B:
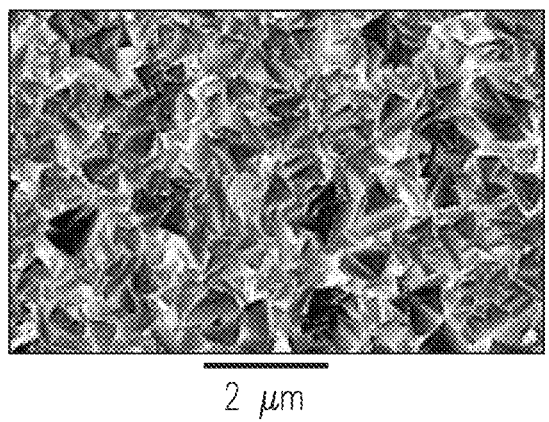
Figure 29C:
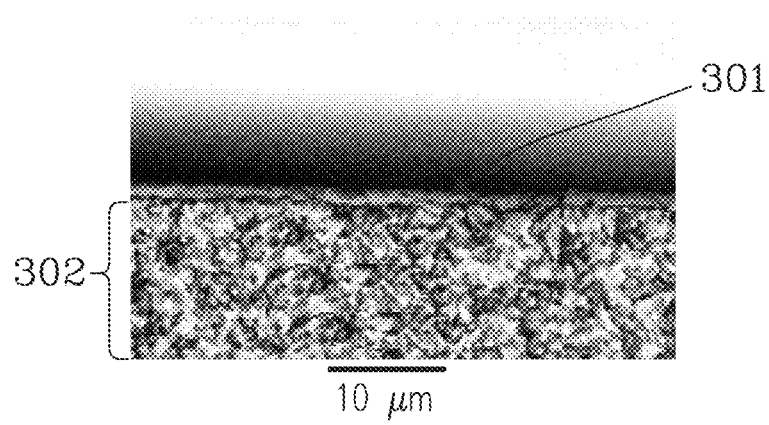
Figure 29D:
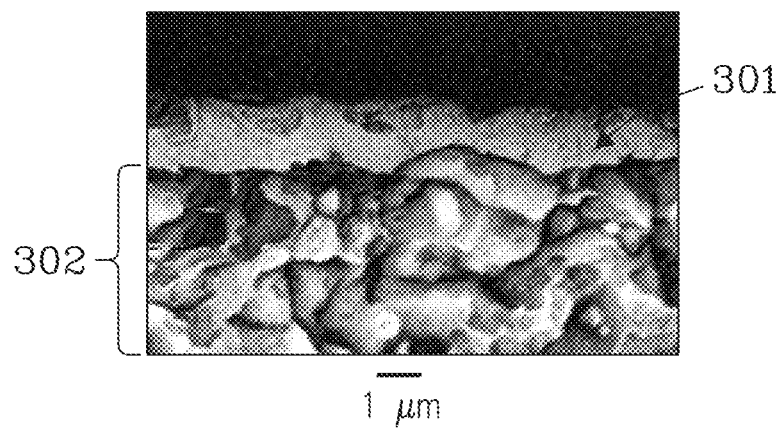
Figure 29E:
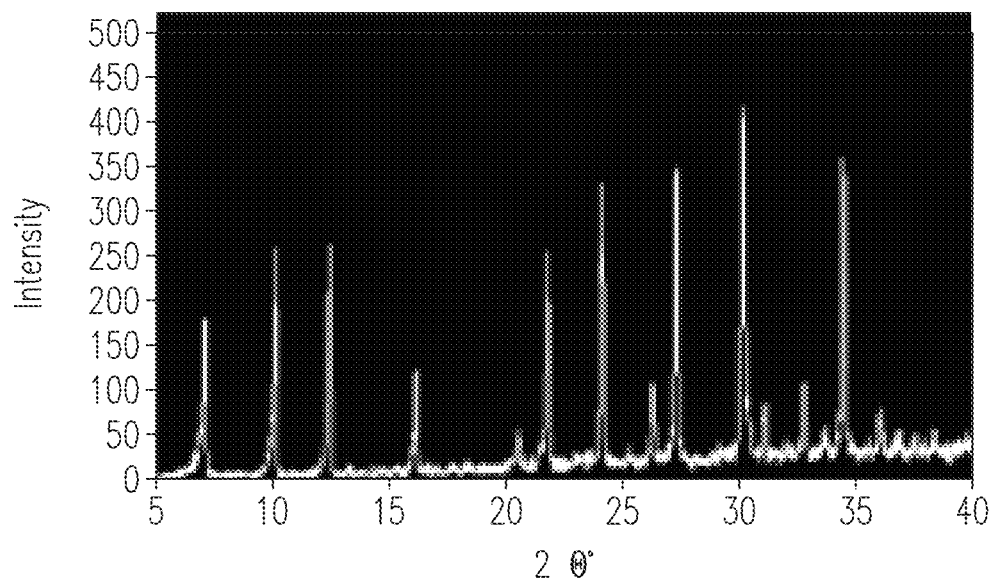
FIG. 29E is an X-ray diffraction (XRD) spectrum obtained from an embodiment of a water-selective zeolite membrane sheet in which the zeolite membrane is formed directly on the support sheet without a seeding layer.

FIGS. 29A-29D show SEM micrographs obtained from a hydrophilic-type zeolite NaA membrane. FIGS. 29A and 29B show at two different scales the surface of the membrane layer after hydrothermal growth. FIGS. 29C and 29D are a cross-sectional views at two different scales of the membrane sheet. A continuous zeolite film 301 having a thickness less than 2 μm is formed directly on the substrate 302 without a seeding layer. The structure of the membrane layer can be seen in the micrographs. Referring to the XRD spectrum in FIG. 29E, existence of the zeolite crystal structure and composition is determined by the thin-film XRD measurement. This membrane was prepared by the direct growth technique as described above.

TABLE 9

Testing results of a water-selective membrane for water removal from air.

| Feed Side Pressure | Permeance ($mol/m^2/s/Pa$) | | $H_2O/O_2$ Separation |
|---|---|---|---|
| (bar) | $H_2O$ | $O_2$ | Factor |
| 1 | 6.7E−08 | 6.0E−10 | 108 |
| 2 | 2.9E−08 | 6.8E−10 | 43 |
| 3 | 1.5E−08 | 3.6E−10 | 43 |

Testing conditions:
Feed side: 20 sccm of moisturized air (38.7% relative humidity, H2O molar fraction 0.0051),
Permeation side: atmospheric pressure, 40 sccm of He gas purge 24.5° C.
Separation temperature: 24.5° C.

Tables 9 and 10 show testing results for the water selective membrane of FIG. 29 with respect to water removal from air and from a water/ethanol mixture, respectively. Table 9 demonstrates that the NaA membrane is selective toward water vapor. The H2O permeance is about two orders of magnitude higher than the O2 permeance. However, the water vapor permeance decreases with increasing feed side pressure (or pressure gradient). This indicates that the membrane in the feed side is saturated and water vapor permeation rate is limited by diffusion rate of the adsorbed H2O rather than by gas-phase diffusion of $H_2O$.

TABLE 10

Testing results of the water-selective membrane for removal of water from water/ethanol liquid feed.

| Separation Temp, ° C. | Separation Process | Sampling Time, h | Permeation Flux ($kg/m2/h$) | Water in Permeate (wt %) | $H_2O$/EtOH separation factor |
|---|---|---|---|---|---|
| 60 | Pervaporation | 24 | 0.046 | 89.6 | 78 |

TABLE 10-continued

Testing results of the water-selective membrane for removal of water from water/ethanol liquid feed.

| Separation Temp, ° C. | Separation Process | Sampling Time, h | Permeation Flux (kg/m2/h) | Water in Permeate (wt %) | $H_2O$/EtOH separation factor |
|---|---|---|---|---|---|
| 90 | Gas-phase | 16 | 0.32 | 94.2 | 146 |
| 105 | Gas-Phase | 5.5 | 0.37 | 97.5 | 351 |

Testing Conditions:
Feed side: Continuous flow of 10 wt % water/ethanol liquid mixture, atmospheric pressure
Permeate side: Vacuum (−12.86 psi)

The separation performance of the water-selective membrane was further tested by feeding a water/ethanol liquid mixture into the membrane test cell. The feed mixture passes over the font side of the membrane. The permeate was pulled out by vacuum from the back side of the membrane and collected in the liquid $N_2$ trap. The testing conditions and results are listed in Table 10. At a separation temperature of 60° C., the separation process can be viewed as pervaporation, that is, liquid phase in the feed side and vapor-phase in the permeate side. At 90 and 105° C., the liquid feed should be vaporized and thus, the separation occurs in the gas-phase. The permeation flux significantly increases as the temperature is raised from 60 to 90 and 105° C., while the $H_2O$/EtOH separation factor increases at the same time. The results indicate that the present membrane performs well for gas-phase separation. The water content is concentrated to above 90% in the permeate side from 10 wt. % in the feed side.

TABLE 11

Testing results of the hydrophobic membrane for selective removal of ethanol from ethanol/water liquid by pulling vacuum in permeate side

| Separation Temp, ° C. | Testing time, h | EtOH wt % in permeate | EtOH flux, kg/m²/h | EtOH/$H_2O$ separation factor |
|---|---|---|---|---|
| 60 | 14.5 | 28.6% | 0.152 | 3.6 |
| 75 | 3.5 | 35.6% | 0.256 | 5.0 |
| 90 | 3.5 | 59.9% | 0.625 | 13.5 |

Testing Conditions:
Feed: 10 wt. % EtOH/water liquid flow, atmospheric pressure
Permeate: vacuum (−12.7 psi)

TABLE 12

Testing results of the hydrophobic membrane for selective removal of ethanol from ethanol/water liquid by gas sweep in permeate side

| Separation Temp, ° C. | Testing time, h | EtOH wt % in permeate | EtOH flux, kg/m²/h | EtOH/$H_2O$ separation factor |
|---|---|---|---|---|
| 60 | 2.5 | 62.3% | 0.23 | 14.9 |
| 75 | 1.75 | 55.7% | 0.44 | 11.3 |
| 90 | 1.0 | 61.1% | 0.84 | 14.1 |

Testing Conditions:
Feed: 10 wt. % EtOH/water liquid flow, atmospheric pressure
Permeate: 100 sccm of He sweep gas flow, atmospheric pressure The hydrocarbon-selective and/or alcohol-selective zeolite membrane shown in FIG. 28 was tested for ethanol/water separation by feeding 10 wt % ethanol/water liquid into the membrane testing cell. Table 11 lists testing results by pulling vacuum in the permeate side, while results in Table 12 were obtained by use of a sweep gas on the permeate side. The hydrocarbon-selective and/or alcohol-selective zeolite membrane is clearly selective toward EtOH permeation over $H_2O$. Both permeation flux and EtOH/$H_2O$ separation factor increases with separation temperature if the permeated is pulled by vacuum. By use of He sweep gas, the permeation flux still increases with temperature but the separation factor is nearly constant. The permeation flux with He sweep is consistently higher than the vacuum pulling.

The impact of membrane preparation conditions on separation performance of silicalite membrane sheets is illustrated by the experimental results in Table 13. Three membrane sheets were prepared with the same process steps. Briefly, each porous Ni sheet was coated two times with seed crystals of about 100 nm sizes dispersed in de-ionized water. The seed crystals were precalcined at 600° C. for 5 hours in air prior to making the coating suspension. The seeded substrate was grown in an autoclave reactor with the same templated solution but under different conditions. Membranes 1, 2 and 3 were synthesized at hydrothermal reaction temperatures of 140° C., 160° C., and 180° C., respectively. After growth, the membrane samples were treated 2 hours at 400° C. in 2% $O_2/N_2$ flow with 1° C./min temperature ramp rate (profile 1). After calcination at 400° C., membrane 3 was further heated in a pure hydrogen gas flow at 600° C. for 2 hours with 1° C./min temperature ramp rate, that is, profile 2. The resulting membranes were tested on the same testing apparatus under the same conditions. 10 wt % EtOH in $H_2O$ liquid was fed into the membrane testing cell at flow rate of 1 cc/min under atmospheric pressure, while the permeate was removed by vacuum at 1 torr. It can be seen that membrane 1, which was synthesized by 2 hours of growth at 140° C., gave the highest permeation flux and good selectivity.

TABLE 13

Impact of silicalite synthesis conditions on membrane separation performance.

| | Membrane # | | |
|---|---|---|---|
| | 1 | 2 | 3 |
| Growth conditions | 140 C., 2 h | 160 C., 2 h | 180 C., 2 h |
| Post treatment | Profile 1 | Profile 1 | Profile 2 |
| Separation performance | | | |
| Temp, ° C. | 75 | 75 | 75 |
| Ethanol/water separation factor/ | 22.8 | 30.0 | 2.0 |
| Total flux, kg/m²/h | 1.69 | 0.91 | 0.68 |

The impact of the synthesis conditions on separation performance of the $H_2O$-selective zeolite membrane is shown by the experimental results in Table 14. The porous Ni substrate sheet was first coated with the NaA zeolite seed of about 1.0 μm crystal sizes and followed with the about 0.3 μm zeolite crystal size. The zeolite membrane growth of the seeded substrate was conducted in an autoclave reactor with a template-free growth solution. With the same seeded substrate and same synthesis solution, separation performance is dramatically affected by the hydrothermal growth temperature. Both $H_2O$ flux and $H_2O$/ethanol selectivity were substantially increased by raising the growth temperature from 90 to 100° C. However, further increasing the growth temperature to 110° C. caused decline of H2O/ethanol selectivity. Several reaction processes occur simultaneously during the hydrothermal reaction process. Thus, the reaction conditions need to be well controlled to obtain the optimum zeolite membrane structure.

TABLE 14

Impact of hydrothermal growth conditions on H2O-selective membrane performance

| | Membrane # | | |
|---|---|---|---|
| | NaA 1 | NaA 2 | NaA 3 |
| Growth conditions | 90° C., 3.5 hrs | 100° C., 3.5 h | 110° C., 3.5 hrs |
| | Separation performance[a] | | |
| Flux, kg/(m² · h) | 0.9 | 3.8 | 3.5 |
| Ethanol in permeate, g/L | 50.16 | 0.33 | 12.84 |
| $H_2O$/EtOH selectivity factor | 168 | 27,465 | 689 |

[a]The membrane separation performance was characterized with 90 wt. % ethanol/water feed at 75° C. The feed was under atmospheric pressure, while the permeate side was under vacuum of ~1 torr.

Figure 30:
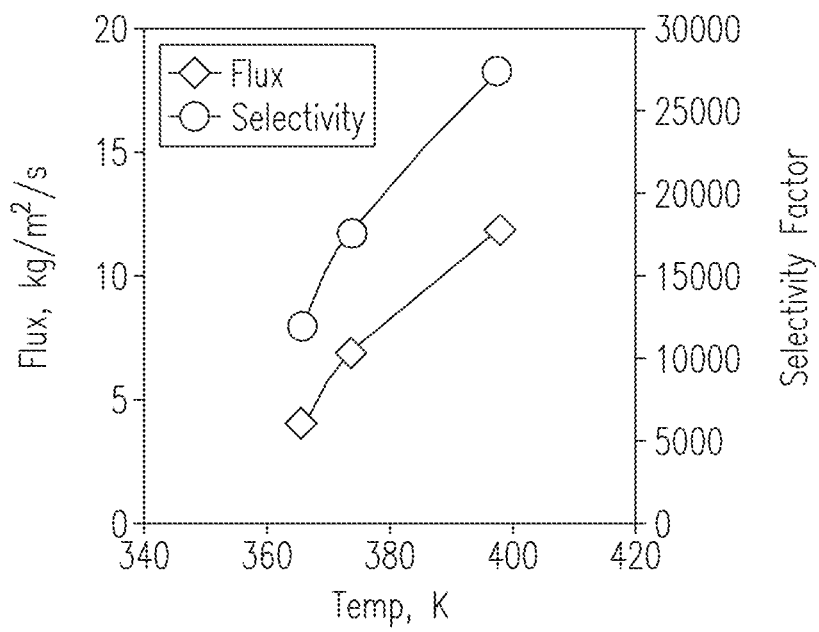
FIG. 30 is a plot of water permeation flux and water/ethanol selectivity factor as a function of temperature using an embodiment of a water-selective membrane sheet.
Figure 31:
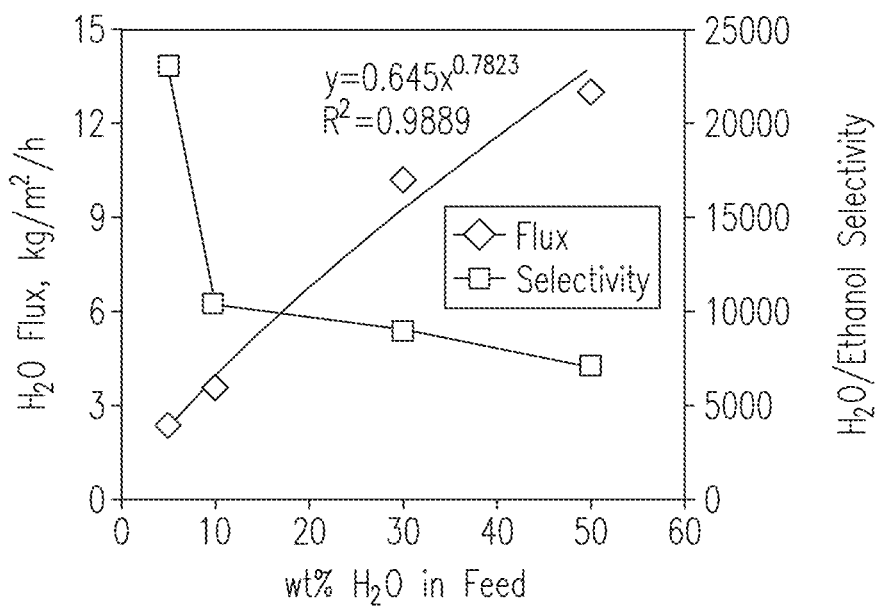
FIG. 31 is a plot of water flux and water/ethanol selectivity as a function of weight percent water in the feed mixture using an embodiment of a water-selective membrane sheet.
Figure 32:
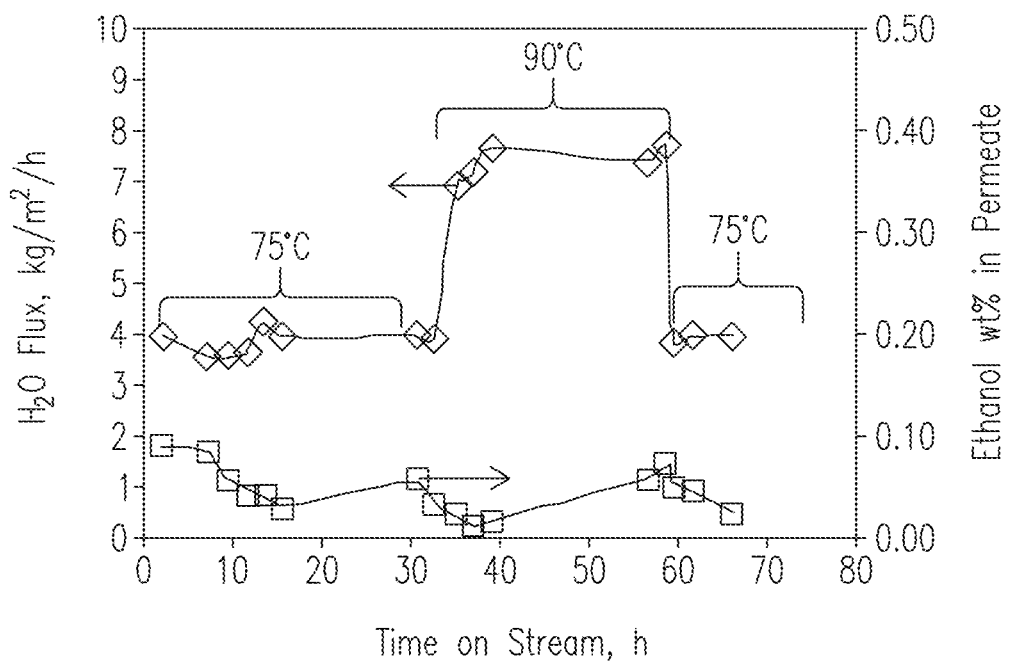
FIG. 32 is a plot of water flux and water/ethanol selectivity as a function of time on stream using an embodiment of a water-selective membrane sheet.

Robustness and high quality of the $H_2O$-selective membrane prepared under preferred conditions (NaA #2 in Table 14) have been demonstrated by separation testing under various conditions. FIG. 30 shows that both water permeation flux and $H_2O$/ethanol selectivity increase with separation temperature. In this set of testing, 10 wt % $H_2O$/ethanol feed was introduced into the membrane cell under atmospheric pressure and the permeate was removed by vacuum of 1 torr. The results clearly illustrate unique performance attribute of the zeolite membrane over a range of separation temperature. The membrane provided fairly high flux and selectivity at the testing temperature of 408K (135° C.). Most traditional polymeric membranes could not function at such high temperatures. The trend of concomitant increase of flux and selectivity is exceptionally desirable for a practical separation application, since most membranes in prior arts were encountered with a trade-off between the flux and selectivity, that is, decline of the selectivity with increasing flux. FIG. 31 shows membrane separation performance with different water content in the feed water/ethanol mixture at separation temperature of 75° C. The $H_2O$ permeation flux increases with the feed wt. %, which can be explained by the increased partial pressure gradient of water vapor across the membrane. The $H_2O$/ethanol selectivity decreases with increasing wt % $H_2O$ in the feed. This kind of performance attribute is very desirable for deep drying by the membrane separation. However, the lowest selectivity is still around 6000 and is high enough to meet practical separation application. Stability is critical for practical application of any membranes. FIG. 32 shows variations of the flux and the water content of the permeate with time on stream. The $H_2O$ flux was stable around 4.0 kg/m2/h at separation temperature of 75° C., rapidly increased to 7.5 kg/m2/h upon increase of the temperature to 90° C., and went back to the same flux level after the temperature was cooled down to 75° C. The results show rapid response of the membrane to the change of separation temperature and stability of the membrane structure under these separation conditions. Compared to 90 wt % ethanol in the feed, the ethanol content in the permeate was very low, typically below 0.05 wt %, which corresponds to a $H_2O$/ethanol selectivity factor above 10,000.

TABLE 15

Comparison of $H_2O$-selective zeolite membranes (4A or NaA-type) for ethanol/water separation.

| Support | Water in feed (wt %) | T (K) | Permeate pressure (kPa) | Flux (Kg/m²/h) | Selectivity | Ref. # |
|---|---|---|---|---|---|---|
| metal sheet | 10 | 363 | 0.1-0.2 | 7.5 | >10,000 | n/a |
| metal sheet | 10 | 348 | 0.1-0.2 | 4.0 | >10,000 | n/a |
| alumina tube | 10 | 348 | 0.7 | 5.6 | >5,000 | 69 |
| | 10 | 378 | NA | 4.5 | >10,000 | 10 |
| alumina tube | 10 | 398 | 0.05 | 3.8 | 3,600 | 81 |
| alumina tube | 9.2 | 366 | 0.5 | 2.5 | 130 | 65 |
| | 10 | 348 | NA | 2.2 | >10,000 | 10 |
| | 5 | 348 | NA | 1.1 | >10000 | 10 |
| TiO2 | 10 | 323 | 0.2 | 0.8-1.0 | 8,500 | 13 |
| alumina tube | 10 | 353 | NA | 0.54 | >10000 | 102 |
| alumina tube | 10 | 323 | 0.2 | 0.5 | 16,000 | 70 |
| alumina tube | 5 | 318 | 0.4 | 0.23 | 8,300 | 61 |
| Silica tube | 3 | 333 | NA | 0.37 | 70 | 79 |

Ref. # in Table 5 of S.-L. Wee et al. Separation and Purification Technology 63 (2008) 500-516.

Referring to Table 15, the performance of various water-selective zeolite membranes (4A or NaA-type) in water/ethanol separations are summarized. The first two rows summarize the performance of 4A zeolite membrane layers on porous metal support sheets according to embodiments of the present invention. The performance data on the remaining membrane materials is summarized from that which was reported in Table 5 of S.-L. Wee et al. Separation and Purification Technology 63 (2008) 500-516. For the same-type zeolite material, ethanol/water separation performances of the membrane sheets formed according to embodiments of the present invention are significantly better than that which is reported in the prior art with respect to the combination of required flux and selectivity.

TABLE 16

Comparison of different membranes for ethanol/water separation.

| Membrane | Support | Water in feed (wt %) | T (K) | Permeate pressure (kPa) | Flux (Kg/m²/h) | Selectivity | Ref. # |
|---|---|---|---|---|---|---|---|
| NaA | metal sheet | 10 | 348 | 0.1-0.2 | 4.0 | >10,000 | n/a |
| NaA | metal sheet | 10 | 363 | 0.1-0.2 | 7.5 | >10,000 | n/a |
| Mordenite | alumina tube | 10 | 423 | 0.5 | 0.2 | 139 | a-35 |
| Mordenite | alumina tube | 15 | 363 | 0.2 | 0.1 | 60 | a-68 |
| NaX | | 10 | 348 | NA | 0.9 | 360 | b |
| NaY | | 10 | 348 | NA | 1.6 | 130 | b |
| Silica | alumina disc | 10 | 353 | 0.6-0.8 | 1.0 | 800 | a-8 |

TABLE 16-continued

Comparison of different membranes for ethanol/water separation.

| Membrane | Support | Water in feed (wt %) | T (K) | Permeate pressure (kPa) | Flux (Kg/m$^2$/h) | Selectivity | Ref. # |
|---|---|---|---|---|---|---|---|
| Polymeric/Composites listed below | | | | | | | |
| Silica/Acrylamide | | 10 | 323 | NA | 0.30 | 3200 | b |
| CMC (Na ion) | | 10 | 303 | NA | 0.05 | 2430 | b |
| GFT | | 5 | 353 | NA | 0.01 | 9500 | b |
| PAA/polyion | | 5 | 333 | NA | 1.63 | 3500 | b |
| Chitosan | | 10 | 333 | NA | 0.10 | 6000 | b |
| Polyimide | | 10 | 348 | NA | 0.01 | 850 | b | a. Ref. # in Table 5 of S.-L. Wee et al. Sep. Purif. Technol. 263 (2008) 500-516.
b. Y. Morigami et al. Sep. Purif. Technol. 25 (2001) 251-260.

Similarly, referring to Table 16, the membrane sheets of the present example exhibit better performance than many other membrane materials with respect to the combination of required permeate pressure, flux, and selectivity. The first two rows of Table 16 summarize the performance of 4A zeolite membrane layers on porous metal support sheets according to embodiments of the present example. No other materials exhibit the same level of high performance.

Zeolite membrane growth on the ceramics-modified porous Ni sheet were also tested to demonstrate the limitations of using a ceramic transition layer. A layer of yittia-stabilized zirconia (YSZ) of mean pore sizes about 200 nm could be deposited on the porous Ni sheet at thickness about 5 um by either screen printing or spray technique. A silicalite membrane was grown on the porous zirconia surface by methods of the present invention as described elsewhere herein. However, the resulting membrane film was readily peeled off from the Ni substrate. By contrast, the silicalite membrane directly grown on the bare Ni substrate as described and pictured in FIG. 29 adhered to the substrate very well and could not be peeled off. A complete set of data on the silicalite membrane supported on porous metallic substrate sheet/plate/disk for ethanol/water or hydrocarbon/water separation are scarce in the prior arts. Some complete sets of performance data for the H$_2$O-selective membrane supported on a metallic substrate are provided by Jafar et al. and by Holmes et al. Table 17 compares membrane characteristics and performance data from embodiments of the present invention with those of Jafar and Holmes. The thickness, pore size, porosity, and pore structure of those two porous metallic substrate disks were not disclosed, although they are critical parameters for a zeolite membrane product concept. The permeate pressure during separation tests of those two papers was not disclosed either. With the same type of NaA zeolite material, the membrane prepared according to the present invention shows about one order of magnitude higher water flux than those of Jafar et al., and Holmes et al. The H$_2$O/ethanol selectivity of the present membrane is a few orders of magnitude higher than those numbers reported by Holmes et al. Jafar et al., tested water removal from a water/iso-propanol mixture. Iso-propanol is a larger molecule than ethanol. Fundamentally, H$_2$O/iso-propanol selectivity should be much higher than H$_2$O/ethanol selectivity for the NaA-type zeolite material, because NaA pore size is small enough to exclude iso-propanol from adsorption into its pore. Table 17 shows that the present membrane provides much higher H$_2$O/ethanol selectivity even than H$_2$O/iso-propanol obtained by Jafar et al. The comparison clearly shows critical importance of the features and properties resulting from embodiments of the present invention on membrane performance (flux, selectivity, adhesion) even for a same-type zeolite membrane material. The zeolite membrane performance is much determined by the membrane sheet structure and on preparation methods.

TABLE 17

Comparison of the NaA membrane of this example to the same type of zeolite membrane supported on porous metal disk in prior art.

| Membrane | Support | Water in feed (wt %) | T (K) | Permeate pressure (kPa) | Flux (Kg/m2/h) | H$_2$O Selectivity | Source |
|---|---|---|---|---|---|---|---|
| NaA | Thin porous metal sheet | 10 wt % H$_2$O in ethanol | 348 | 0.1-0.2 | 4.0 | >10,000 | present |
| NaA | same | same | 363 | 0.1-0.2 | 7.5 | >10,000 | present |
| NaA | porous zirconia/Ni/Cr alloy mesh, | 10 wt % H$_2$O in iso- | 333 | NA | 1.3 to 0.7 | 1,800 to 8,000 | Jafar & Budd 1997 |
| KA | Ceramesh sheet (Acumen Ltd) | propanol | | | 0.4 to 1.3 | 400 to 1,500 | Jafar & Budd 1997 |

TABLE 17-continued

Comparison of the NaA membrane of this example to the same type of zeolite membrane supported on porous metal disk in prior art.

| Membrane | Support | Water in feed (wt %) | T (K) | Permeate pressure (kPa) | Flux (Kg/m2/h) | $H_2O$ Selectivity | Source |
|---|---|---|---|---|---|---|---|
| NaA | Stainless steel sinter (Alltech Assoc.) | 10 wt % $H_2O$ in ethanol | 298 | NA | 0.058 | 11.1 | Holmes et al. 2000 |
| | | | 313 | NA | 0.11 | 9.4 | |
| | | | 323 | NA | 0.135 | 9.4 | |
| | | | 333 | NA | 0.205 | 12.3 | |

Jalal J. Jafar, Peter M. Budd "Separation of alcohol/water mixtures by pervaporation through zeolite A membranes" Microporous Materials 12 (1997) 305 311.
S. M. HOLMES, M. SCHMITT, C. MARKERT, R. J. PLAISTED, J. O. FORREST, P. N. SHARRATT, A. A. GARFORTH1, C. S. CUNDY and J. DWYER "ZEOLITE A MEMBRANES FOR USE IN ALCOHOL/WATER SEPARATIONS Part I: Experimental Investigation" Trans IChemE, vol.78, Part A, pp1084-1088, 2000.

Figure 33A:
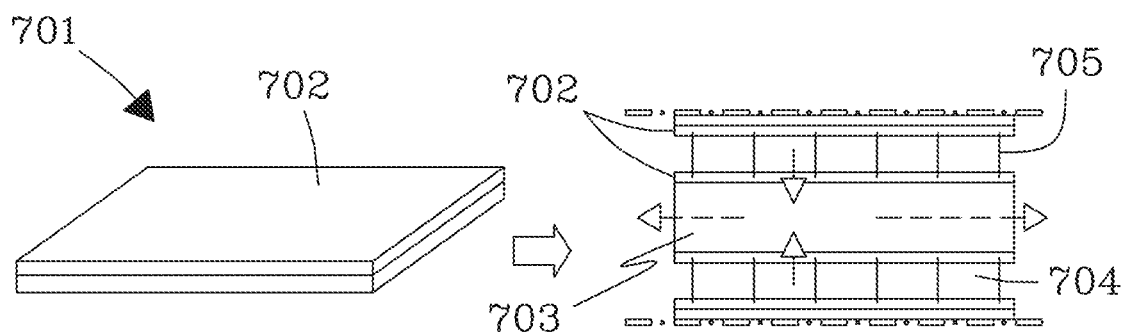
FIGS. 33A and 33B are illustrations depicting an embodiment of a mini-channel membrane module according to the present invention.

According to some embodiments, the individual membrane sheets disclosed in either Exemplary Embodiment 1 or Exemplary Embodiment 2 can be assembled into a mini-channel module. Referring to FIG. 33A, the membrane channels are formed by stacking two membrane sheets 701 front side 702 to front side 702, wherein the zeolite membrane layers are facing each other. Spacers 705 are placed between two membrane sheets to provide mechanical support to the sheet and to also define a membrane channel 704. The spacers in the membrane channel are arranged in a direction perpendicular to those that may be in the permeate flow channel 703. Permeate flow channels are formed by stacking the membrane sheets back side to back side. Preferably, the back sides make bare metal to bare metal contact, however spacers can also be used. The membrane sheets are stacked layer by layer though repeated process steps to obtain the desired number of membrane channel layers. Finally, the whole module is bonded together. Braze or sealer is applied on the two ends of the module to fill up any bypass voids from the membrane to the permeation channel. For industrial production, the whole process can be automated. Sealing glasses (e.g. alumino-barium-silicate based) and metal base brazes (e.g. Ag-based) can be used or modified for preparation of the mini-channel module.

The channel openings are a critical design parameter for the module. Selection of an optimum channel opening is a result of compromise between surface-area packing density, channel flow hydrodynamics, and potential manufacturing cost. The small channel size has a high-surface area packing density and also reduces thickness of filtration boundary layer. However, if the channel size is too small, flow hydrodynamics inside the channel and manufacturing cost become a problem. Mini-channels that have a size greater than about 0.3 mm can typically be formed with low-cost material manufacturing processes while creation of mini-channels smaller than 0.3 mm can be fairly expensive at large scales.

Figure 33B:
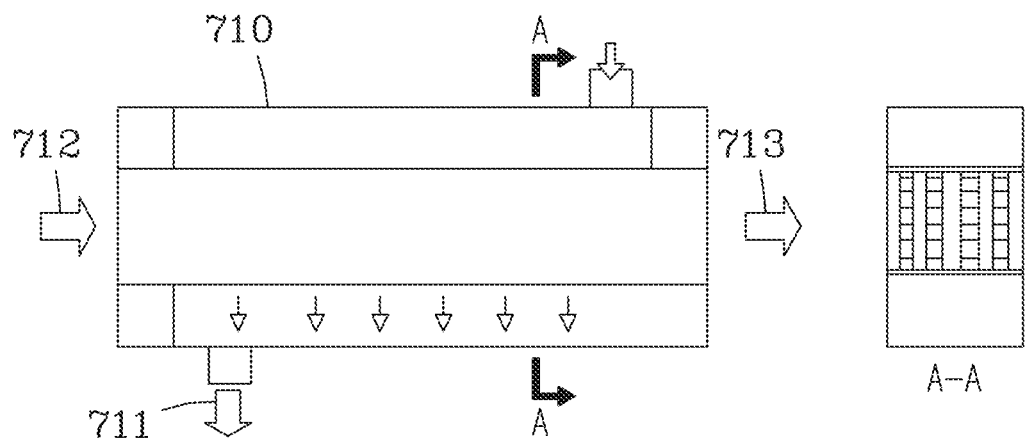

The mini-channel modules are preferably hosted inside a pressure enclosure. FIG. 33B shows a schematic of an exemplary membrane package 710. The feed stream 712 is divided into a water stream 711 and a concentrated stream 713 through the filtration vessel. A positive pressure gradient (1~25 bar) between the feed stream and the permeate stream is exerted during separation tests. A metallic vessel made of the same material as the membrane support is preferred. The membrane package is critical to durability and separation performance, particularly for high-pressure operation. Both flow and stress distribution is affected by the package method. The flow distribution is directly related to effective utilization of all membrane channels. The stress distribution determines mechanical integrity and durability of the testing cell.

Figure 34:
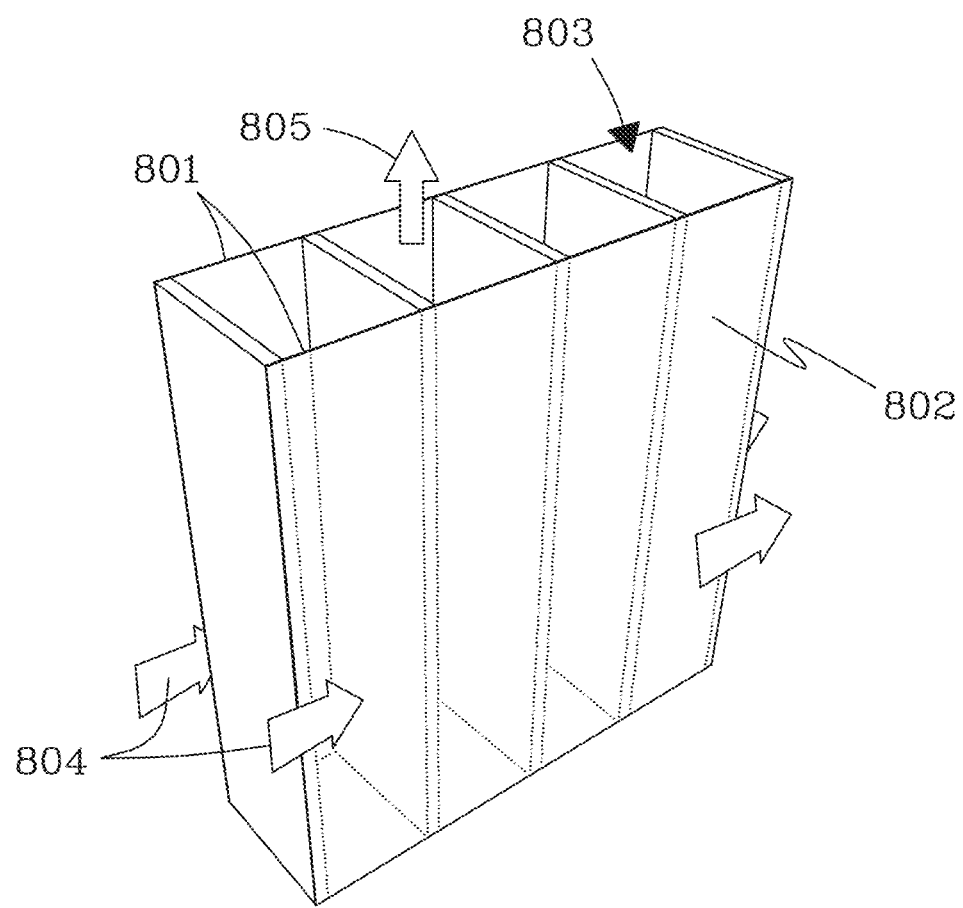
FIG. 34 is an illustration depicting an embodiment of a plate-type membrane module according to the present invention.

The membrane sheets may also be packaged into a simple plate-type membrane module as illustrated in FIG. 34. Two membrane sheets 801 are sealed back side to back side, with or without a spacer, into a plate having an internal opening 803. The zeolite membrane-coated surface 802 is exposed to the feed water/hydrocarbon mixtures 804. The targeted molecule is removed from the mixture as permeate 805 though the membrane into the inner open space of the membrane plate and pulled out of the membrane module by vacuum and/or gas purge. For a given membrane sheet thickness, the width of the internal opening is the major design parameter. To pack more membrane area in unit volume, a thinner plate is preferred. To minimize the flow resistance to withdraw the permeate out of the membrane module, a thicker plate is preferred. Preferably, the width of the internal opening is between 0.3 to 6 mm.

V. Exemplary Embodiment 3—Thin-Sheet Faujasite-Type Zeolite Membranes and Preparation Methods

A. Introduction

Faujasite frameworks containing 12-member rings (each member=one Si or Al atom) are one class of zeolite materials with significant industrial uses. X and Y are two types of the Faujasite zeolite materials commonly used as catalysts and adsorbents. They provide a larger channel opening (0.7-0.8 nm) than the NaA-type zeolite (0.4 nm). Type-X Faujasite has a normal composition of $Na_{86}Al_{86}Si_{106}O_{384}:wH_2O$ (w~260), while type-Y Faujasite has a normal composition of $Na_{56}[Al_{56}Si_{136}O_{384}]:250 H_2O$. $Na^{+1}$ in the Faujasite-zeolite can be exchanged with other metal ions to tailor the channel opening and surface chemistry for specific applications. For example, NaX is a common adsorbent for $CO_2$ and $H_2O$ capture from various process gas streams and LiX is an adsorbent for air separation. The HY zeolite is used as a catalyst for fluid catalytic cracking processes. The faujasite has good thermal and chemical stability. The framework structure is typically intact in presence of various impure gases ($SO_2$, $H_2S$, COS, NO, $H_2O$, $CH_4$, oil, etc.).

Although methods of preparing Faujasite-type zeolite membranes have been previously disclosed, none provide specifications for optimum seeding crystals and seed coating methods for scale-up of membrane preparation processes. The growth temperatures were typically around 90-100° C. and thick porous alumina disks or tubes were often used in the preparation. The seed crystals and seeding methods varied dramatically among different research groups.

B. Description of Present Membrane Structures and Preparation Methods

The Faujasite membrane structure and preparation method are similar to what were described above for Exemplary Embodiment 1. The main differences lie in using of Faujasite-type zeolite as the seeding crystals and Faujasite-type growth solution for secondary growth. As outlined in FIG. 35, a porous, robust flat sheet support such as porous metal sheets of thickness less than 200 µm with suitable surface textures is chosen as a support. The robustness means that the support sheet maintains its mechanical integrity during handling, seed coating, and hydrothermal growth. The suitable surface textures mean that the surface of the support sheet to be deposited with the zeolite membrane is free of any major defects, such as holes and cracks above 5 µm, with surface porosity from 50 to 15%, preferably 45 to 20%.

A seed coating solution is prepared by suspending the parent Faujasite zeolite crystals in a water-based solution in such a way that the suspension is homogenous and would not result in sedimentation or segregation during the seed coating process. Thus, average particle sizes of the seeding crystals are preferred from 0.5 to 2.0 µm and solid loading in the suspension is preferred to be 0.5 to 5.0 wt %. The seed coating solution can be prepared by ball-milling or attrition milling of parent Faujasite powder in the water-based solution. Organic solvents such as alcohols and dispersion agents such as PEG and PVP may be added into the solution to stabilize the suspension and/or modify the liquid/support contact angle. Pure water or liquid containing >50 wt. % water is preferred as the carrier or dispersing fluid for preparation of the seed coating solution.

The support is coated with the seed solution by use of some simple, scalable methods, such as spray coating and dip coating. The coating conditions can be controlled in such a way that the seed crystals are uniformly dispersed on the support at a loading from 0.1 to 0.5 mg per $cm^2$ of the support surface and some seeding crystals are allowed to penetrate into the support pore. The support surface is exposed to the coating solution for a certain time in a range of 0.1 second to 1 minute. Full coverage of the support surface by the seed solution is preferred. However, presence of excessive solution on the support surface should be avoided. The coating may be performed several times with intermittent drying to obtain uniform coverage of the support.

The seeded support sheet is loaded in a growth reactor after drying and immersed in the suitable growth solution to grow a continuous, dense layer of the zeolite membrane out of the seeded support. A number of the seeded sheets can be loaded in one growth reactor. The growth reactor is designed and built in such a way that uniform temperature profiles over all the membrane sheets are maintained during the growth process. The growth solution is water-based with compositions tailored for growth of the Faujasite-type zeolite crystals. The growth solution preparation is described as follows. An Al sol is prepared from Al precursors such as $Al(OH)_3$ with suitable Al and Na content. A Si sol is prepared from the Si precursor such as sodium silicate with suitable Si and Na content. Then, the Al sol is mixed with the Si sol, preferably at room temperature to obtain a homogeneous solution without significant segregation or precipitation within time period of growth, typically 1 to 4 hours.

The hydrothermal growth is conducted under suitable conditions so that all the inter-particle (or crystals) voids are closed by secondary growth of the seeding crystals without excessive deposit of the zeolite powder or crystals on the surface. The membrane growth weight gain is preferred to be 0.5 to 3 $mg/cm^2$ of support area. The preferred membrane growth conditions are 90 to 110° C. for 1 to 7 hours. If the growth temperature is too high and/or growth time is too long, excessive amounts of zeolite may deposit on the support surface, which can cause cracks and/or reduce the membrane permeance. If the growth temperature is too low and/or the growth time is short, inter-crystal voids or spaces would not be closed that the membrane would not have high selectivity. After growth, the membrane sheet is rinsed with water to remove any growth solution and solid deposit on the surface, and the rinsed membrane is left to dry prior to usage.

C. Examples i. Faujasite Membrane Preparation by Use of Commercial Seeding Crystals and Growth Solutions Previously Known This group of studies was conducted using NaX and NaY powder acquired from commercial sources as the seeding crystal, and with membrane growth solutions being prepared by mimicking the procedures reported in the literature. FIGS. 36A and 36B show that the as-received powder comprises large agglomerates of the crystals. As-received NaY powder (HS-320, Wako) was milled to average particle size of 3.85 µm. To avoid degradation of the parent zeolite crystals due to excessive milling, moderate ball-milling was conducted using a slow rolling speed. 6.0 g of the NaY powder was mixed with 150 g of deionized water and added with 50 milling beads. The mixture was milled overnight at 30% set point of the ball-milling speed scale. Then, additional water was added to obtain 200 cc of a seed coating solution with 3 wt % solid loading. The as-received NaX (Wako, F-9) was milled in the same way to average particle size of 2.5 µm. The atomic compositions of the as-received zeolite powder are compared to the milled one in Table 18. As-received NaY has a higher Si/Al ratio than as-received NaX. Si/Al ratio of the milled NaY particles sampled from the seeding solution was approximately same as that of the as-received one. However, the milled NaY had a lower Al/Na ratio than the as-received one, indicating possible Na loss from the framework.

The 13 cm×13 cm porous Ni support sheets of about 40% porosity were coated with four different seed coating solutions to assess impacts of the seeding crystals on the membrane growth. The results are summarized in Table 19. Two seeding solutions were prepared from each parent zeolite powder through ball-milling and attrition-million, respectively. The seed coating was conducted by following the spray coating procedure used previously for NaA membrane preparation. The support sheet was coated two times with each seeding solution with intermittent drying to obtain the seed loading at about 0.2 $mg/cm^2$. All the seeded sheets looked fairly uniform.

TABLE 18

SEM/EDS elemental analysis of as-received and milled zeolite crystals as seeds

| Element atomic % | NaX (F-9) As received | NaY As-received | NaY seed solution prepared by ball-milling Stable suspension | |
|---|---|---|---|---|
| | | | Spot 1 | Spot 2 |
| O | 66.16 | 65.07 | 63.79 | 63.3 |
| Na | 7.59 | 9.81 | 5.87 | 8.02 |
| Al | 12.46 | 8.07 | 9.24 | 8.87 |
| Si | 13.79 | 17.05 | 21.09 | 19.81 |
| Si/Al ratio | 1.11 | 2.11 | 2.28 | 2.23 |
| Na/Al ratio | 0.61 | 1.22 | 0.64 | 0.90 |

TABLE 19

Seed coating with milled commercial NaA and NaY powder

| Support ID | Porosity % | Seeding solution | Spray coating time (s) 1st, 2nd | 1st seeding, mg/cm² | total seeding, mg/cm² |
|---|---|---|---|---|---|
| 61443-60-13 | 42.9 | ball-milled | 175, 165 | 0.11 | 0.21 |
| 61443-69-14 | 39.3 | NaX | | 0.11 | 0.21 |
| 61443-70-7 | 39.3 | ball-milled | 175, 190 | 0.08 | 0.17 |
| 61443-71-7 | 41.4 | NaY | | 0.08 | 0.16 |
| 61443-71-14 | 41.9 | attrition-milled NaX | 175, 140 | 0.12 | 0.23 |
| 61443-71-16 | 40.8 | | | 0.12 | 0.22 |
| 61443-71-10 | 44.4 | attrition-milled NaY | 175, 130 | 0.13 | 0.21 |
| 61443-71-12 | 42.7 | | | 0.11 | 0.19 |

Several growth solutions were prepared to assess impact of the growth solution composition and preparation on membrane growth. Table 20 lists the solution number and corresponding molar composition. Raw materials used for the solution preparation are NaOH, de-ionized water, sodium aluminate (anhydrous, Sigma), silica sol (Ludox LS colloidal silica, 30 wt %, Sigma-Aldrich), aluminum sulfate hydrate ($Al_2(SO_4)_3 \cdot xH_2O$, 98%, Sigma-Aldrich), sodium metasilicate nona-hydrate ($Na_2SiO_3 \cdot 9H_2O$, 98%, Sigma-Aldrich), sodium silicate solution (~10.6% $Na_2O$, ~26.5% $SiO_2$, 1.39 g/cc, reagent grade, Sigma-Aldrich). 4.7 wt % $Al(OH)_3$ solution was pre-made according to the recipe previously used for preparation of NaA membrane. 34.09 g of $Al(OH)_3$, 61.488 g of NaOH, and 630 g of H2O were mixed at 95° C. for 2 hours to obtain a clear, homogeneous solution. Then, the solution was cooled to room temperature for growth solution preparation.

TABLE 20

Molar ratios of the growth solutions prepared in this example

| Solution # | $SiO_2$ | $Al_2O_3$ | $Na_2O$ | $H_2O$ | Note |
|---|---|---|---|---|---|
| 2.1 | 1.0 | 0.11 | 9 | 555 | JMS 354 (2010) 171-177 |
| 2.2 | 1.0 | 0.10 | 1.4 | 84 | Microporous and Mesoporous Materials 130 (2010) 38-48 |
| 2.3 | 1.0 | 0.10 | 1.4 | 84 | Same composition and Si sol as solution 2.2. A different Al sol used |
| 2.4 | 1.0 | 0.11 | 9 | 555 | Same composition as solution 2.1. Different Al and Al sols used |
| 2 | 1.0 | 0.20 | 2.8 | 140 | Same Al and Si precursors |
| 4 | 1.0 | 0.075 | 3.73 | 202 | used as solution 2.4 but |
| 5 | 1.0 | 0.10 | 1.4 | 70 | with different concentrations |

Growth solution 2.1 with molar ratio of Si:Al:Na:$H_2O$=1:0.22:18:555 was prepared by following the procedure reported in (JMS 354 (2010) 171-177). 13 g of NaOH was dissolved in 110 g of de-ionized water, to which 0.50 g of sodium aluminate was added and mixed to obtain a clear Al sol at room temperature. To prepare the Si sol, 5 g of NaOH was dissolved in 130 g of water, to which 5.0 of the Ludox LS silica sol (30 wt. %, Bayer AG) was added. The mixture in a glass beaker was heated to 40° C. for 30 min and then to 80° C. for about 10 min under stirring. The beaker was removed from the heater after a clear solution was formed. After the Si sol was cooled to room temperature, the Al sol was added drop-wise to the Si sol under stirring.

Growth solution 2.2 with molar ratio of Si:Al:Na:$H_2O$=1:0.20:2.8:84 was prepared by following the procedure disclosed in Microporous and Mesoporous Materials 130 (2010) 38-48 by Mosca et al. This is a much higher concentrated solution, compared to solution 2.1. Six grams of aluminum sulphate was dissolved into 100 g of water and mixed to obtain a clear solution, to which 5.5 g of NaOH was added to obtain the Al sol. Five grams of NaOH was dissolved in 130 g of deionized water, and added with 48.0 g of sodium metasilicate hydrate to make the Si solution. The resulting mixture was cloudy and was heated to 80° C. to get a clear solution. After the Si solution was cooled down to room temperature, 74.11 grams out of 110.46 grams of the Al solution was added drop-wise to obtain a homogeneous growth solution.

Growth solution 2.3 with the same molar ratio as solution 2.2 (Si:Al:Na:$H_2O$=1:0.20:2.8:84) was prepared with the same Si solution as used in solution 2.2, but different Al solution. The Al solution preparation procedure was as follows: 10.0 g of NaOH was dissolved 50 g of water, to which a 70 g of the 4.7 wt % clear $Al(OH)_3$ solution was added and mixed to obtain a uniform clear solution. The Al solution was added into the Si sol drop-wise during stirring.

Growth solution 2.4 with the same molar ratio as solution 2.1 was prepared with different Si and Al solutions from what were used for solution 2.1. One hundred and seventy grams of NaOH was dissolved into 110.0 grams of water, added with 13.0 g of the 4.7 wt % clear $Al(OH)_3$ solution, and mixed to obtain a clear Al solution. Eight grams of NaOH was dissolved 12.0 grams of water, added with 8.5 grams of the 26.4 wt % sodium silicate solution, and mixed to obtain a clear Si solution. The Al solution was added into the Si solution drop-wise during stirring at room temperature.

Growth solutions 2, 4, and 5 were prepared by using pre-made 4.7 wt % $Al(OH)_3$ solution and 26.4 wt % sodium silicate solution as respective Al and Si precursor. For each growth solution preparation, the pre-made $Al(OH)_3$ solution and sodium silicate solution were added with designed amounts of NaOH and/or de-ionized water to obtain the Al and Si solution, respectively. The $H_2O$/Na ratios in the Al and Si solutions were maintained approximately same. In a standard mixing procedure, the Al solution was added into the Si solution drop-by-drop under stirring at room temperature.

The membrane growth was conducted with the above seeded sheets and above-prepared growth solutions under different conditions. The results are summarized in Table 21. The growth was conducted in the planar reactor in the same way as used for the NaA membrane growth of present disclosure. In the planar reactor, the reactor wall was directly heated by electrical heaters and a uniform temperature profile can be obtained. To simulate the Faujasite membrane growth used in the literature, membrane growth was also conducted in a glass autoclave reactor that was hosted inside an oven. For the planar reactor growth, the growth temperature was ramped from room temperature to a designated temperature at 1° C./min. For the oven growth, the reactor was heated by the oven through radiation heat transfer and the ramping temperature rate was not controlled. After growth, the membrane sample unloaded from the reactor was rinsed with tap water first and then with de-ionized water. The spent growth solution was collected and observed for comparison to the fresh one. The dried membrane was checked for leakage by use of Red40 food color. The colored water was dropped on the membrane surface to observe any color penetration on the other side of the membrane sheet. If the membrane has major defects, the color will leak through.

seeded support sheets. With the same growth solution and under the same growth conditions, the attrition-milled NaX seeding crystals tend to yield more growth weight gain than the ball-milled one. Little or no growth was found with most NaY-seeded support sheets as evidenced by the weight gain. Those membrane samples showed rapid leakage of red 40 color molecules. Only the membranes grown on the NaY-seeded support with growth solutions 2 and 4 at 120° C.-oven temperature showed some blockage to color penetration.

A few of membrane samples were selected to identify the crystal phases by XRD analysis. For comparison, the parent seeding crystals, i.e., as-received NaX and NaY powder, were analyzed first. FIGS. 37 and 38 show XRD patterns for NaY and NaX powder, respectively. The dominating crystal phase identified for the NaY powder is $Na_{56}$ $(Al_{56}Si_{136}O_{384})$—NaY crystal phase. Aluminum silicate is another crystal phase possibly existing in this powder. Presence of minor $SiO_2$ crystal phase is found. For NaX powder, $Na_{56}$ $(Al_{56}Si_{136}O_{384})$—NaX crystal phase is identified as the dominating crystal phase and sodium aluminum silicate $(Na_{1.84}Al_2Si_{2.88}O_{9.68})$ is another crystal phase present in this sample.

TABLE 21

Summary of membranes grown on porous Ni sheets seeded with commercial parent zeolite crystals

| Mem ID 61509- | Support ID 61443- | Seeding crystal | Growth solution # | State | Growth conditions | Spent solution state | Growth gain, mg/cm² | Leakage check | Crystal phase |
|---|---|---|---|---|---|---|---|---|---|
| 159-5 | 60-13 | NaX ball milled | 2.4 | Clear | 100° C. 4 h in planar reactor | clear | 1.62 | Leak | |
| 159-7 | 71-14 | NaX attrition milled | 2.4 | Some cloudy | | clear | 1.14 | Leak on top corner | other phases |
| 161-159-3 | 71-14 | NaX attrition milled | 2.1 | clear | | clear | 1.19 | very little leak | |
| 164-159-3 | 71-16 | NaX attrition milled | 2.2 | Some cloudy | | few solids | 3.99 | No leak | |
| 166-159-3 | 71-16 | NaX attrition milled | 2.4 | Some cloudy | 110° C. 4 h in planar reactor | clear | 1.33 | No leak | other phases |
| 167-159-3 | 71-16 | NaX attrition milled | 2.2 | Some cloudy | | few solids | 1.11 | No leak | other phases |
| 166-159-6 | 71-16 | NaX attrition milled | 5 | clear | 140° C. 4 h in oven-hosted reactor | clear | 2.16 | No leak | other phases |
| 159-2-1 | 61443-71-16 | NaX attrition milled | 2 | Clear | 120° C. 4 h in oven-hosted reactor | clear | 0.70 | No leak | other phases |
| 159-2-2 | 71-7 | NaY ball milled | 2 | Clear | | clear | 0.18 | Some leak | |
| 159-2-3 | 71-16 | NaX attrition milled | 4 | Clear | | some precipitate | 1.69 | No leak | Some Faujasite |
| 159-2-4 | 71-7 | NaY ball milled | 4 | Clear | | some precipitate | 1.53 | Leak on some spots | Some Faujasite |

Except for solutions 2.2 and 2.4, all the other fresh growth solutions looked clear. The solutions 2.2 and 2.4 looked mostly clear, but with some cloudy phase. After growth, some spent solutions remained clear, while some spent solutions showed presence of solids and precipitates. Significant growth weight gain was obtained with the NaX- However, no or little amounts of faujasite crystal phases were found present in the resulting membrane samples. Only the last two membrane samples in Table 21 showed presence of some Faujasite crystal phases, while all the other membrane samples measured showed crystal phases other than Faujasite. As a conclusion, Faujasite membranes could not be obtained by use of the commercial parent zeolite powder as the seeding crystals and growth solutions reported in the literature. The Faujasite membrane could not be obtained even by changing the growth conditions and modifying the growth solution preparation.

ii. Preparation of NaX Membranes with In-House Seeding Crystals with Newly Developed Growth Solution A growth solution preparation procedure was developed to prepare the seeding crystals and conduct secondary growth. The raw materials were de-ionized water, sodium hydroxide (99+% NaOH), alumina trihydrate (Merck, 65% $Al_2O_3$), sodium silicate solution (27.35% $SiO_2$, 8.30% $Na_2O$, 1.37 g/mL). The preparation procedure is described as follows. Firstly, 100 grams water plus 100 grams sodium hydroxide was mixed to obtain a clear solution denoted as solution 1. Secondly, solution 1 was added with 97.5 grams of alumina trihydrate powder and stirred at 100° C. until complete dissolution. The solution was cooled down to 25° C. to obtain a clear solution, which is denoted as solution 2. Thirdly, solution 3 was prepared by mixing solution 2 with 202.5 grams water. Fourthly, 100 grams of solution 3 was mixed with 612 grams water and 59.12 grams sodium hydroxide to complete dissolution of the solid. The resulting solution turned to slightly cloudy and is denoted as solution 4. Fifthly, 219.7 grams of sodium silicate solution was mixed with 612 grams water and 59.12 grams sodium hydroxide until total dissolution of the solid. The resulting solution was denoted as solution 5. Finally, solution 4 was poured into solution 5 under rapid stirring (~700 RPM) to obtain a homogenous, milky mixture, which is denoted as solution 6. It had a molar composition of $Si:Al:Na:H_2O=1:0.26:4.36:82$.

Figure 40:
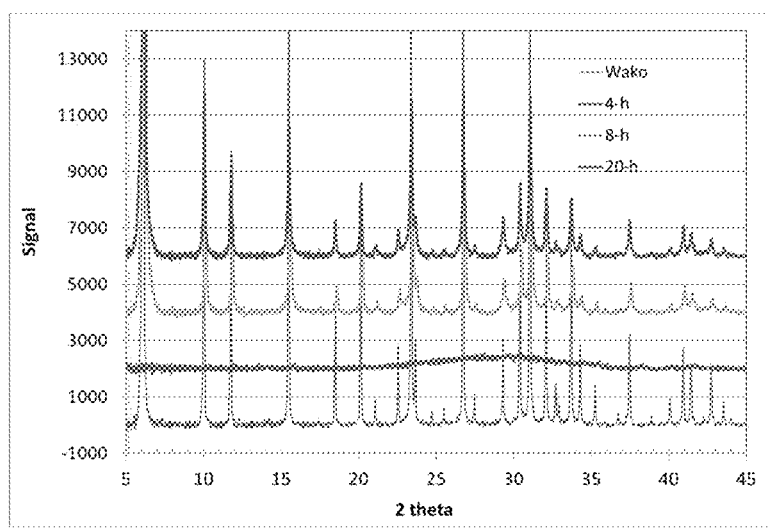
FIG. 40 provides XRD patterns of Faujasite powder grown under conditions disclosed herein compared to commercial NaX.
Figure 41A:
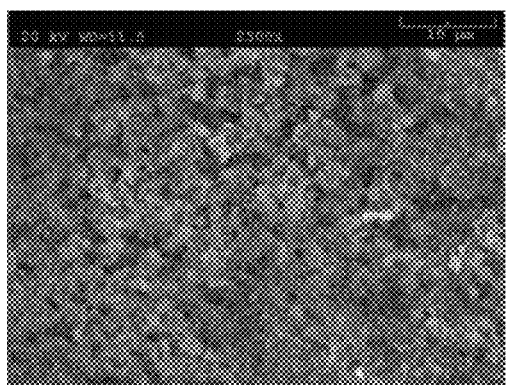
FIGS. 41A-41H are SEM images illustrating textures of four seed-coated surfaces and membranes grown with 3.5-hour hold time.
Figure 41B:
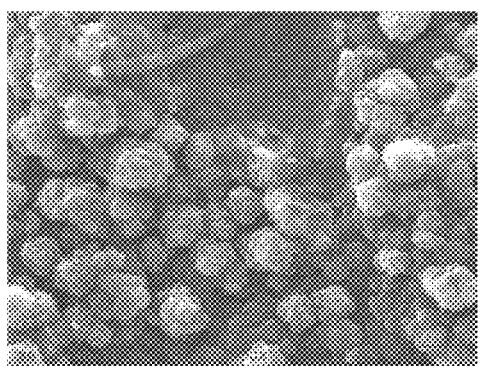
Figure 41C:
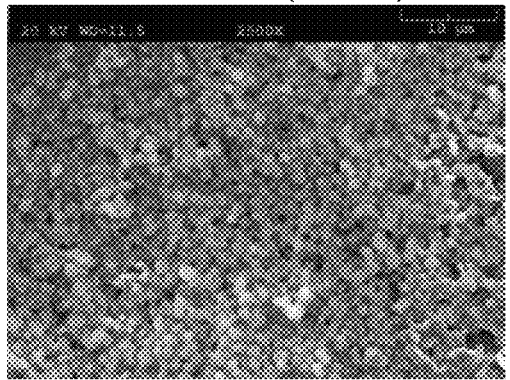
Figure 41D:
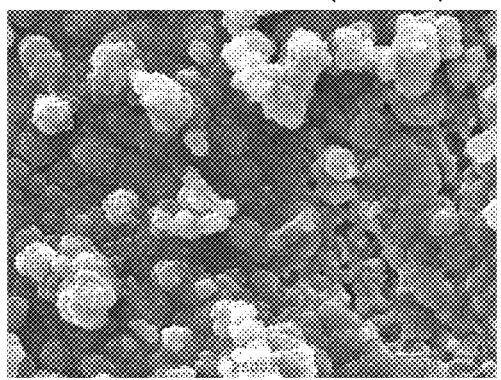
Figure 41E:
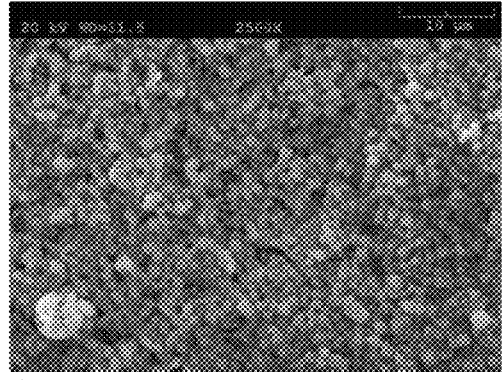
Figure 41F:
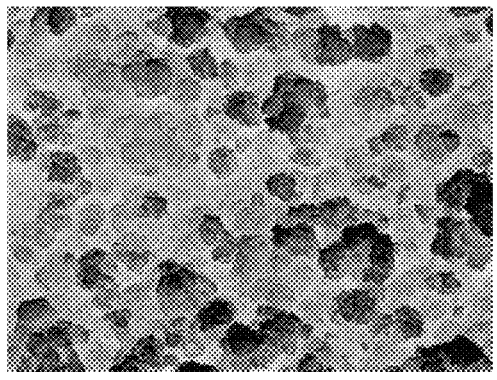
Figure 41G:
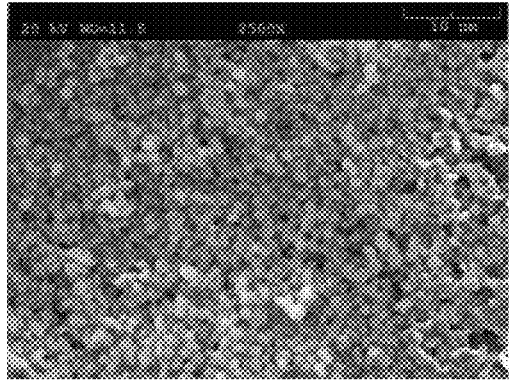
Figure 41H:
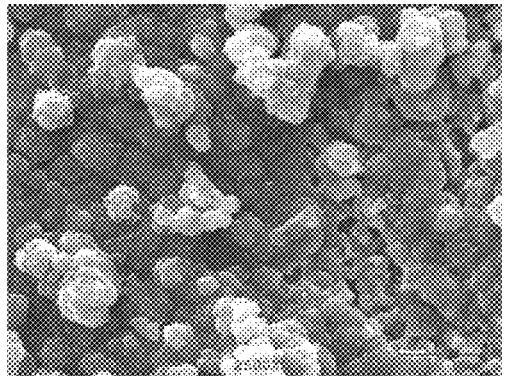
Figure 42A:
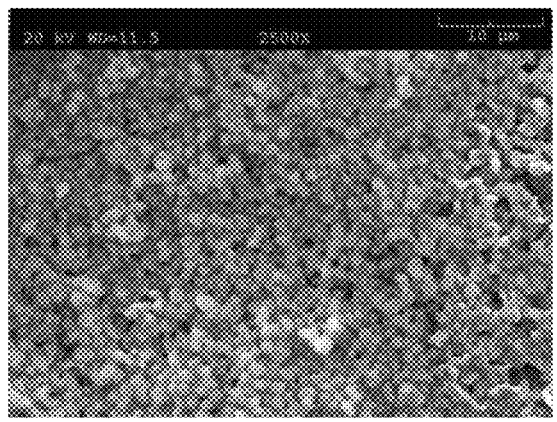
FIGS. 42A-42D are SEM images of membranes grown on 8-hour dry seed-coated surfaces with different holding time.
Figure 42B:
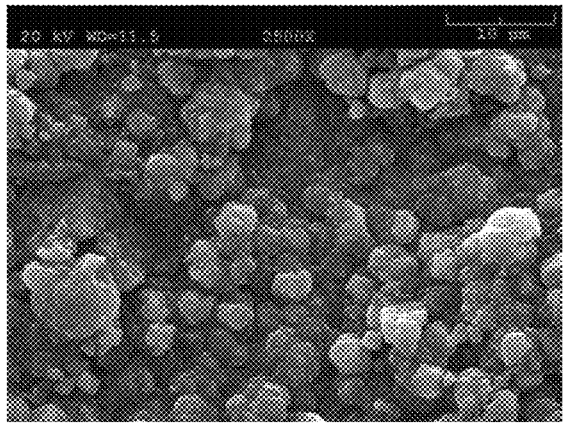
Figure 42C:
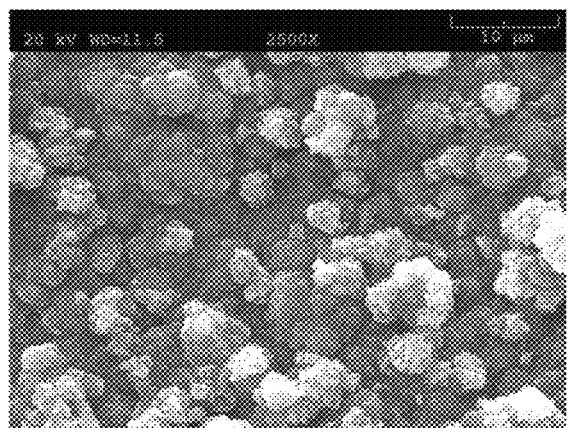
Figure 42D:
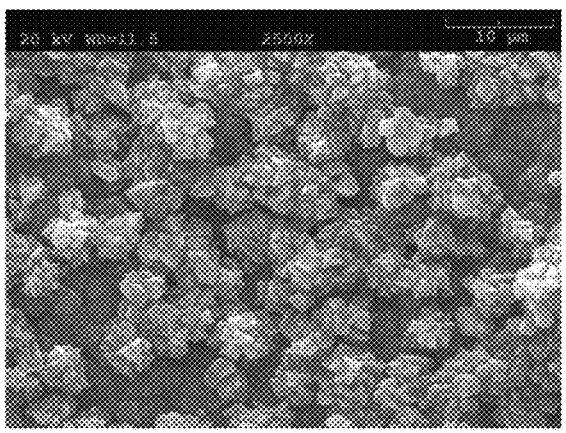

The feasibility to grow Faujasite crystal phases with the solution 6 prepared above was verified by heating the solution in a glass auto-clave reactor inside an oven at 90° C. for different times. After growth, the solid was separated from the spent solution by centrifugation at 3500 rpm. The solid precipitate was rinsed with de-ionized water and dried. The dried samples were analyzed by SEM and XRD. SEM pictures in FIGS. 39A-39C show crystal morphologies of the NaX powder obtained with three different holding times at 90° C. The atomic compositions of the powder samples were assessed by EDS analysis. FIG. 40 shows the XRD patterns of the three samples in comparison to the NaX powder acquired from the commercial source. 4-hold resulted in powder of small, uniform particles but without any XRD peak. Thus, 4-h hold at 90° C. was not in-sufficient to form zeolite crystals. Clear XRD peaks emerged when the holding time was increased to 8 and 20 hours. The XRD patterns for the two samples grown with 8-hours and 20-hours holding times completely matched each other, which indicates the same crystal phase formed at different holding times. Zeolite crystals are clearly seen in the SEM pictures. The zeolite crystals tend to form agglomerates. The agglomerates became larger as the holding time was increased from 8 to 20 hours. The XRD peaks of the NaX powder grown in this example match those of the commercial NaA sample. Compared to FIG. 36B, FIGS. 39B and 39C show that the NaX crystal sizes grown in this example are substantially smaller than the commercial one. Crystal phase analysis shows that $Na_{57.7}Al_{57.7}Si_{134.3}O_{384}$ is the dominating crystal phase identified from the samples grown with 8-h and 20-h holding times. Presence of the other crystal phases was too low to be determined.

Four seed coating solutions were prepared with NaX powder prepared in this example, which are named as 4-h wet, 8-h wet, 20-h wet and 8-h dry. The first three solutions were prepared from the wet solids grown with 4 h, 8 h and 20 h holding times, respectively. The solid cake as separated from the growth solution was mixed with a proper amount of de-ionized water to 3 wt % solid loading on dry basis. The solid loading on dry basis was determined by drying a small portion of the wet cake in a vacuum oven at 100° C. for 24 hrs. The last solution was prepared by ball-milling of the 8-h wet solid dried in the vacuum oven at 100° C. for 24 hours. 5.95 grams of the dried powder was mixed with 80 g of water and 27.1 $cm^3$ zirconia beads in a 125 ml polypropylene bottle and ball-milled at 50% speed of the full scale for 19.5 hours. After milling, 130 g of de-ionized water was added to obtain 3 wt % solid loading.

13 cm×13 cm porous Ni sheets were coated with the above seed coating solutions using the established spray coating procedures. Three times of spray coating were conducted on each support sheet to obtain uniform coverage and targeted seed loading level. The results are summarized in Table 22. Each seeded sheet was cut into four portions for membrane growth with different holding times. The growth solution was prepared using the same procedure as described above for seeding crystal growth. The growth solution has atomic ratio of $Si:Al:Na:H_2O=1:0.26:4.36:82.33$. The four sheets of different seed crystals were loaded in each reactor run. The three growth batches were conducted with holding times at 90° C. of 0, 3.5, and 16 hours, respectively. The temperature ramping rate was at 1° C./min.

All the four sheets showed significant weight gain and presence of a membrane layer even with 0-hour holding at 90° C. It is interesting to note that for the same seeded sheet and with the same growth solution, the growth weight gain tend to decrease with increasing holding time. This can be explained by deposition and/or adsorption of no-crystalline sold on the support sheet at 0-h holding time. Only the membrane grown with 8-hours dry seeding showed no color leakage at the three different holding times, while all the other membranes except for membrane #56-55-4 leaked the color. Membrane #56-55-4 was grown with 0-hours holding over the 4-hours wet seeded support. It's very high grown weight gain can be attributed to deposit of amorphous solid materials rather than to the zeolite membrane growth. For comparison purposes, the NaA-seeded sheet was grown in the 3.5-hours batch together with the Faujasite membrane samples. Resulting NaA membrane showed the color leakage. It indicates the need to use the NaA-type growth solution to obtain a NaA membrane.

TABLE 22

Faujasite membranes grown on porous metal support sheets seeded with seeding crystals prepared in this example

| Mem ID 60037- | Support porosity % | Seeding crystals | Spray coating time (s) | Seed loading from 1st and 2nd coating, mg/cm² | Final seed loading, mg/cm² | Growth time, h | Growth weight gain, mg/cm² change | Leak test | Note of membrane surface |
|---|---|---|---|---|---|---|---|---|---|
| 56-55-1 | 43 | 8-h wet | 100, 100, 90 | 0.16 | 0.22 | 0 | 1.29 | Leaked | dark and uniform |
| 56-55-2 | 44 | 8-h dried | 100, 100, 91 | 0.16 | 0.24 | 0 | 1.43 | No leak | white powder |
| 56-55-3 | 47 | 20-h wet | 100, 100, 75 | 0.16 | 0.22 | 0 | 1.30 | Leaked | some white powder |
| 56-55-4 | 45 | 4-h wet | 100, 100, 100 | 0.13 | 0.21 | 0 | 3.32 | No leak | lots of white powder |
| 57-55-1 | 43 | 8-h wet | 100, 100, 90 | 0.16 | 0.22 | 3.5 | 1.29 | Leaked | dark and uniform |
| 57-55-2 | 44 | 8-h dry | 100, 100, 91 | 0.16 | 0.24 | 3.5 | 1.23 | No leak | some white powder |
| 57-55-3 | 47 | 20-h wet | 100, 100, 75 | 0.16 | 0.22 | 3.5 | 1.07 | Leaked | dark, little white |
| 57-55-4 | 45 | 4-h wet | 100, 100, 100 | 0.13 | 0.21 | 3.5 | 1.20 | Leaked | dark, little white |
| 57-55-6 | 43 | NaA | 90, 115 | 0.16 | 0.16 | 3.5 | 1.42 | Leaked | some white powder |
| 56-55-6 | 43 | 8-h wet | 100, 100, 90 | 0.16 | 0.22 | 16 | 0.81 | Leaked | white gray surface |
| 56-55-7 | 44 | 8-h dried | 100, 100, 91 | 0.16 | 0.24 | 16 | 1.80 | No leak | white surface |
| 56-55-8 | 47 | 20 h wet | 100, 100, 75 | 0.16 | 0.22 | 16 | 1.08 | Leaked | lots of white powder |
| 56-55-9 | 45 | 4-h wet | 100, 100, 100 | 0.13 | 0.21 | 16 | 0.88 | Leaked | some white powder |

Surface textures of the seeded sheet before and after growth are compared in FIGS. 41A-41H. The pictures on the left side show the support surfaces seeded with 4-hour wet, 8-wet, 8-hours dry, and 20-hours wet seed coating solutions, while the pictures on the right side are the membrane surface after 3.5-hours holding time. The presence of distinctive seeding crystals is clearly present on the 8-wet, 8-hour dry, and 20-hour wet seed-coated surface. Crystal inter-growth can be seen on all the four membranes after growth. However, only the membrane grown on the 8-hour dry seed-coated surface shows a dense texture. The membranes grown on 8-hour wet and 20-hour seed-coated sheets show presence of some un-covered pores. In the membrane grown on the 4-hour wet seed-coated surface, there are some spots comprising no-crystalline phases.

Impacts on the growth time on membrane formation on the 8-hour dry seed-coated surface are shown in FIGS. 42A-42D. It looks that a dense membrane layer could be formed with 0-hour hold. The membrane grown with 3.5-hours hold has the least amount of deposition of large particles/crystals.

Atomic compositions of the powder materials used to make seed coating solutions, seed-coated sheets, and membranes are measured by EDS and listed in Table 23. The corresponding areas/spots for EDS analysis can be found in FIGS. 41A-41H and 42A-42D. The 8-hour and 20-hour grown powder showed similar compositions, which are very different from the 4-h grown powder. All the four seeded support sheets show significant presence of Ni, which supports that the Ni support sheet was not fully covered. After growth, Ni at % on the membrane-covered area/sport is much less than the corresponding seeded sheets. However, Ni at % level is very high on the spot that is not covered by the membrane coating. The EDS analysis is consistent with the surface textures.

Figure 43:
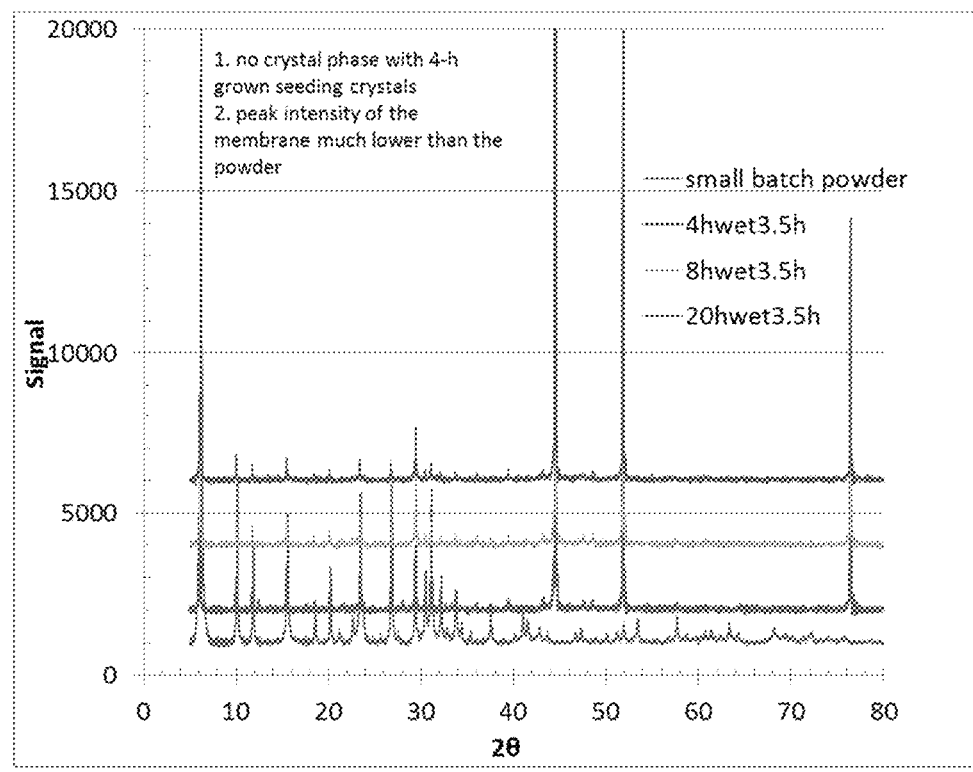
FIG. 43 is an XRD analysis of membranes grown over the support seeded with wet zeolite particles for 3.5 hours.
Figure 44:
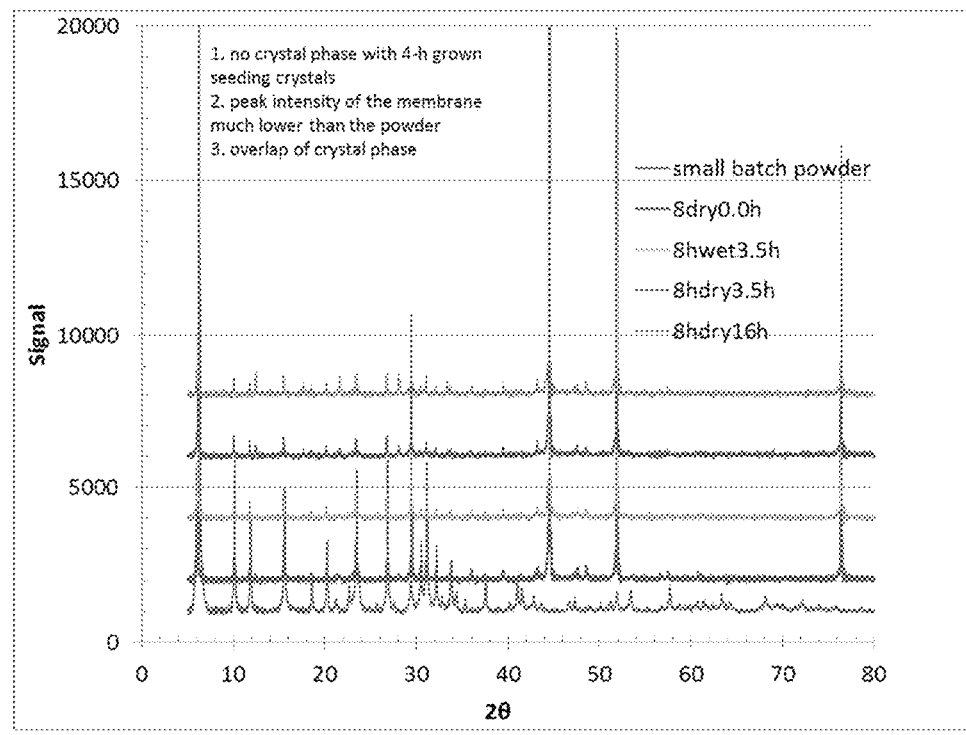
FIG. 44 is an XRD analysis of membranes grown on the support seeded with 8-hour grown zeolite powder for different times.
Figure 45A:
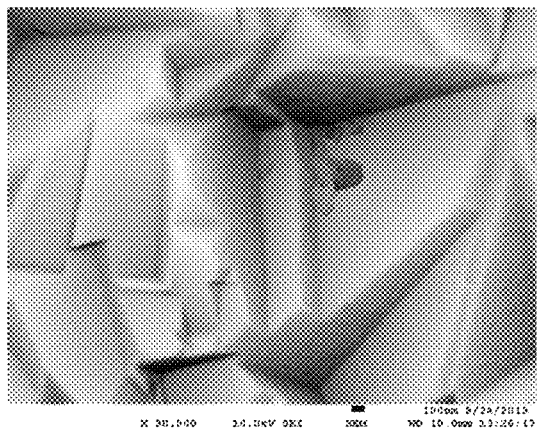
FIGS. 45A-45L are SEM images illustrating surface textures of ion-exchanged NaA/Ni membranes.
Figure 45B:
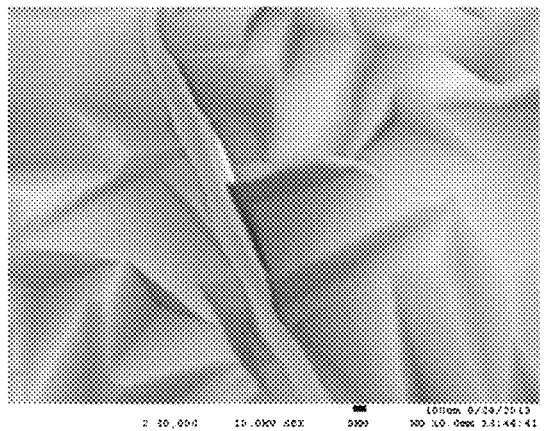
Figure 45C:
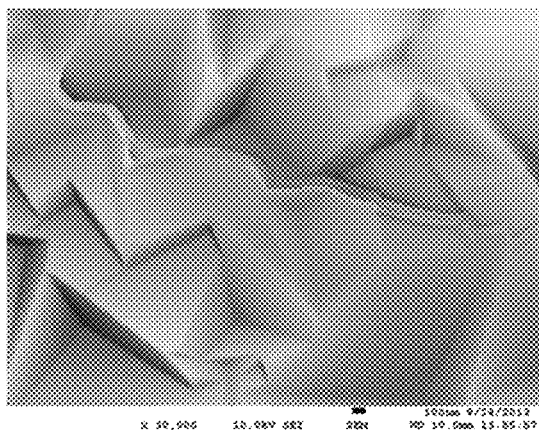
Figure 45D:
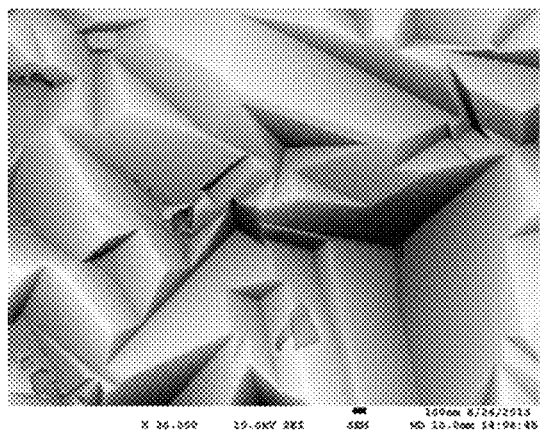
Figure 45E:
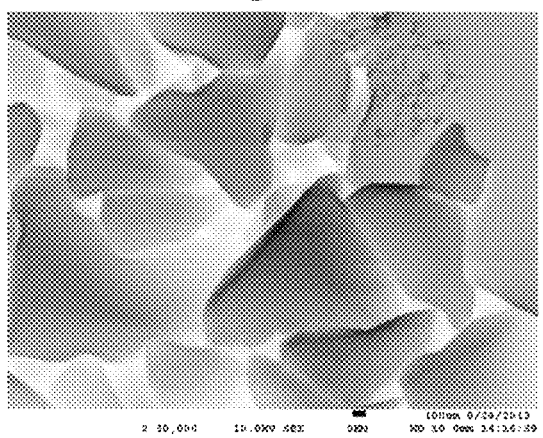
Figure 45F:
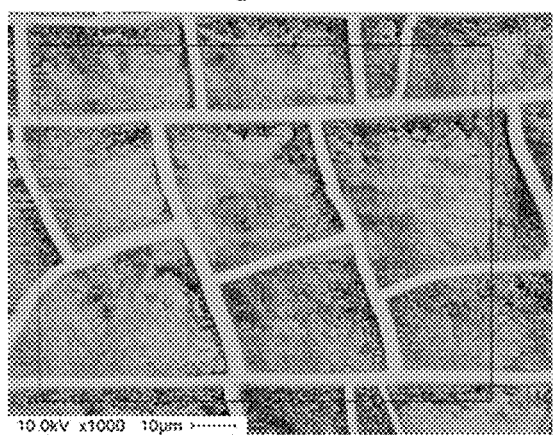
Figure 45G:
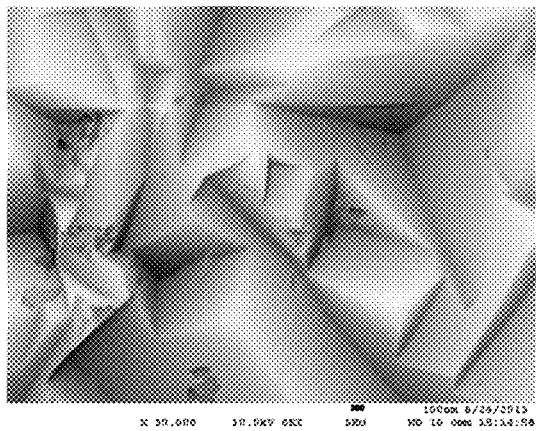
Figure 45H:
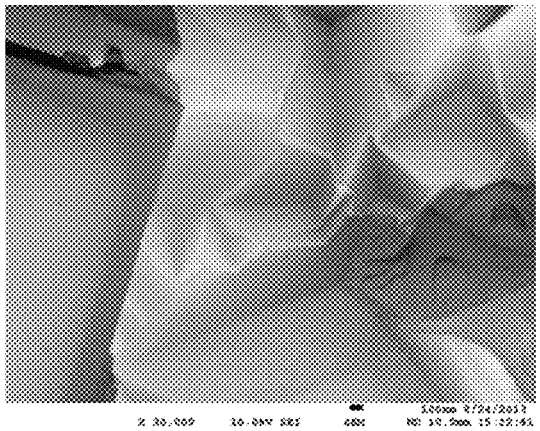
Figure 45I:
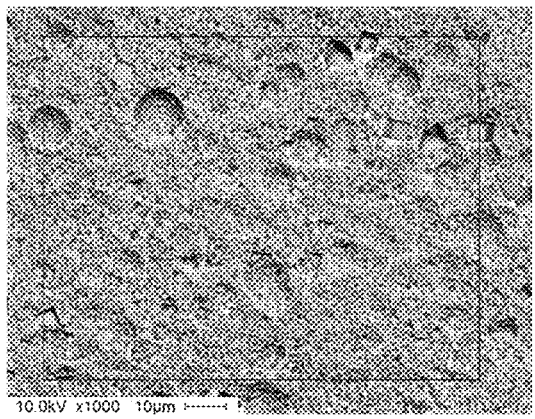
Figure 45J:
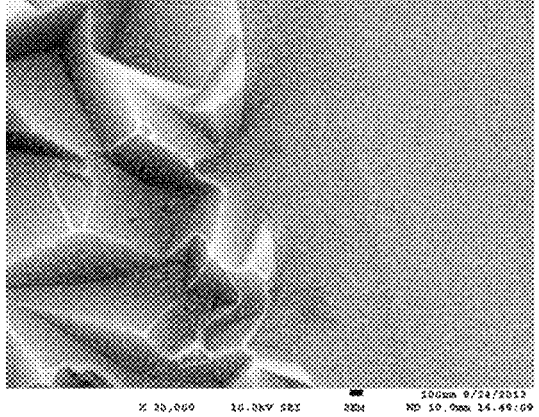
Figure 45K:
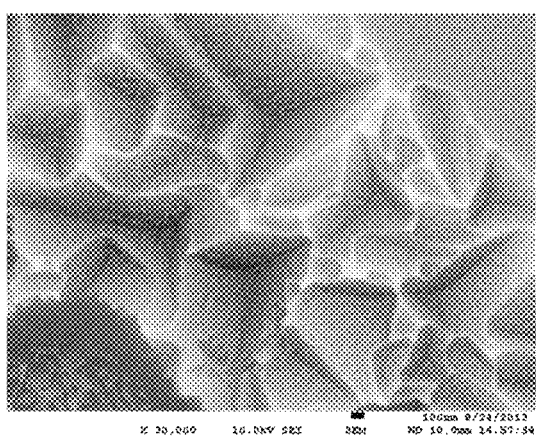
Figure 45L:
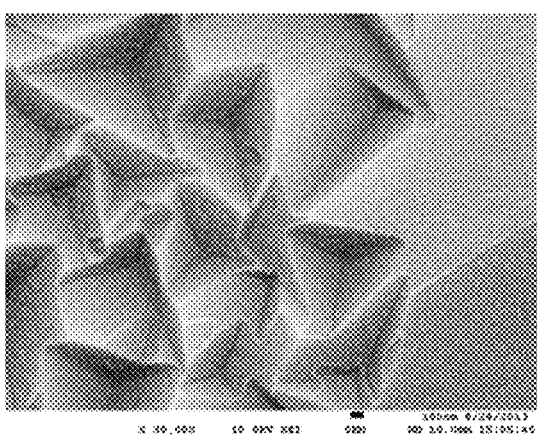

XRD analysis was performed on the selected membrane samples. FIGS. 43 and 44 shows the XRD patterns of the membranes grown on the support seeded with wet zeolite powder. The large peaks at 2θ.43° are the Ni metal phase coming from the support. The membrane peaks well match with these of the powder material—parent seeding crystal. XRD patterns of the membranes grown on the support coated with the 8-h dry seed solution with different times also match the parent seeding powder well. The 8-hour dry seed and 8-hour wet seed do not make any significant difference in the membrane crystal phase. It is worth to note that although the 4-hour wet seed did not have any crystal phase, the membrane has clear crystal phases. The phase identification shows that the dominating crystal phases for all the membrane samples are Y-type $Na_{56}[Al_{56}Si_{136}O_{384}]$ (Si/Al=2.43): $250H_2O$ with lattice parameter 24.75 and X-type $Na_{2.06} Al_2Si_{3.8}O_{11.6}$ (Si/Al=1.9): $8H_2O$ with lattice parameter of 24.77, i.e., Faujasite-type crystal phases. Thus, formation of Faujasite zeolite membranes with the seeding and growth methods taught by the disclosed methods is demonstrated.

It is believed that the membrane textures can be optimized by adjusting the preparation conditions to meet specific application needs.

TABLE 23

SEM/EDS analysis of seeding powder, seeded sheets, and membranes

| Sample | | Atomic % | | | | | Atomic ratio | |
|---|---|---|---|---|---|---|---|---|
| Note | Note | O | Na | Al | Si | Ni | Na/Al | Si/Al |
| Powder material grown with different growth times | | | | | | | | |
| 4-h | powder | 51.4 | 7.8 | 16.6 | 24.2 | | 0.47 | 1.46 |
| 8-h | powder | 62.3 | 13.7 | 11.5 | 12.6 | | 1.19 | 1.10 |
| 20-h | powder | 61.8 | 10.3 | 13 | 14.9 | | 0.79 | 1.15 |
| Seed-coated Ni sheet | | | | | | | | |
| 4-h wet | coating | 34.0 | 14.8 | 6.0 | 7.7 | 37.6 | 2.44 | 1.27 |
| 8-h wet | coating | 31.2 | 12.1 | 10.5 | 11.9 | 34.2 | 1.15 | 1.13 |
| 8-h dried | coating | 36.5 | 12.4 | 10.7 | 11.9 | 28.4 | 1.16 | 1.11 |
| 20-h wet | coating | 28.7 | 11.1 | 8.2 | 8.9 | 43.1 | 1.36 | 1.08 |
| Membrane samples | | | | | | | | |
| 3.5-h hold on 4-h wet seed | Area | 56.8 | 9.8 | 13.2 | 19.2 | 1.0 | 0.75 | 1.46 |
| 3.5-h hold on 8-h wet seed | whole | 50.1 | 11.8 | 12.9 | 17.0 | 8.0 | 0.92 | 1.32 |
| | spot 1 | 54.2 | 9.3 | 13.9 | 20.6 | 1.9 | 0.67 | 1.48 |
| | spot 2 | 8.7 | 2.6 | 1.4 | 1.7 | 85.5 | 1.86 | 1.22 |
| 0-h hold | | 50.8 | 11.1 | 14.0 | 19.5 | 4.7 | 0.79 | 1.39 |
| 3.5-h hold | 8 h dry | 52.5 | 10.9 | 13.2 | 19.1 | 4.2 | 0.83 | 1.44 |
| 16-h hold | seed | 53.5 | 10.1 | 13.4 | 19.2 | 3.8 | 0.75 | 1.44 |
| 3.5-h hold on 20-h wet seed | spot 1 | 49.9 | 9.5 | 14.6 | 19.6 | 6.5 | 0.65 | 1.34 |
| | spot 2 | 6.4 | 1.7 | 1.2 | 1.4 | 89.2 | 1.35 | 1.15 | iii. Molecular Sieving Performances of Faujasite Zeolite Membranes

The molecular separation functions of the Faujasite zeolite membranes prepared in Example ii were characterized with air dehumidification and $CO_2$ gas separation tests. The air dehumidification tests were performed in the same way as used previously for testing of NaA-type membranes. Humid air was introduced in the feed side of a membrane test cell under atmospheric pressure, while the permeate side was pulled vacuum. The testing results are summarized in Table 24. All the membranes showed some selectivity toward $H_2O$ permeation over air, which confirms $H_2O$-philic nature of this-type membrane. The $H_2O$ permeance for a few membrane samples with low $H_2O/N_2$ separation factor was too large to be measured on the present testing system. The two membrane samples, −56-55-2 and −57-55-2, showed excellent $H_2O$/air selectivity (separation factor greater than 200) and very high $H_2O$ permeance (>2.0E-5 mol/m²/s/Pa) with feed air containing 3.33 mol % $H_2O$ (~85% relative humidity). The $H_2O/N_2$ selectivity deceased with decreasing humidity in the air. Thus, the air dehumidification mechanism appears similar to the NaA-type membrane. Selective $H_2O$ adsorption into the zeolite pore blocks permeation of air. These two membranes were grown on the support coated with the 8-hour dry seed with 0.0 and 3.5-hour holding times. The membrane grown on the identical seeded sheet but with 16-hour growth holding time, −56-55-7, gave $H_2O/N_2$ separation factor of only 13, drastically less than the other two membranes. The results indicate that over-grown of the membrane may cause some defects in the membrane. Several membrane samples showed $N_2/O_2$ separation selectivity.

The three membranes grown on the 8-hour dry seeded support were further tested with a $CO_2$ gas mixture. The results are listed in Table 25. All the three membranes showed $CO_2/N_2$ selectivity. The membrane grown with 3.5-hour hold showed higher $CO_2/N_2$ selectivity than the other two membranes, which suggests that separation performances for a specific application can be optimized by adjusting preparation conditions. When 3.33 vol % $H_2O$ was introduced into the $CO_2$ feed gas, $CO_2$, $N_2$, and $O_2$ permeance dramatically decreased as $H_2O$ permeance dominated. The gas-separation test results demonstrate that Faujasite membranes can be used to separate individual molecules or for gas separation.

TABLE 24

Air dehumidification performances of Faujasite zeolite membranes prepared in Example ii.

| Mem# 60037- | $x_{H2O}$ in feed gas | Temp (° C.) | Permeate pressure (mbar) | Permeance, mol/m²/s/Pa | | | Separation factor | |
|---|---|---|---|---|---|---|---|---|
| | | | | $H_2O$ | $O_2$ | $N_2$ | $H_2O/N_2$ | $O_2/N_2$ |
| 56-55-1 | 0.0333 | 32.9 | 36 | Too large | 7.2E−06 | 7.1E−06 | 2.7 | 1.01 |
| -56-55-2 | 0.0333 | 32.3 | 5 | 2.6E−05 | 2.7E−09 | 4.4E−09 | 2361 | 0.63 |
| | 0.0163 | 34.8 | 5 | 1.3E−05 | 1.6E−08 | 2.3E−08 | 299 | 0.69 |
| | 0.0082 | 32.3 | 5 | 1.2E−05 | 9.2E−08 | 1.4E−07 | 44 | 0.68 |
| -57-55-2 | 0.0333 | 29.8 | 5 | 2.3E−05 | 1.4E−08 | 2.8E−08 | 316 | 0.48 |
| -56-55-7 | 0.0333 | 39.2 | 5 | 1.9E−05 | 5.6E−07 | 6.8E−07 | 13.4 | 0.83 |
| -57-55-1 | 0.0333 | 30.9 | 5 | 3.7E−05 | 2.2E−06 | 2.3E−06 | 5 | 0.96 |
| -56-55-6 | 0.0333 | 31.5 | 25 | 3.2E−05 | 2.4E−06 | 2.5E−06 | 4 | 0.95 |
| -56-55-3 | 0.0333 | 30.9 | 46 | Too large | 3.7E−06 | 3.7E−06 | 5 | 1.01 |
| -57-55-3 | 0.0333 | 30.3 | 48 | Too large | 3.8E−06 | 3.7E−06 | 5 | 1.03 |
| -57-55-4 | 0.0333 | 30.4 | 25 | 4.3E−05 | 2.3E−06 | 2.4E−06 | 5 | 0.95 |

TABLE 25

Separation performance of Faujasite-zeolite membranes prepared in example ii for $CO_2$ gas mixture (15% $O_2$, 5% $CO_2$, and 80% $N_2$; 32° C.)

| Mem# 60037- | Feed gas | Permeate pressure (mbar) | Permeance, mol/m²/s/Pa | | | | |
|---|---|---|---|---|---|---|---|
| | | | $H_2O$ | $O_2$ | $N_2$ | $CO_2$ | $CO_2/N_2$ |
| -56-55-2 | $CO_2$ mix | 8 | | 2.6E−07 | 3.1E−07 | 5.0E−07 | 1.62 |
| -57-55-2 | $CO_2$ mix | 9 | | 2.4E−07 | 3.1E−07 | 1.4E−06 | 4.61 |

TABLE 25-continued

Separation performance of Faujasite-zeolite membranes prepared in example ii for $CO_2$ gas mixture (15% $O_2$, 5% $CO_2$, and 80% $N_2$; 32° C.)

| Mem# 60037- | Feed gas | Permeate pressure (mbar) | Permeance, mol/m$^2$/s/Pa | | | | $CO_2/N_2$ |
|---|---|---|---|---|---|---|---|
| | | | $H_2O$ | $O_2$ | $N_2$ | $CO_2$ | |
| -56-55-7 | $CO_2$ mix | 15 | | 5.3E−06 | 4.4E−06 | 7.9E−06 | 1.81 |
| -56-55-2 | wet $CO_2$ mix | 6 | 9.4E−06 | 1.5E−08 | 2.4E−08 | 1.3E−08 | 0.55 |

VI. Exemplary Embodiment 4-Modification of NaA and Faujasite-Type Zeolite Membrane by Ion Exchange and Surface Reaction Disclosed in this embodiment are methods that enhance permeance, selectivity, and/or stability. In one embodiment, a modification method comprises placing certain metal ions into the zeolite membrane framework by ion exchange to tailor the channel opening and chemistry of active sites. This approach utilizes a unique property of zeolite-type materials, ion exchangeability. Different positively-charged ions can be introduced into the framework to balance the negatively charged Al ions in the tetravalent Si and Al—O bonded frameworks. The zeolite membrane as prepared is typically in Na$^{+1}$ form. The Na$^{+1}$ can be replaced by other metal ions, such as, Ag$^+$, Cu$^{2+}$, Al$^{3+}$, H$^+$, Zn$^{2+}$, Sr$^{2+}$, Ca$^{2+}$, K+, NH$^{4+}$, Li$^+$, La$^{+3}$, Ce$^{+3}$, Mg$^{2+}$, Cs$^{+1}$, etc. Ion-exchange has been used to make the zeolite catalyst and adsorbent in powder form. Conducting ion exchange of a zeolite membrane is very different from ion-exchange of the powder or particle material. The zeolite crystal in powder or particle form can be readily stirred in a solution to do ion-exchange in a homogenous mixture, and the stress induced by ion-exchange is often not a problem for particle or powder material. The zeolite membrane has a well-defined structural surface and the stress induced by ion-exchange can cause cracks of the membranes. In addition, the zeolite membrane has a thin-layer of zeolite crystals and the depth of ion-exchange into the membrane layer can be controlled to generate a graded structure. An exemplary ion-exchanging method to modify the thin-sheet zeolite membrane is described as follows:

The zeolite membrane surface is contacted by a water-based solution containing certain metal ions, while the backside of the membrane sheet is protected from exposure to the solution. The concentration of the metal ion in the solution is preferred to be 0.001 to 1.0 M, more preferably, 0.001 to 0.1M. The solution concentration is chosen in such a way that the ion exchange can be readily done without leaving much residual material on the membrane surface after ion exchange. The membrane/solution contact is held above the freezing point and below the boiling point of the solution, preferably 10 to 60° C. The contacting time is from 1 min to 1 day. The suitable contacting temperature and time are chosen to avoid formation of cracks in the membrane due to the stresses generated during ion-exchange. After the exchange, the excessive solution is drained from the membrane surface and the membrane surface is rinsed with de-ionized water. Then, the membrane is activated by drying and/or heating at elevated temperatures.

The second modification method is about modification of exterior surface of the zeolite membrane by reacting surface hydroxyl groups with some other molecules containing silane and/or amine-functional groups. The surface modification changes chemistry of the exterior membrane surface and may not affect the zeolite channel opening. The surface modification can be conducted by either vapor-phase or liquid-phase deposition. The membrane surface is exposed to the precursor molecules under suitable conditions such that the selective surface reaction occurs without blocking the zeolite pores. The liquid-phase modification is conducted at temperatures from 20 to 100° C. within 1 minute to a day. The vapor-modification is conducted at 40 to 200° C. for 1 minute to 1 day under atmospheric pressures or vacuum.

EXAMPLES i. Modification of NaA Membrane by Ion Exchange

A portion of 3.5 cm×3.5 cm uniform area was cut from the 13 cm×13 cm parent NaA membrane sheet prepared as previously-described. The membrane coupon was mounted on a magnetic tape to prevent the backside of the membrane sheet from contacting with the solution. The membrane coupon was placed inside a glass jar with the surface being faced up. 30 cc of the solution was poured into the jar to get the membrane surface fully covered. The jar was covered and kept at the designated temperature. After a certain time, the membrane coupon was taken out and rinsed with tap water and de-ionized water. The membrane was left for drying inside the fume hood and weight changes were measured. Table 26 lists the weight changes of the membrane coupons after different ion-exchange conditions.

It is noted that the 0.1M Ag nitrate solution was covered with Al foil during ion exchange to prevent its exposure to light. The membranes after the ion exchange in the AgNO$_3$ solution (−81-3 and −81-8) were in poor conditions. The supports were week and cracked in multiple areas when they were pulled off the magnetic tape. Further experimentation with the Ag nitrate solution indicated that Ag ion was readily reduced by Ni into metallic Ag that was visible as white dots. Such a reduction reaction induced significant stresses in the Ni support structure, which resulted in cracks. It was found that the membrane sheet maintained its mechanical integrity when the Ag ion-exchanging time was shortened and the membrane surface was thoroughly rinsed prior to the ion exchange.

Molecular separation functions of the ion-exchanged NaA membrane were characterized by air dehumidification tests. An air stream containing 3.3 mol % $H_2O$ was fed into the feed side of a membrane test cell, while the permeate side was pulled to vacuum at pressures in a range of 5 to 35 mbar. The membrane having low $H_2O/N_2$ selectivity typically resulted in a high permeate side pressure. The membrane test cell temperature was maintained at 31-32° C. $H_2O$ permeance and $H_2O/N_2$ separation factor calculated from the measurement are listed in Table 26. It can be seen that membrane performances are dramatically affected by ion exchanging conditions. The $Cs^{+1}$ ion-exchange substantially lowered $H_2O$ permeance of the membrane without obtaining high $H_2O/N_2$ selectivity. The $H^{+1}$ ion-exchange reduced the $H_2O/N_2$ selectivity. The $NH_4^{+1}$ ion-exchange under the present conditions caused significant membrane cracks. The membrane ion exchanged with 0.1 M $K^{+1}+Na^{+1}$ solution at 22° C. maintained good permeance and selectivity. However, both permeance and selectivity decreased when the ion exchange was conducted at 60° C. with the same solution and exchanging time. The $Ag^{+1}$ ion-exchanged membrane showed consistently high $H_2O$ permeance and $H_2O/N_2$ selectivity. Ice bath was used to collect the permeated water vapor.

after Ag ion exchange in only 2 hours. Further increasing exchange time did not make any difference to the texture and surface composition. Most Na was removed after the membrane soaked in the HCl solution, and the zeolite framework was destructed. Only fraction of K was exchanged into the zeolite. Increasing temperature did not enhance further exchange but caused loss of Na and degradation of zeolite crystal structures. The similar impact of temperature was observed for the Cs ion exchange. Some small cracks occurred with the Ca ion exchange. Membranes of low $H_2O/N_2$ selectivity are typically associated with some cracks

TABLE 26

Ion exchange of thin-sheet NaA membrane with different metal ion solutions

| Mem ID 61509- | Ion exchange conditions | | | | Membrane performances | |
|---|---|---|---|---|---|---|
| | Solution | Temp, ° C. | Exchange time, h | Weight change wt. % | $H_2O$ permeance mol/m²/s/Pa | $H_2O/N_2$ separation factor |
| 81-1 | 0.1M $CaCl_2$ + NaCl (Ca:Na = 0.8:0.4) | 22 | 18 | 0.06% | 5.40E−06 | 50 |
| 81-2 | 0.1M KCl + NaCl (K:Na = 0.6:0.4) | 22 | | 0.03% | 7.10E−06 | 518 |
| 81-3 | 0.1M Ag nitrate | 22 | | 3.49% | Membrane was too weak to be tested | |
| 81-4 | 0.01M HCl | 22 | | −0.94% | 4.60E−06 | 3.2 |
| 81-5 | 0.1M Cs nitrate | 22 | 20 | 1.36% | 7.00E−07 | 86 |
| 81-11 | 0.1M $(NH_4)_2CO_3$ | 22 | | −4.15% | Membrane cracked | |
| 81-6 | 0.1M $CaCl_2$ + NaCl (Ca:Na = 0.8:0.4) | 60 | 18 | 0.20% | 5.80E−07 | 0.6ᵃ |
| 81-7 | 0.1M KCl + NaCl (K:Na = 0.6:0.4) | 60 | | 0.11% | 2.00E−06 | 44.6ᵃ |
| 81-8 | 0.1M Ag nitrate | 60 | | 6.68% | Membrane was too weak to be tested | |
| 81-9 | 0.01M HCl | 60 | | −1.38% | 2.20E−05 | 3.5 |
| 81-10 | 0.1M Cs nitrate | 60 | 20 | 1.25% | 2.70E−07 | 35 |
| 81-12 | 0.1M $(NH_4)_2CO_3$ | 40 | | −2.23% | Membrane cracked | |
| 95-1 | 0.1M Ag nitrate | 22 | 2 | | 1.20E−05 | 831 |
| 95-2 | 0.1M Ag nitrate | 22 | 4 | | 1.10E−05 | 624 |
| 95-3 | 0.1M Ag nitrate | 22 | 6 | | 1.20E−05 | 850 |
| 95-4 | 0.1M Ag nitrate | 22 | 16 | | 8.80E−06 | 628 |
| 85-5 | 0.1M Ag nitrate | 60 | 16 | | 9.20E−06 | 368 |

Surface textures and compositions of the ion-exchanged membranes were analyzed by SEM/EDS. Representative SEM pictures of different membranes are compared in FIGS. 45A-45L and the associated surface compositions are listed in Table 27. The parent NaA/Ni membrane is included as a comparative basis. The Na ion in the membrane was gone on the membrane. The Cs ion-exchanged zeolite at room temperature did not show any crack. Its low H2O permeance can be attributed to low $H_2O$ transport rate in the Cs ion-exchanged zeolite channel, which can be explained by reduced $H_2O$ adsorption and channel opening due to hydrophobicity and large size of $Cs^{+1}$ ion compared to $Na^{+1}$ ion.

TABLE 27

Surface compositions of ion-exchanged NaA/Ni membranes

| Sample | | | Atomic % | | | | | | |
|---|---|---|---|---|---|---|---|---|---|
| ID 61509- | Name | Note | C | O | Na | Al | Si | M | Ni |
| 76-71-2 | NaA/Ni | Parent membrane | | 58.36 | 16.78 | 13.08 | 11.78 | | |
| 81-1 | Ca&Na @RT | Some selectivity | | 62.07 | 10.29 | 13.82 | 12.71 | 1.11(Ca) | |
| 81-6 | Ca&Na @60° C. | No selectivity | | 68.72 | 3.24 | 13.31 | 12.47 | 2.27(Ca) | |
| 81-2 | K&Na @RT | excellent selectivity | 7.25 | 58.17 | 7.81 | 12.63 | 11.41 | 2.73(K) | |
| 81-7 | K&Na @60° C. | some selectivity | 4.72 | 57.84 | 9.33 | 13.27 | 12.4 | 2.44(K) | |
| 81-4 | $NH_4^{+1}$ @RT | No selectivity | 6.13 | 66.03 | 2.54 | 13.17 | 10.81 | | 1.32 |
| 95-1 | Ag at 2 h | Excellent selectivity | | 63.86 | | 14.23 | 12.73 | 9.18 (Ag) | |
| 95-2 | Ag at 4 h | | | 64.14 | | 14.18 | 12.87 | 8.82 (Ag) | |

TABLE 27-continued

Surface compositions of ion-exchanged NaA/Ni membranes

| Sample ID 61509- | Name | Note | Atomic % | | | | | | |
|---|---|---|---|---|---|---|---|---|---|
| | | | C | O | Na | Al | Si | M | Ni |
| 95-3 | Ag at 6 h | | | 66.05 | | 13.23 | 11.85 | 8.09(Ag) | |
| 95-4 | Ag at 16 h | | | 63.96 | | 14.35 | 12.97 | 8.73(Ag) | |
| 81-5 | Cs @RT | | | 63.87 | 5.17 | 14.44 | 13.78 | 2.73 (Cs) | |
| 81-10 | Cs @60° C. | | | 66.56 | 2.19 | 14.5 | 14.74 | 2.02 (Cs) | | ii. Modification of NaA Membrane by Surface Reaction

In this example, surface modification methods were tested to modify a NaA membrane. The NaA/Ni membrane sheet as prepared often did not look uniform over the whole sheet surface, and there were various features. The surface modification was attempted to fix some meso-defects on the as-prepared NaA membrane and enhance H2O/N2 selectivity. Table 28 lists five membrane test coupons sampled from different areas of one membrane sheet (#60037-13-6). The air dehumidification performances of the same test coupon are compared before and after modification. The air dehumidification tests were conducted with atmospheric air containing 3.4 mol % H2O in the feed side and 5-10 mbar vacuum in the permeate side. The membrane test cell temperature was maintained at 31-32° C. The surface modification was conducted by dropping the solution on the membrane surface, draining excessive solution off the membrane surface, and drying the membrane at room temperature. Two solutions used for impregnation were 0.1M NaOH and 0.25 wt. % Nafion. Testing results of the coupons sampled from different areas of as-prepared NaA/Ni membrane sheet did reveal significant variations in the membrane performance, which could be caused by defects and/or structure variations over the whole area of a membrane sheet. In general, the membrane performance was substantially improved after the modification.

Given the significant effects of surface modification on membrane performances, test coupons sampled from another NaA/Ni membrane sheet were used to compare different surface modification methods. In Table 29, first four test coupons were sampled from the uniform area of the same membrane sheet to compare impacts of the surface modification. Coupon #1 was tested as prepared. Coupon #2 was modified by soaking the membrane sample in Dow Corning® OS-2 Silicone solvent overnight and drying at room temperature. This solvent is a volatile methylsiloxane (VMS) fluid developed specifically for use as a cleaning agent and carrier. After modification, the membrane surface turned from hydrophilic into hydrophobic, although the membrane surface looked same. Coupons #3 and 4 were modified using the impregnation methods as described above. All the four membrane coupons showed excellent permeance and $H_2O/N_2$ selectivity. The results indicate that these surface modification methods do not have negative impacts on the uniform (high quality) membrane surface, while they could be beneficial to fixing of some meso-defects. Fixing the meso-defects by the surface modification is confirmed with coupon #5. Both H2O permeance and H2O/N2 selectivity were dramatically enhanced after modifying an as-prepared coupon of relative low selectivity with the Nafion solution impregnation.

However, surface modification needs to be properly chosen to enhance the membrane performance. Test coupon #6 showed very low H2O/N2 selectivity after it was modified by reacting with Tetraethyl orthosilicate (TEOS, reagent grade, 98%, Sigma Aldrich) vapor at 60° C. for 16 hours. This modification was done by hanging the membrane coupon in a closed glass bottle that had a layer of TEOS liquid on the bottom. The membrane surface was contacted with TEOS vapor that was vaporized from the TEOS liquid.

TABLE 28

Impacts of surface modification on air dehumidification performances of NaA/Ni membrane (testing coupon sampled from membrane sheet 60037-13-6)

| Test coupon | Modification | Permeance, mol/m²/s/Pa | | | Separation factor |
|---|---|---|---|---|---|
| | | H₂O | O₂ | N₂ | H₂O/N₂ |
| #2. sampled from edge | As-prepared | 4.6E−06 | 8.8E−07 | 1.1E−06 | 3 |
| #2. Modified | impregnated with 0.1M NaOH | 1.5E−05 | 4.2E−09 | 7.9E−09 | 899 |
| #3. white streak in the center | As-prepared | 1.5E−05 | 1.2E−08 | 1.3E−08 | 560 |
| #3. modified | impregnated with 0.25 wt. % Nafion solution | 1.1E−05 | 4.8E−09 | 5.4E−09 | 1153 |
| #4. - three small black dots | As-prepared | 1.4E−05 | 7.4E−09 | 9.4E−09 | 752 |
| #4. modified | impregnated with 0.25 wt. % Nafion solution | 8.4E−06 | 6.2E−09 | 6.5E−09 | 774 |
| #5. slightly darker bands | As-prepared | 3.7E−06 | 9.2E−09 | 9.9E−09 | 217 |
| #5. - modified | impregnated with 0.25 wt. % Nafion solution | 1.2E−05 | 1.0E−09 | 1.5E−09 | 4244 |
| #6. sampled from edge | As-prepared | 1.1E−05 | 1.0E−08 | 9.9E−09 | 613 |
| #6. modified | impregnated with 0.25 wt. % Nafion solution | 2.6E−05 | 2.5E−09 | 2.8E−09 | 3362 |

Figure 46A:
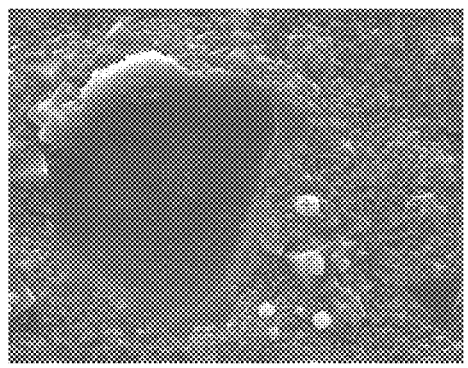
FIGS. 46A-46G are SEM images illustrating the textures of the NaA membranes modified by different surface reaction (coupons sampled from membrane sheet #60037-11-5).
Figure 46B:
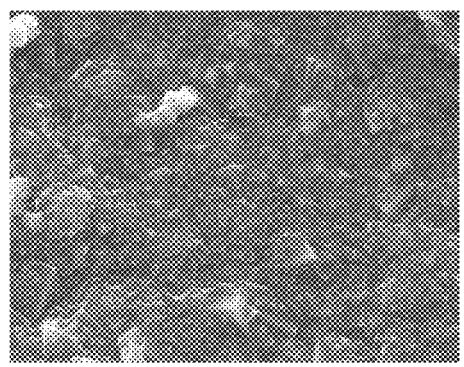
Figure 46C:
Figure 46D:
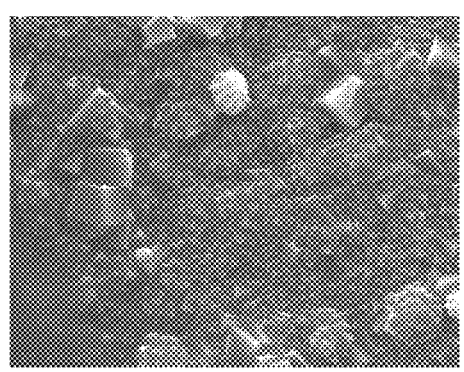
Figure 46E:
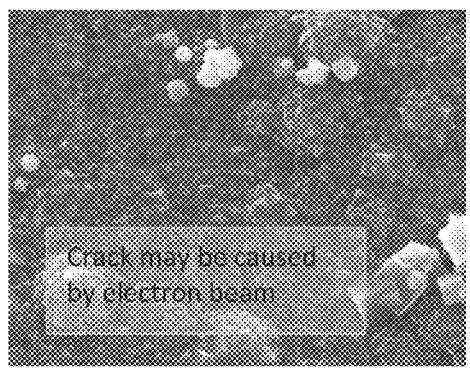
Figure 46F:
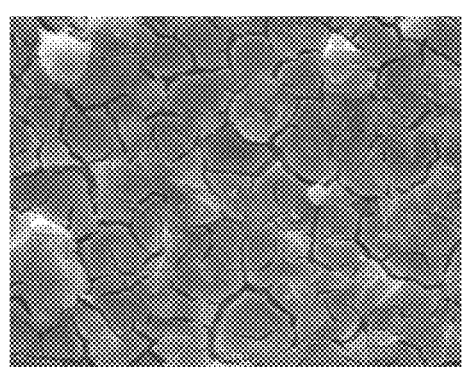
Figure 46G:
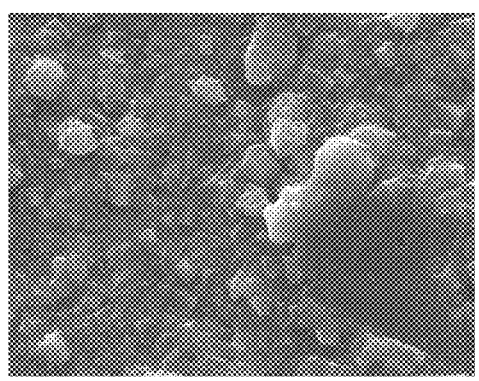

By contrast, coupon #7 showed good permeance and selectivity after modified with TEOS in a different way. The membrane surface was exposed to liquid TEOS at 22° C. for 16 hours in a closed container. Then, the TEOS liquid was drained off the membrane surface and the membrane was left to dry in the room temperature. It is noted that both coupon #6 and #7 were hydrophobic after the modification, indicating occurrence of some surface reactions.

surface reaction between the membrane surface and OS2 solvent. The presence of F and S atoms on coupon #3 and #5 confirms attachment of Nafion molecules onto the membrane surface. There is no significant increase of Na content in coupon #4 after NaOH modification, indicating slight surface modification of the membrane by the NaOH solution. FIG. 46F shows significant mud cracks on coupon #6, which were caused by excessive reaction of the membrane with TEOS molecules during CVD modification. The low H2O/N2 selectivity of this membrane coupon can be attributed to these cracks. Significant presence of C atoms in coupon #7 is revealed after the membrane surface was modified by moderate reaction with TEOS in liquid phase, which suggests attachment of TEOS molecule on the membrane surface. Since the membrane crystal structures are intact, this membrane coupon maintained good H2O permeance and H2O/N2 selectivity.

TABLE 29

Impacts of surface modification on air dehumidification performances of NaA/Ni membrane (testing coupon sampled from NaA/Ni membrane sheet #60037-11-5)

| Test coupon | Modification | Permeance, mol/m²/s/Pa | | | Separation factor |
| --- | --- | --- | --- | --- | --- |
| | | H₂O | O₂ | N₂ | H₂O/N₂ |
| #1. Uniform | As-prepared | 1.2E−05 | 0.0E+00 | 0.0E+00 | n/a |
| #2. Uniform | Soaked in OS2 solvent | 1.2E−05 | 0.0E+00 | 0.0E+00 | n/a |
| #3. Uniform | Impregnated with the Nafion solution | 1.1E−05 | 0.0E+00 | 1.0E−09 | 13358 |
| #4. Uniform | Impregnated with the NaOH solution | 1.1E−05 | 0.0E+00 | 1.6E−09 | 4978 |
| #5. discolored blemish | As-prepared | 9.1E−06 | 6.0E−08 | 7.6E−08 | 74 |
| #5. Modified | Impregnated with the Nafion solution | 2.1E−05 | 1.5E−08 | 2.1E−08 | 407 |
| #6. Modified | vapor deposition of TEOS | 1.1E−05 | 3.4E−07 | 4.1E−07 | 16 |
| #7. Modified | Soaked in TEOS | 8.6E−06 | 0.0E+00 | 4.8E−09 | 1125 |

Surface textures of the membrane coupons listed in Table 29 were analyzed by SEM/EDS after air dehumidification tests, and shown in FIGS. 46A-46G. The corresponding surface compositions are listed in Table 30. The membrane surfaces of modified coupons #2, 3, 4, and 5 look similar to the as-prepared membrane coupon. This confirms that the surface modification of present disclosure is meant to modify the surface chemistry of the membrane exterior surface without altering its crystal structures. Coupon #2 after OS2-modification shows significant presence of C and no obvious Si enrichment, which indicates occurrence of

TABLE 30

Surface compositions of modified NaA membrane (sheet ID 60037-11-5)

| Coupon # | EDS Probed area | At % | | | | | | | |
| --- | --- | --- | --- | --- | --- | --- | --- | --- | --- |
| | | F | S | C | O | Na | Al | Si | Ni |
| #1. As-prepared | Spot 1 - representative area | | | | 54.9 | 11.4 | 15.1 | 17.6 | 1.0 |
| | Spot 2 - loose particle | | | | 51.1 | 11.7 | 16.3 | 18.1 | 2.8 |
| | Spot 3 - densified area | | | | 60.9 | 10.0 | 13.0 | 15.5 | 0.6 |
| #2. OS2 Modified | Full image | | | 13.7 | 48.8 | 10.1 | 12.3 | 1e3.1 | 2.1 |
| #3. Nafion modified | Full image | 3.1 | 0.1 | 18.0 | 46.1 | 8.8 | 10.9 | 12.4 | 0.6 |
| | Spot 1 - typical membrane | 2.9 | 0.0 | 17.8 | 46.9 | 8.9 | 10.8 | 12.0 | 0.7 |
| | Spot 2 - large crystals | 0.7 | 0.0 | 10.4 | 54.5 | 9.7 | 11.4 | 12.7 | 0.5 |
| | Spot 3 - agglomerates | 2.4 | 0.0 | 23.0 | 46.9 | 7.9 | 9.1 | 10.1 | 0.6 |
| #4. NaOH modified | Full image | | | 17.4 | 48.4 | 8.6 | 11.2 | 13.5 | 0.8 |
| #5. Nafion-modified | Full image | 0.6 | 0.1 | 10.9 | 50.7 | 9.9 | 12.6 | 14.2 | 0.9 |
| #6. Modified by CVD of TEOS | Full image | | | | 48.3 | 12.9 | 14.6 | 15.4 | 8.8 |
| | Spot 1 - membrane | | | | 46.3 | 13.5 | 14.9 | 15.0 | 10.2 |
| | Spot 2 - agglomerates | | | | 47.0 | 12.2 | 17.2 | 19.0 | 4.6 |
| #7. Modified with TEOS impregnation | full image | | | 39.3 | 39.9 | 5.5 | 7.1 | 7.7 | 0.5 |
| | Spot 1 - membrane | | | 13.2 | 49.7 | 9.6 | 12.4 | 14.3 | 0.9 |
| | Spot 2 - agglomerate | | | 65.2 | 26.1 | 2.6 | 2.8 | 3.1 | 0.2 | iii. Modification of NaA Membrane by Ion Exchange of Transition Metal Ions

Modification of NaA membranes by ion exchange was further tested with transition metal ions. 0.1M AgNO3, 0.1M CoCl2 and 0.1M Cu (NO3)3 solutions were prepared. 3.5 cm×3.5 cm coupons were cut out of a NaA/Ni membrane sheet. The membrane coupon was mounted on a magnetic tape, loaded in a plastic jar, and immersed in a solution. The jar was placed in the Lab-Line Environ Shaker Mixer, and shaken at 30° C. for 2-4 hours. Then, the membrane was taken out of the jar, rinsed once with de-ionized water, and dried inside the vacuum oven at 120° C. overnight. The preparation conditions are summarized in Table 31.

Molecular separation performances of the modified membranes were characterized by gas permeance measurements of a few gas streams, air, CO2, 16.7% CO2 in air mixture, and 3.3% H2O and 16.7% CO2 in air. The feed gas was introduced to the membrane side under atmospheric pressure, while the permeate side of the membrane was pulled vacuum to 5 to 10 mbar. Table 32 lists the molecular permeance values measured. Permeance for a molecule may vary dramatically among different gas compositions tested because different molecules can have very different adsorption and transport properties in the zeolite membrane. For example, $H_2O$ permeance dominates with a humid feed gas.

TABLE 31

NaA membrane exchanged with transition metal ions

| Mem ID | Parent Mem ID | Solution | Coupon orientation in exchange | Exchange time, h | Weight gain, wt. % |
|---|---|---|---|---|---|
| 61794-13-Ag | 60037-89-2 | 0.1M AgNO3 | face up | 4 | 1.84 |
| 61794-13-Co | 60037-89-2 | 0.1M CoCl2 | face up | 4 | −0.11 |
| 61794-13-Cu | 60037-89-2 | 0.1M Cu(NO3). | face up | 4 | −0.06 |
| 61794-16-Ag | 60037-89-2 | 0.1M AgNO3 | face down | 2 | 2.10 |
| 61794-16-Co | 60037-89-2 | 0.1M CoCl2 | face down | 2 | 0.16 |
| 61794-16-Cu | 60037-89-4 | 0.1M Cu(NO3). | face down | 2 | −0.15 | meance increased as the temperature was increased to 65° C. However, permeance values of these molecules remain about 2 to 3 orders of magnitude lower than the H2O permeance. After 65° C.-testing with the humid CO2/air mixture, the membrane was tested with dry 15% CO2 in air. O2 and N2 permeance could not be detected over a temperature range of 30 to 78° C. The CO2 permeance was fairly low in the order of 1E-10 mol/m2/s/Pa. Then, the temperature was raised to 124° C. and tested with feed gases of different H2O molar fraction. FIG. 47C shows that under the constant temperature of 124° C., H2O permeance stayed approximately same as H2O molar fraction in the feed gas was varied from 3.3 to 20 mol %. The H2O permeance at such a high temperature is about 3 orders of magnitude higher than the N2 and O2 permeance. This Ag-exchanged NaA/Ni membrane is demonstrated to be an excellent H2O-permeable membrane over a range of conditions.

As a comparison, the parent NaA membrane, which was used to make the Ag ion-exchanged membrane, was tested over a range of conditions. FIG. 48A shows that H2O and CO2 permeance are not much affected by increasing CO2 molar fraction in the feed gas under a constant temperature of 63° C. At about the same temperature with the same feed gas composition (15% CO2, 3.3% H2O, balance air), the Ag ion-exchanged membrane shows about one order of magnitude higher H2O/N2 selectivity than the parent NaA membrane. Comparison of FIG. 48B to FIG. 47B shows that dry gas permeance through the NaA membrane is about 3 orders of magnitude higher than the Ag ion-exchanged one. The possibility to dramatically enhance the membrane H2O/air selectivity by ion exchange is demonstrated.

Figure 49A:
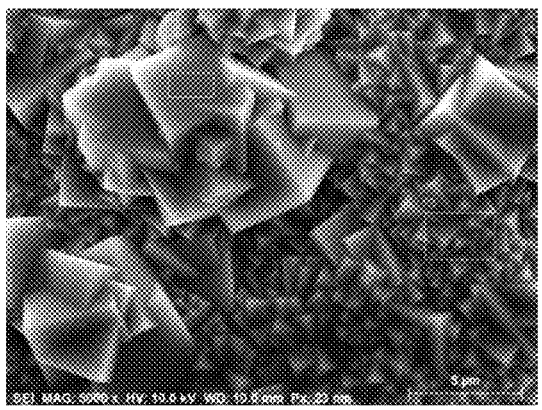
FIGS. 49A-49C are SEM images illustrating surface textures of as-prepared, tested, and exchanged and tested NaA/Ni membranes (membrane ID 60037-89-2).
Figure 49B:
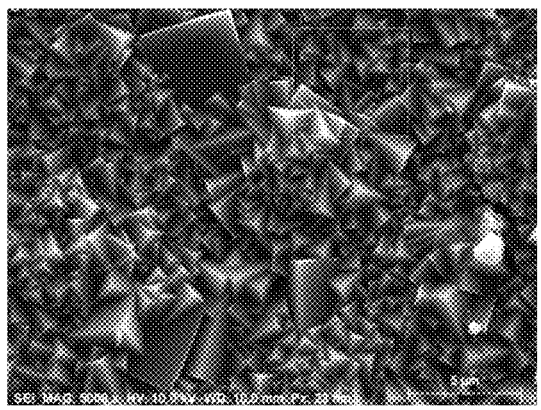
Figure 49C:
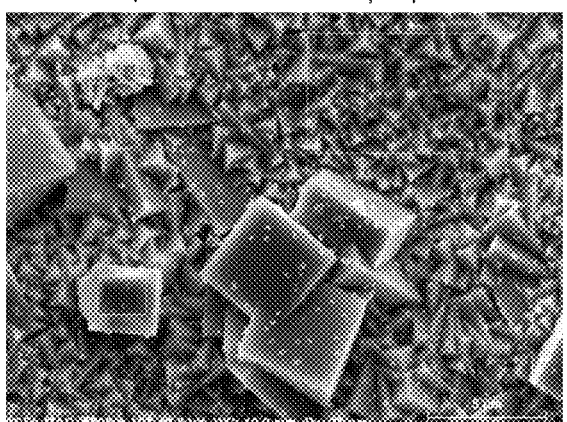

In FIGS. 49A-49C, SEM pictures of the parent NaA membrane surfaces are compared to the ion-exchanged one. Corresponding surface compositions analyzed by EDS are listed in Table 39. The micro-structures of as-prepared NaA membranes look same before and after the gas separation tests with different gases at 63° C. The atomic compositions are also similar. This is as expected, since the membrane structure should not be affected by such moderate testing conditions. The Ag ion-exchanged membrane showed same micro-structures as the parent NaA membrane even after tests with various gases at 124° C. Presence of some bright spots on the membrane surface is believed to be Ag particles. EDS analysis of different spots on the Ag ion-exchanged

TABLE 32

Gas permeance (mol/m²/s/Pa) of modified NaA membranes

| Mem ID 61794- | T, ° C. | Air | | | CO₂ | CO₂/air mix | | | Humid CO₂/air | | | |
|---|---|---|---|---|---|---|---|---|---|---|---|---|
| | | O2 | N2 | CO2 | CO2 | CO2 | O2 | N2 | H2O | CO2 | O2 | N2 |
| 16-Ag | 30 | 4.0E−07 | 4.4E−7 | 2.1E−8 | 3.4E−07 | 3.9E−07 | 4.4E−07 | | 6.6E−06 | 0.0E+00 | 1.8E−07 | 2.1E−07 |
| Aged | 30 | | | | 0 | 3.4E−07 | 3.6E−07 | | 6.4E−06 | 0 | 1.1E−08 | 7.3E−09 |
| | 65 | 0 | 3.9E−8 | | | | | | 6.6E−06 | 0.0E+00 | 1.8E−07 | 2.1E−07 |
| 16-Co | 30 | 3.7E−06 | 3.5E−6 | 3.2E−6 | 3.9E−06 | 3.9E−06 | 3.8E−06 | | 3.5E−06 | 2.0E−06 | 2.1E−06 | 2.2E−06 |
| | 65 | 3.8E−06 | 3.7E−6 | 2.7E−6 | 3.7E−06 | 3.7E−06 | 3.8E−06 | | | | | |
| 16-Cu | 30 | 1.9E−05 | 1.5E−5 | 5.1E−6 | 1.8E−05 | 2.0E−05 | 1.7E−05 | | | | | |

Molecular sieving functions of the Ag ion-exchanged membrane (61794-13-Ag) were tested over a range of conditions. FIG. 47A shows variations of H2O, CO2, O2m and N2 permeance with temperature with a constant feed gas (3.3% H2O, 15% CO2, balance air). The feed gas was under atmospheric pressure, while the permeate was in 5 to 10 mbar. Excellent selectivity of this membrane to H2O over other molecules is shown. At temperatures below 40° C., air permeation could not be detected. CO2, N2, and O2 per-membrane reveals that Na ion in the original zeolite framework was completely exchanged by Ag ion. The SEM/EDS results confirm that the Ag ion-exchange modified the zeolite channel without changing the crystal structure of the membrane. It is likely that because Ag ions are larger than Na ions, its inclusion into the zeolite framework reduces the zeolite pore opening and blocks permeation of N2, O2, and CO2. H2O molecules may be transported through the zeolite channel by association with Ag ions.

TABLE 39

Surface compositions of the NaA membranes as-prepared, tested, and ion-exchanged

| Membrane area | EDS Spectrum # | At % O | Na | Al | Si | Ag | Al/Si | Na/Al |
|---|---|---|---|---|---|---|---|---|
| 89-2 NaA as-prepared | | | | | | | | |
| impure materials | 1 | 63.24 | 10.91 | 10.83 | 15.02 | | 0.72 | 1.01 |
| large crystal | 2 | 61.09 | 16.74 | 9.72 | 12.46 | | 0.78 | 1.72 |
| Uniform area | 3 | 54.42 | 15.98 | 12.45 | 17.15 | | 0.73 | 1.28 |
| 89-2 NaA tested | | | | | | | | |
| Uniform area | 1 | 57.1 | 16.2 | 12.6 | 14.1 | | 0.89 | 1.29 |
| impure materials | 2 | 54.0 | 21.7 | 10.9 | 13.4 | | 0.82 | 1.98 |
| Ag ion-exchanged one tested | | | | | | | | |
| uniform | 1 | 45.33 | | 16.67 | 21.61 | 16.39 | 0.77 | 0.98 |
| deposited crystal | 2 | 46.70 | | 16.18 | 21.07 | 16.06 | 0.77 | 0.99 |
| impurities | 3 | 59.63 | | 12.44 | 17.76 | 10.16 | 0.70 | 0.82 |
| embedded crystal | 4 | 42.27 | | 17.20 | 21.87 | 18.67 | 0.79 | 1.09 |
| embedded crystal | 5 | 51.69 | | 15.29 | 19.73 | 13.28 | 0.77 | 0.87 |

Because of the exceptional performances of the Ag ion-exchanged membrane, more ion exchange experiments were performed with dilute AgNO3 solution. The ion exchange was conducted at 23° C. for only 15 minute. After ion exchange, the membrane was dried in a vacuum oven at 120° C. for 15 hours. 0.3% and 1.6% weight gains were obtained with 0.006 and 0.025M Ag nitrate solution, respectively. The studies show that the Ag ion exchange of the NaA membrane is rapid. FIGS. 50A and 50B show the molecular separation performances of the 0.025M Ag ion-exchanged membrane (ID61794-41-4). With a dry feed gas comprising 17% CO2 in air, N2 and CO2 permeance was essentially too low to be detected as the separation temperature was increased from 60 to 120° C. There was some O2 permeance. It decreased with increasing temperature until 100° C. and then increased as the temperature was raised to 115° C. The results confirm low permeance of the Ag ion-exchanged membrane to dry gases. At a constant temperature of 115° C. with humid feed gas, H2O permeance is 2-3 orders of magnitude higher than O2 permeance, and CO2 and N2 permeance remained beyond the detection limit. The selective H2O permeance of Ag-exchanged NaA membranes is confirmed.

For comparative purposes, a commercially-available Nafion membrane sheet was acquired and tested. The Nafion membrane is known for its H2O permeance. FIGS. 50A and 50B and FIGS. 51A and 51B show the gas permeance at different temperatures and with feed gas of different H2O content. With a feed gas containing 3.3% H2O, both H2O and N2 permeance decreased with increasing temperature from 30 to 115° C. At 115° C. constant temperature, H2O permeance decreased with increasing H2O content in the feed gas while N2 and O2 permeance stayed at a low level—close to the detection limit. Compared to the Ag ion-exchanged zeolite membrane (see FIGS. 50A and 50B), the Nafion membrane (see FIGS. 51A and 51B) shows about 2 orders of magnitude $H_2O$ permeance than the Ag-exchanged one at elevated temperatures (<80° C.). At low temperature (31° C.), the Nafion membrane shows about 3 times lower $H_2O$ permeance than the Ag ion-exchanged one. At this temperature, the Ag ion-exchanged membrane showed nearly infinite selectivity to $H_2O$ over air ($O_2$ or $N_2$), while the Nafion membrane showed $H_2O/O_2$ selectivity about 200.

iv. Zeolite Membrane Surface Modification with Molecules Containing Amine Function Groups The thin-sheet zeolite membranes were modified through reaction of surface hydroxyl groups with molecules containing amine functional groups. 3.5 cm×3.5 cm test coupons were cut from representative NaA/Ni and NaX/Ni membrane sheets. The three molecules tested were 3-(2-Aminoethylamino)propyl]trimethoxysilane (2-APTMS, Sigma-Aldrich), (3-Aminopropyl)triethoxysilane (assay=98%) (APTES, Sigma-Aldrich), and 3-aminopropyldimethylethoxysilane (APDMES, Gelest Inc.). The procedures for modification with a water-based solution are as follows. First, 10 wt % of APTES and APTMS solutions were prepared in the de-ionized water. The membrane coupons were placed in a closed container and soaked in the solution. The container was placed inside an oven to heat at 75° C. for 2 hours. Then, the membrane was rinsed with de-ionized water and in the vacuum oven at 120° C. overnight. The modification with an organic solvent-based solution is as follows. 4 wt. % of APDMES solution was prepared in toluene. A membrane coupon was loaded into a Teflon jar and immersed in the solution. The coupon was soaked at room temperature in N2 environment for 1 day. Then, the membrane was rinsed by methanol and dried in the vacuum oven at 110° C. for 1 hour. The results are summarized in Table 40. As expected, the weight change of the membrane coupon by the surface reaction was minimal. The modified membrane was checked by the colored water test. All the membranes listed in Table 40 showed no color leakage.

Gas permeance through the modified membrane was measured with different feed gases: air, pure CO2, 16.7% CO2 in air, 3.3% H2O and 16.7% CO2 in air. The results are summarized in Table 41. The NaA membrane modified the APDMES/toluene solution (16-A-DMES) showed no permeance to CO2, N2, and O2 for a humid feed gas, although the permeance of dry gases was significant. The Faujasite membranes modified with respective APDMES/toluene (16-X-DMES), APTMS/H2O (16-X-TMS) and APTES/H2O (16-X-TES) solutions showed no or little permeance to dry gases. In particular, membrane #16-X-DMES showed very good $H_2O$ permeance and no permeance of $CO_2$, $N_2$ or $O_2$ with the humid feed gas. As taught in the preparation of Faujasite zeolite membrane, Faujasite-type framework has much larger pores than NaA-type framework. The present example shows that selectivity of the Faujasite membrane to H2O over other molecules can be dramatically improved by proper surface modification.

branched ones, and ethanol/water separation. Those membranes were typically prepared on ceramic disks or tubes via either direct growth or secondary growth. In addition to fragility and cost issues associated with those types of

TABLE 40

Thin-sheet NaA-type and Faujasite-type (NaX) membranes modified by surface reaction

| Mem ID 61794 | Parent membrane | | Modification conditions | | | | Weight change | Color |
|---|---|---|---|---|---|---|---|---|
| | Type | ID 60037- | Solution | Solution, ml | Temp, °C. | Time, h | Drying, °C./h | wt % | leak test |
| -16-X TES | NaX | 81-5 | APTES in H2O | 10 | 75 | 2 | 120/12 | 0.06 | no leak |
| -16-A TES | NaA | 89-4 | APTES in H2O | 10 | 75 | 2 | 120/12 | −0.10 | no leak |
| -16-X TMS | NaX | 83-77-3 | APTMS in H2O | 10 | 75 | 2 | 120/12 | −0.34 | no leak |
| -16-A TMS | NaA | 89-4 | APTMS in H2O | 10 | 75 | 2 | 120/12 | −0.68 | no leak |
| -16-X DMES | NaX | 81-5 | APDMES in Toluene | 10 | 22 | 24 | 110/1 | 0.03 | no leak |
| -16-A DMES | NaA | 89-4 | APDMES in Toluene | 10 | 22 | 24 | 110/1 | 0.00 | no leak |

TABLE 41

Gas permeance of the zeolite membrane modified with molecules containing amine function groups (separation temperature of 30° C., gas permeance in unit of mol/m$^2$/s/Pa)

| Mem ID 61794- | Air | | CO$_2$ | CO$_2$/air mix | | | Humid CO$_2$/air | | | |
|---|---|---|---|---|---|---|---|---|---|---|
| | O$_2$ | N$_2$ | CO$_2$ | CO$_2$ | O$_2$ | N$_2$ | H2O | CO2 | O2 | N2 |
| 16-A-DMES | 2.3E−07 | 2.6E−7 | 4.4E−7 | 4.4E−07 | 4.6E−07 | 5.1E−07 | 2.5E−06 | 0 | 1.3E−08 | 7.7E−09 |
| 16-X-DMES | 8.4E−09 | 1.7E−9 | 1.4E−9 | 1.3E−08 | 0 | 0 | 5.9E−06 | 0 | 0 | 0 |
| 16-X-TES | 1.7E−09 | 0 | ND | ND | ND | ND | 4.3E−07 | 0 | 00 | 00 |
| 16-X-TMS | 1.2E−08 | 3.1E−9 | 1.9E−10 | ND | ND | ND | 2.5E−06 | 0 | 0 | 0 |

VII. Exemplary Embodiment 5—Thin-Sheet MFI-Type Membrane Structure and Preparation

A. Introduction

MFI-type zeolite has a pore size about 0.57 nm, which falls between the NaA-type and Faujasite-type zeolite pores, and is an important class of zeolite materials with a variety of industrial applications. Compared to the other zeolites, MFI-type zeolite has one unique attribute that its physical and chemical properties can be tuned by changing Si/Al ratio in the framework over a wide range from about 10 to infinity. A MFI-type zeolite without any Al (Si/Al ratio=infinity) has a framework as silicalite. Silicalite is a highly hydrophobic material that does not adsorb water molecules. Affinity to water molecules is increased with introduction of Al into the framework. Thus, selectivity of the MFI-type zeolite membrane to H$_2$O over other molecules can be tuned by varying Si/Al ratio in the framework. For example, the membrane without Al will be selective toward ethanol over water molecule, while the membrane with Al will be selective toward water over ethanol.

MFI-type zeolite membranes have been extensively studied in the literature for molecular and gas separation, such as CO$_2$ separation from CO$_2$-gas mixtures, H$_2$ separation from H$_2$ gas mixtures, separation of linear molecules from the membrane supports, Al atoms in the ceramic support can be readily incorporated into the zeolite framework during hydrothermal growth so that it becomes impossible to obtain the zeolite membrane free of Al atoms.

B. Description of Exemplary MFI-type Membranes

The MFI-type membrane structures of present invention are the same to the thin-sheet NaA membrane described previously. Exemplary preparation process steps are outlined in FIG. 52. Selection of suitable thin-sheet support, seed coating, and secondary growth are the same process steps as used for preparation of NaA and Faujasite-type membranes. MFI-type crystals with particle sizes from 0.1 to 2 μm are used as the seeding crystal. A solution suitable for MFI-type zeolite crystal growth is used for secondary membrane growth. Different from NaA and Faujasite-type membranes, one additional process step needed for MFI-type membrane preparation is removal of organic template. An organic template is often added into the growth solution to obtain high quality MFI-type membranes. The template needs to be removed to open up the channel pores for separation. The template often needs to be removed at elevated temperatures. Its removal must be controlled carefully to avoid cracks of the zeolite membrane. Previously, it has been disclosed to remove the template by calcination at 500° C. in O$_2$-containing environment. In the present example, a moderate process is taught for removal of the organic template. One way is to expose the membrane surface only to an oxidizing environment by protecting the support, such as 1 to 5 mol % $O_2$ in an inert gas, at a temperature below 500° C., preferable 350 to 450° C., for a time period of 1 to 24 hours. In this way, oxidation of the template in the zeolite membrane is allowed to take place gradually and to eliminate formation of hot spots from exothermic oxidation reactions. Another way is to expose the membrane sheet to a reducing gas environment, such as $H_2$-containing gas, at temperatures up to 600° C., to allow thermal decomposition or hydrolysis of the organic template for a time period of 1 to 20 hours. The heating and cooling is controlled at 1° C./min or less.

Figure 53A:
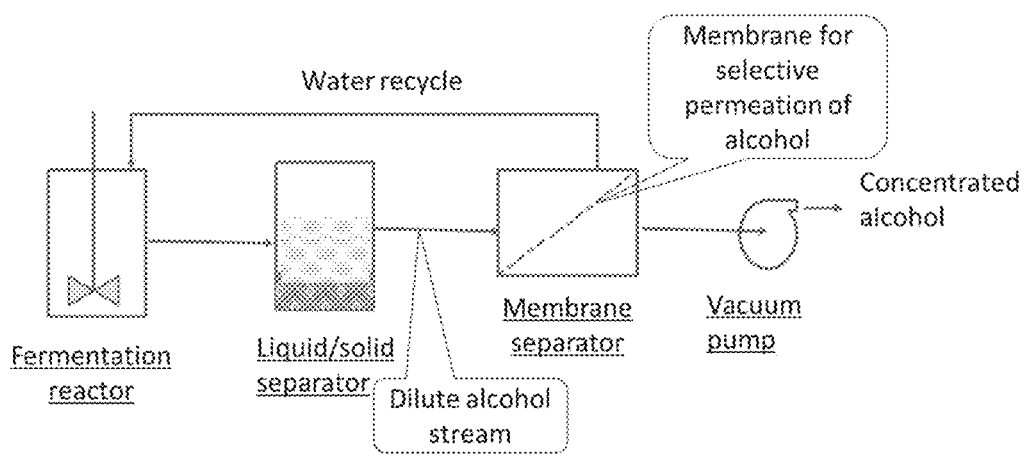
Figure 53B:
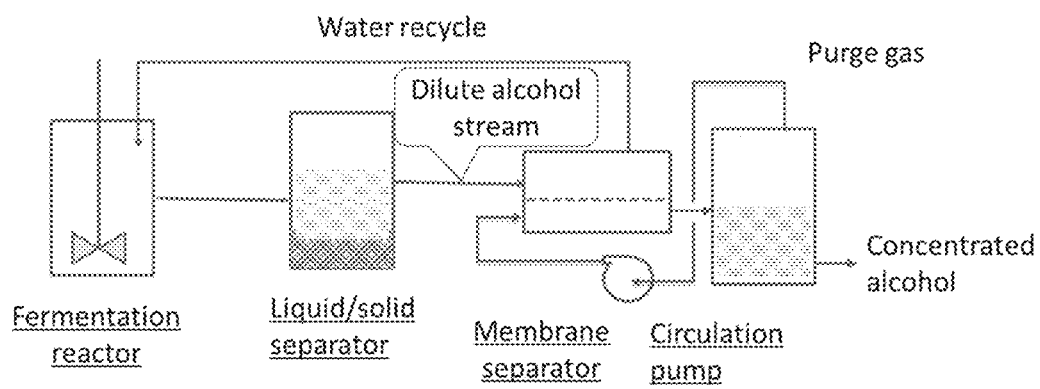

The MFI-type membrane containing Al is selective toward $H_2O$ over other molecules and can be used for removal of water molecules from water-containing mixtures as NaA-type and Faujasite-type membranes. One notable feature with the MFI-type membrane without Al, i.e., silicalite membrane, is selective permeation of hydrocarbon molecules over water molecules. The silicalite membrane can be used to remove alcohols or hydrocarbon molecules from water-containing mixtures. One of such application examples is concentration of ethanol from fermentation broth. The fermentation typically produces a dilute ethanol stream containing 1 to 15 wt. % ethanol. Concentrating such a dilute ethanol stream to above 50 wt. % by distillation is a very energy-intensive process. An ethanol-selective membrane can be used for selective removal of ethanol from dilute ethanol/water mixtures as illustrated by the process flow diagrams shown in FIGS. 53A and 53B.

As a clarified ethanol/water stream flows over the membrane surface, ethanol is selectively removed into the other side of the membrane. The transport of ethanol across the membrane is driven by difference in ethanol partial pressure or chemical potential between the two sides of the membrane. The feed stream is typically at or above atmospheric pressure. The difference can be generated by pulling vacuum on the permeate side of the membrane or by sweeping the permeate with a fluid stream.

C. Examples i. Preparation of Thin-Sheet MFI-Type Membrane

The raw materials used to prepare MFI-type membrane in this example were 1.0 M TPAOH (Sigma-Aldrich), tetraethyl orthosilicate (TEOS, 99%, Sigma-Aldrich), sodium hydroxide (99%, Merck), and sodium aluminate (anhydrous, Sigma-Aldrich).

The seeding crystals were prepared by conducting solution growth under moderate conditions. A growth solution with composition of TEOS:TPAOH:$H_2O$:NaOH molar ratio=1.0:0.152:24.7:0.008 was prepared. 0.094 g NaOH was dissolved in 86.49 g $H_2O$ to form a NaOH solution, to which 45 cc of TPAOH solution was added. The mixture was stirred at room temperature until the solution became clear. Under stirring, 61.51 g of TEOS was gradually added. The mixture was stirred at room temperature overnight to obtain a clear solution. The clear solution was heated under stirring at 85° C. for 3 days. The solution turned milky. The solid was separated out of the solution by centrifuge at 4500 RPM. The solid precipitate was rinsed with de-ionized water three times. Resulting wet cake was divided into two portions. First portion was dried in the oven at 120° C. overnight and calcined in a furnace at 500° C. for 5 hours at 1° C./min ramp, which is denoted as calcined seeds and assumed to be free of organic template. Another portion was dried at room temperature and denoted as as-synthesized seeds.

Figures 54A, 54B:
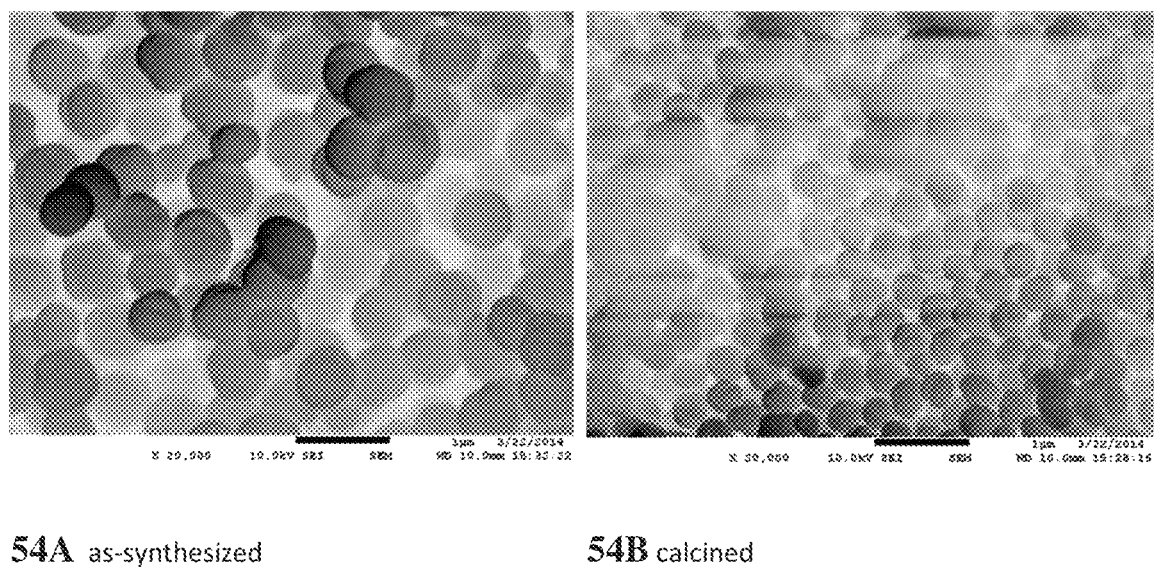
FIGS. 54A and 54B are SEMs illustrating morphologies of seeding crystals prepared for MFI-type membrane growth.

FIGS. 54A and 54B show morphologies of the seeding crystals prepared in this work. The calcined sample looks the same as the as-synthesized one, because the calcination only removed the template in the zeolite channel. The seeding crystals comprise distinctive zeolite crystals of about 100 to 300 nm sizes.

TABLE 42

Figure 55A:
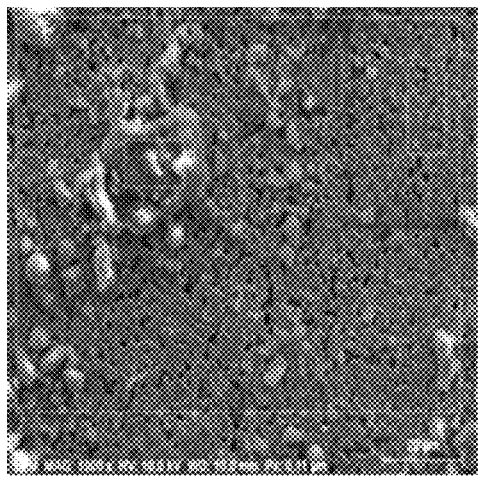
FIGS. 55A-55D are SEM/EDS analysis of seeded support sheets.
Figure 55B:
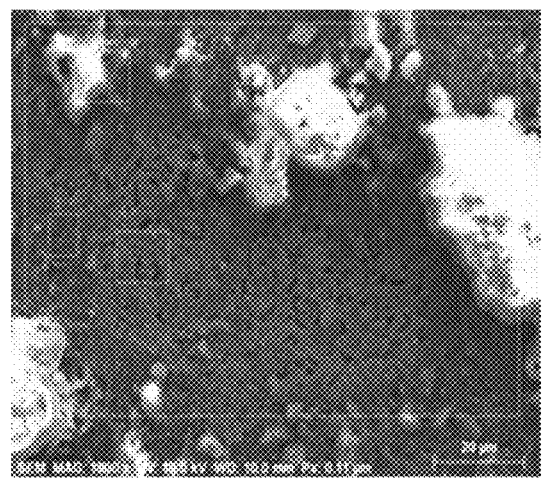

Elemental compositions of seeded porous Ni supports in SEM images of FIGS. 55A and 55b

| | Sheet coated with 0.15 mg/cm² of calcined seeds (FIG. 55A) | | | | Sheet coated with 0.24 mg/cm² of calcined seeds (FIG. 55B) | | | |
|---|---|---|---|---|---|---|---|---|
| Spot | 4 | 3 | 2 | 1 | 4 | 3 | 2 | 1 |
| O at % | 10.41 | 54.84 | 62.00 | 57.84 | 36.08 | 63.57 | 63.32 | 59.46 |
| Si at % | 3.04 | 19.93 | 36.97 | 32.74 | 16.75 | 31.88 | 35.72 | 32.20 |
| Ni at % | 86.30 | 14.07 | 0.36 | 7.39 | 46.69 | 4.05 | 0.24 | 7.88 |

Ten grams of as-synthesized seeds was mixed with 70 g de-ionized water and 30 cm³ zirconia beads in a 125 ml PP bottle, and ball-milled at 50% of the full-scale speed for 2 hours. The milled slurry was added with de-ionized water to obtain a seed coating solution with 5.93 wt. % solid loading of the as-synthesized seeds. 5.10 g of the calcined seeds was mixed with 70 g de-ionized water and 30 cm³ zirconia beads in a 125 ml PP bottle, and ball-milled at 50% of the full-scale speed for 9 hours. The milled slurry was added with water to obtain a seed coating solution with 3.0 wt. % of the calcined seeds.

13 cm×13 cm porous Ni sheets were coated with the above seed coating solution on the spay coater in the same way as used for the NaA membrane preparation. For each support sheet, two times of coating was performed to obtain a visually-uniform seeded support surface. For each seeding material, two different seed loading levels were made by controlling spray time to assess impacts of the seed loading on the membrane growth.

TABLE 43

Figure 55C:
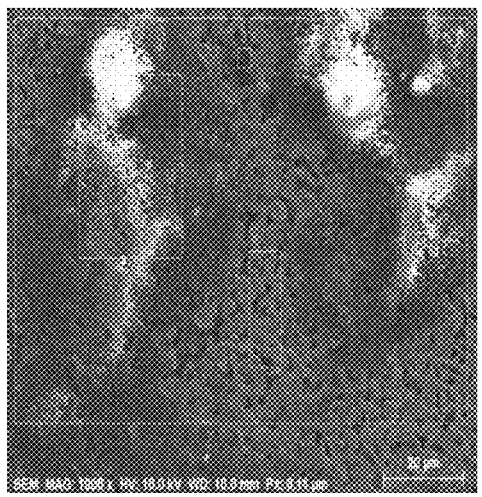
Figure 55D:
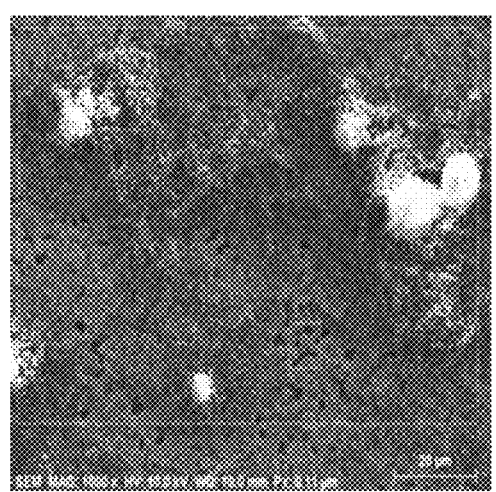
Figure 56A:
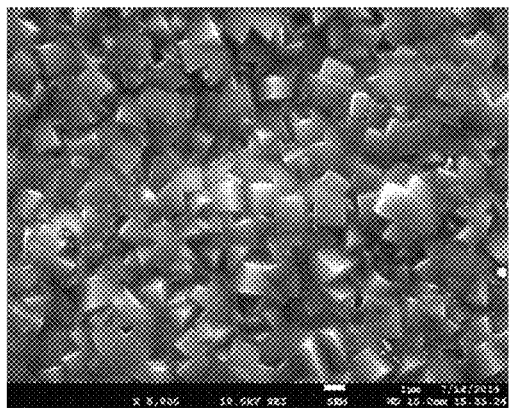
FIGS. 56A-56F are SEMs of micro-structures of MFI-membrane grown at 120° C.
Figure 56B:
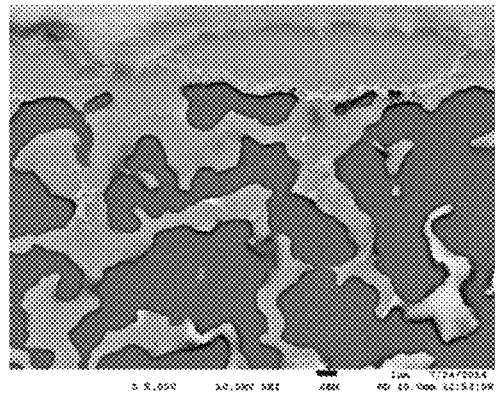
Figure 56C:
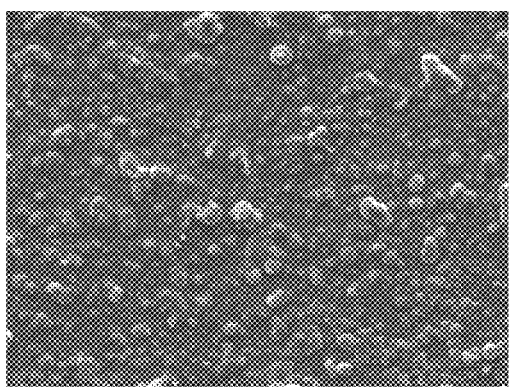
Figure 56D:
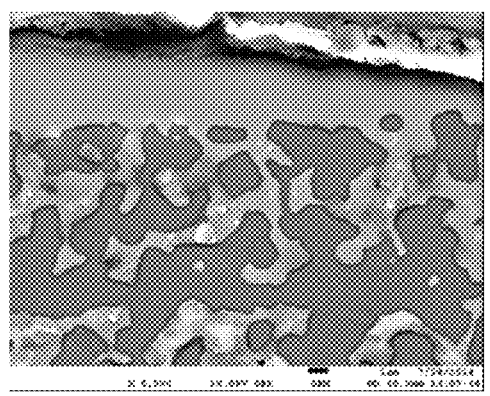
Figure 56E:
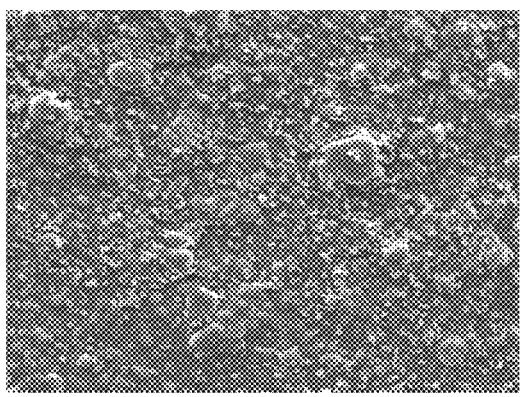
Figure 56F:
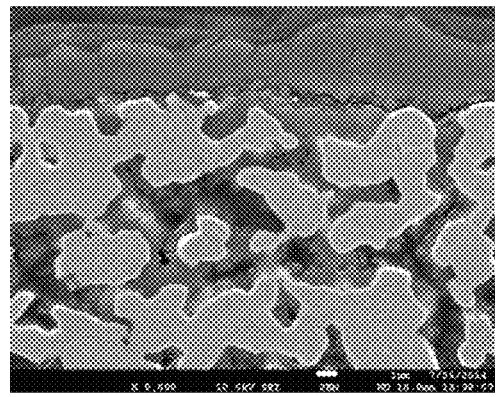

Elemental compositions of seeded porous Ni supports in SEM images of FIGS. 55C and 55D.

| | 0.18 mg/cm2 of as-synthesized seeds (FIG. 55C) | | | | 0.27 mg/cm2 of as-synthesized seeds (FIG. 55D) | | |
|---|---|---|---|---|---|---|---|
| Spot | 4 | 3 | 2 | 1 | 3 | 2 | 1 |
| O at % | 10.41 | 54.84 | 62.00 | 58.30 | 25.15 | 64.45 | 58.30 |
| Si at % | 3.04 | 19.93 | 36.97 | 31.86 | 11.36 | 34.72 | 32.91 |
| Ni at % | 86.30 | 14.07 | 0.36 | 7.32 | 63.35 | 0.22 | 8.30 |

The seeding crystal dispersion on the four seed-coated support sheets is shown in FIGS. 55A-55D. There is no continuous seed coating layer formed on these supports. Different spots of a seeded support surface were analyzed by EDS to determine the presence of seeding crystals. Table 42 lists elemental compositions of the seeded sheets shown in FIGS. 55A and 55B, while Table 43 lists elemental compositions of the seeded sheets shown in FIGS. 55C and 55D, Presence of Si and O was found in the spot that looks bare, because the seeding crystals can sit inside the support pores. The higher the seed loading, the higher Si content is measured. It appears that the as-synthesized seeds provided more uniform dispersion of the seeding crystals than the calcined one. This may be caused by presence of more agglomerates in the coating solution made of the calcined seeds.

Two growth solutions with different compositions were evaluated. The TEOS:TPAOH:H$_2$O:NaOH molar ratio was 1.0:0.120:68.1:0.008 for solution 1 and 1.0:0.152:24.7:0.008 for solution 2. The growth solution was prepared in the procedure as described above. The growth solution was clear prior to growth.

The seeded support sheets were loaded into the planar reactor and fully immersed in the growth solution. The reactor was heated to the designated temperature at 1° C./min and held for 2 hours, and cooled down naturally. The membrane sheet unloaded from the reactor was rinsed and dried. The growth weight gain was recorded.

Table 44 summarizes three batches of membrane growth runs with identical seeded sheets. Runs 1 and 2 were conducted with solution 1 at different holding temperatures. One the same seeded support, more weight was gained with the higher growth temperature. Run 3 was conducted at the same growth temperature as run 2 but with solution 2. Solution 2 was more concentrated than solution 1. It can be seen that under the same growth conditions, growth weight gain with the higher concentration is less than that with the lower concentration. Thus, significant penetration of the growth solution into the support pores may occur with the low concentration. In run 3, more growth gain was shown with the higher seed loading level, which suggests that the growth dominantly occurred on the seeded surface. Thus, growth penetration into the support pores can be controlled by the growth solution concentration.

All the membrane samples listed in Table 44 passed the color leakage tests, indicating no meso- or macro-defects. The gas permeance of as-grown membranes was measured with $CO_2$ and air. As-grown membranes showed no or little gas permeation at 31° C. because the membrane pores were occupied by the template.

The membrane structures were analyzed by SEM/EDS and XRD. Table 45 lists surface compositions of a few membranes grown at 120 and 140° C. Ni, Si and O are the only elements detected by EDS, suggesting a membrane layer of pure $SiO_2$. It is noted that EDS is not an accurate method to measure O content. The 140° C.-grown membranes generally show a lower Ni at % than the 120° C.-grown one, which is consistent with the more zeolite growth at the higher temperature. Structures of the membranes are illustrated with three membrane samples grown at 120° C. in FIGS. 56A-56F. A continuous-inter-grown zeolite membrane layer was observed with all the membranes. The deposit on the membrane surface likely resulted from adsorption of crystals and particles from the bulk growth solution onto the membrane surface. The dense, continuous membrane layer is clearly revealed by the cross-sectional analysis. Some zeolite penetration into the support pores is evident.

Figure 57:
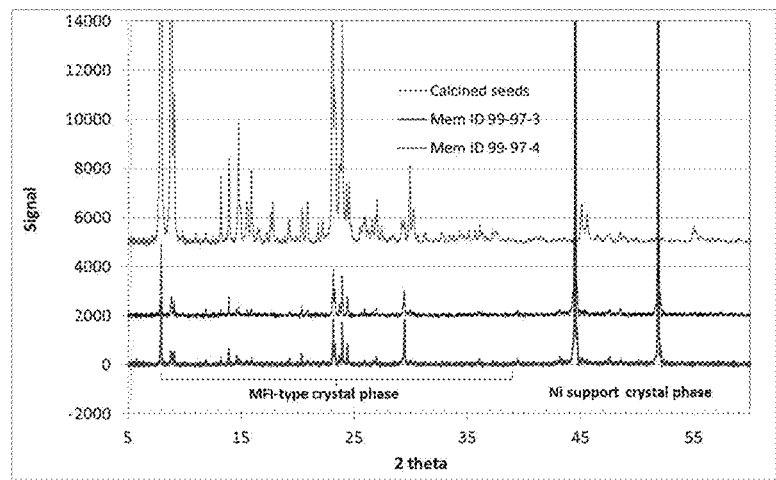
FIG. 57 illustrate XRD patterns of MFI-membrane grown with calcined seeds.
Figure 58:
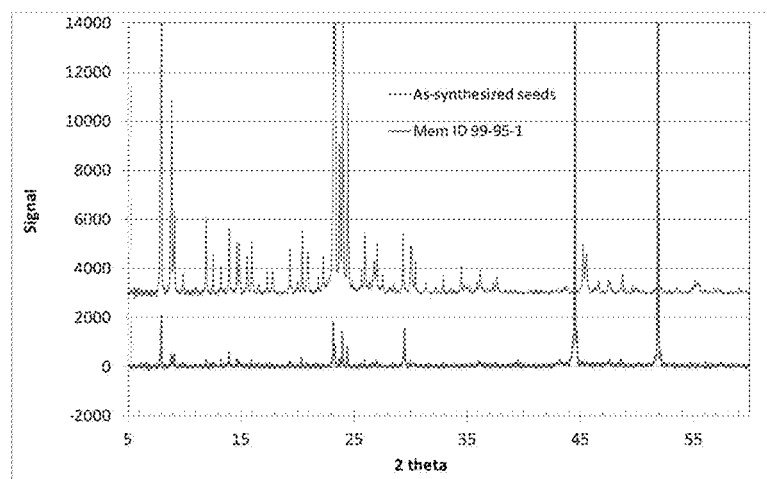
FIG. 58 illustrate XRD patterns of MFI-membrane grown with as-synthesized seeds.

The crystal phase of the membranes was confirmed by XRD analysis. FIG. 57 shows XRD patterns of the calcined seed and two membranes grown with it. XRD of the seeding crystals was measured in powder form, while the membrane was measured in the thin-film form. The major peaks at 2θ>43° are attributed the Ni support. The membrane XRD patterns match those of the seeding crystal well. The XRD patterns of the as-synthesized seed and the membrane grown out of it are compared in FIG. 58. The peaks of the membrane well match those of the seeding crystal. Crystal phase identification with the database shows that the MFI-type framework is the dominating crystal phase for the seeds and membranes.

This example demonstrates that the MFI-type membrane can be grown on the seeding crystals either as synthesized or calcined even at growth temperature of 120° C.

TABLE 45

Surface compositions of MFI-type membranes prepared in this example

| Mem ID 60037- | Seeding crystals | Growth temp, ° C. | Spot | O at % | Si at % | Ni at % |
|---|---|---|---|---|---|---|
| 99-97-3 | calcined | 120 | Full image | 55.7 | 41.5 | 2.78 |
| 99-97-4 | calcined | 120 | Full image | 55.8 | 42.0 | 2.25 |
| 99-97-4 | calcined | 120 | Spot 1 | 58.5 | 40.7 | 0.80 |
|  |  |  | Spot 2 | 63.3 | 35.7 | 1.00 |

TABLE 44

MFI-type membranes prepared under different conditions

| Seed coating | | Run 1: Solution 1 at 120° C. h | | Run 2 Solution 1 at 140° C. 2 h | | Run 3: Solution 2 at 140° C. 2 h | |
|---|---|---|---|---|---|---|---|
| Seeds | loading, mg/cm$^2$ | Mem ID 60037- | Growth gain, mg/cm$^2$ | Mem ID 60037- | Growth gain, mg/cm$^2$ | Mem ID 60037- | growth gain, mg/cm$^2$ |
| calcined | 0.15 | 99-97-3 | 2.0 | 97-3 | 2.6 | 112-105-1 | 1.31 |
|  | 0.24 | 99-97-4 | 2.3 | 97-4 | 3.3 | 112-105-2 | 1.50 |
| as-synthesized | 0.18 | 99-95-1 | 2.3 | 97-95-1 | 2.5 | 112-105-3 | 0.98 |
|  | 0.27 | 99-95-2 | 2.0 | 97-95-2 | 2.3 | 112-105-4 | 1.56 |

TABLE 45-continued

Surface compositions of MFI-type membranes prepared in this example

| Mem ID 60037- | Seeding crystals | Growth temp, ° C. | Spot | O at % | Si at % | Ni at % |
|---|---|---|---|---|---|---|
| 99-95-1 | as-synthesized | 120 | Full image | 56.5 | 42.7 | 0.84 |
| 99-95-2 | as-synthesized | 120 | Full image | 56.8 | 41.8 | 1.39 |
| 97-3 | calcined | 140 | Full image | 56.3 | 42.8 | 0.88 |
| 97-95-1 | as-synthesized | 140 | Full image | 56.5 | 42.7 | 0.84 | ii. Ethanol/Water Separation with MFI-Type Zeolite Membrane

The silicalite membrane (#6109-1-2) grown at 140° C. was calcined in 2% $O_2/N_2$ gas at 400° C. for 4 hours at 1° C./min ramp rate. The membrane was tested for ethanol/water separation. 10 wt % EtOH in water was introduced into the feed side of a membrane test cell at flow rate of 1 cc/min under 2.2 bar. The membrane cell was maintained at 75° C. The permeate side of the membrane cell was swept by 500 sccm of Helium gas flow at 1.1 bar. Helium gas effluent from the membrane cell passed through a liquid nitrogen cold trap where the permeated water and ethanol was condensed and collected. The flux and separation factor were calculated from the experimental measurements by use of the following equations:

$$J = \frac{\Delta W_P}{\Delta t \cdot SA_M}$$

$$SF = \frac{\frac{y_{et}}{1-y_{et}}}{\frac{x_{et}}{1-x_{et}}}$$

$J$ = flux, kg/m²/h $\Delta w$ = weight of the permeate collected at time interval of $\Delta t$, kg $\Delta t$ = sampling time, h $SA_m$ = area of the membrane test coupon exposed to the feed, m²

Figure 59:
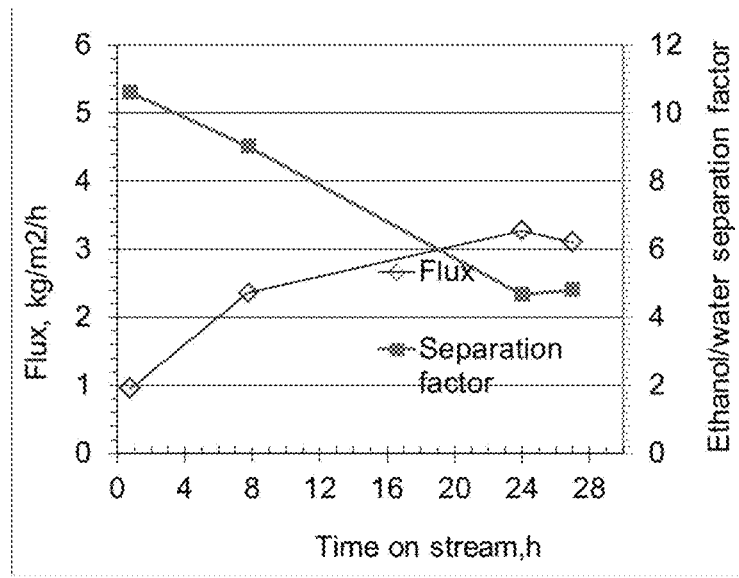
FIG. 59 is a graph illustrating ethanol/water separation with a silicalite membrane heated at 400° C.

$SF$ = Ethanol/water separation factor $y_{ET}$ = ethanol fraction in the permeate $x_{ET}$ = ethanol fraction in the feed FIG. 59 shows variations of flux and ethanol/H₂O separation factor with time on stream. The flux increased with time and reached plateau about 3.1 kg/m²/h, while the separation factor declined and reached a plateau around 4.5. The pore in the as-prepared membrane may be blocked by some loose structures or matters. As these temporary features were flushed away during the test, the permanent membrane structure was exposed so that the flux and selectivity were stabilized.

Figure 60:
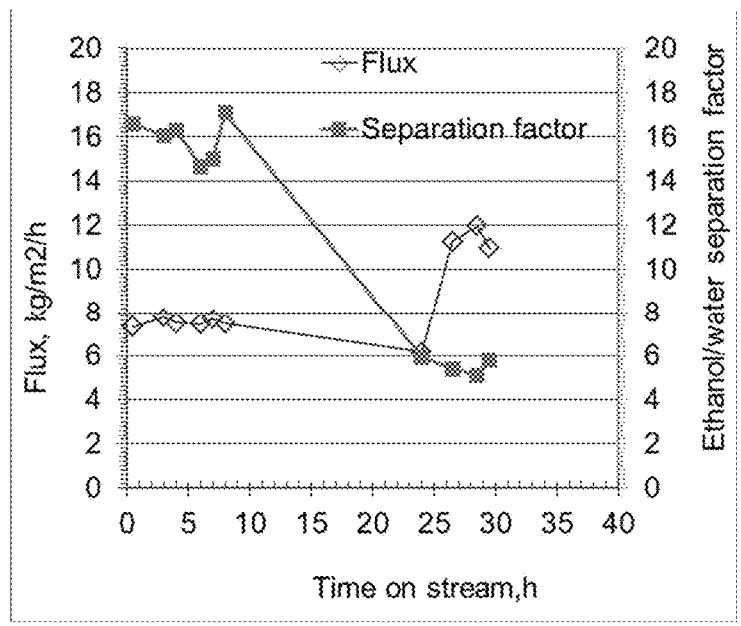
FIG. 60 is a graph illustrating ethanol/water separation by pervaporation over a silicalite membrane.

Another silicalite membrane (#030110-1) grown at 140° C. and heated at 400° C. was tested for ethanol/water separation by pervaporation. 10 wt. % ethanol in water was fed into the feed side of the membrane test cell at 3 cc/min under atmospheric pressure, while the permeate side was pulled vacuum to about 1-2 mbar. The permeate was collected in a liquid nitrogen cold trap. FIG. 60 shows that flux slightly declined with time and then increased to reach a plateau, while the separation factor declined with time and reached a plateau. The trends suggest that some temporary structures obstructing membrane pores may have been removed with the time. This membrane showed a very high flux, about 11 kg/m²/h, after 25-hours on the stream.

Impacts of silicalite membrane preparation on ethanol/water separation are shown by the following group of experiments. The silicate membranes were grown with two solutions of different H₂O/Si molar ratios while the Si/TPAOH ratio being kept at 0.123. The growth conditions were 140° C. 2 hours at 1° C./min ramping rate. The following methods were utilized to remove the template:

Method 1: 2% O₂/N₂ gas flow, 1° C./min to 400° C., 4-h at 400° C., cooling down at 1° C./min.

Method 2: inert gas purge (He), 1° C./min to 400° C., 10-h at 400° C., cooling down at 1° C./min.

Method 3. 2% O₂/N₂ gas flow, 1° C./min to 360° C., 10 h at 360° C., cooling down at 1° C./min.

Method 4. Conduct pervaporation testing of as prepared membrane sample at 75° C. with pure ethanol first, monitor the permeation flux Method 1 was considered as a standardized procedure for removal of the template from the thin-sheet MFI membrane identified in this work. In method 2, only inert gas stream was used with a longer exposure time at 400° C. In method 3, the holding temperature was lowered to 360° C. while the holding time was prolonged to 10 hours. Method 4 was a test of possible extraction of the template by ethanol at the pervaporation temperature. The resulting membranes were tested for ethanol/water separation by pervaporation under the same conditions as described above.

The results are summarized in Table 46. Method 1 remains effective for removal of the template. Fairly high flux and good ethanol/water separation factor were obtained. The membrane pore could not be opened up by flushing the membrane surface with pure ethanol under the pervaporation condition, as evidenced by very small flux in 7.5-hour flushing. It is interesting to note that methods 3 and 2 are also effective for removal of the template, as evidenced by the high flux and good ethanol/water separation factor obtained.

This example demonstrates that a silicalite membrane for selective ethanol/water separation can be grown under moderate conditions (140° C.) with different concentrations of the growth solution, and the template can be removed by exposing the membrane surface to a gas environment containing no or a little amount of oxygen at temperatures about 400° C. The thin-sheet membrane maintained its mechanical integrity after such treatment. This heating temperature is much lower than 500° C.-calcination that was typically reported in the art.

TABLE 46

Impacts of membrane preparation on ethanol/water separation performances

| | Membrane preparation | | Separation performances | | | |
|---|---|---|---|---|---|---|
| Mem# | Growth solution H2O/Si ratio | Template removal | Time on stream, h | Flux, kg/m²/h | Ethanol/water separation factor | Concentration factor |
| 32910-1 | 79 | Method 1 | 1 | 5.4 | 4.3 | 3.1 |
| | | | 4 | 5.6 | 5.6 | 3.7 |
| 32910-2* | | | 8 | 7.1 | 5.3 | 3.5 |
| | | Method 4 | 7.5 | 0.007 | Pure ethanol | |
| 32910-3 | 40 | Method 3 | 1 | 3.77 | 7.0 | 4.1 |
| | | | 4 | 3.47 | 4.7 | 3.3 |
| 32910-4 | | | 8 | 4.11 | 4.8 | 3.3 |
| | | Method 2 | 2 | 13.33 | 3.3 | 2.58 |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. A hydrocarbon-permeable membrane sheet for selective removal of hydrocarbon molecules from a mixture comprising:
    a hydrocarbon-selective membrane layer comprising inter-grown MFI-type zeolite crystals comprising $SiO_2/Al_2O_3$ and disposed on a support surface of a porous metal-based support sheet, wherein the porous metal-based support sheet is less than 200 μm thick and is substantially free of surface pores greater than 10 μm in diameter, wherein substantially free is less than 1% of the surface,
    wherein the membrane layer has thickness above the support surface in the range of about 2 to 20 μm and has a penetration depth below the support surface in the range of about 1 μm to about 10 μm,
    wherein the permeable membrane sheet has a hydrocarbon permeance greater than $1\times10^{-6}$ mol/m2/Pa/s and a hydrocarbon selectivity greater than 2, and
    wherein the membrane sheet is bendable from a substantially flat configuration to a configuration having a radius greater than ½" (1.3 cm) without cracking.

2. The membrane sheet of claim 1, wherein the hydrocarbon-selective membrane layer is configured to remove alcohols from alcohol-water mixtures.

3. The membrane sheet of claim 1, wherein the porous metal-based support sheet has a porosity between 15 and 55%.

4. The membrane sheet of claim 1, wherein the porous metal-based support sheet has a porosity between 30 and 45%.

5. The membrane sheet of claim 1, wherein the porous metal-based support sheet comprises greater than 60% by weight of Ni, an Ni alloy, or stainless steel.

6. The membrane sheet of claim 1, wherein the MFI-type zeolite crystals have a $SiO_2/Al_2O_3$ molar ratio greater than 100.

* * * * *